(12) United States Patent
Lee et al.

(10) Patent No.: US 9,693,362 B2
(45) Date of Patent: Jun. 27, 2017

(54) METHOD FOR ALLOCATING RESOURCES IN WIRELESS LAN SYSTEM AND WIRELESS LAN SYSTEM

(71) Applicant: ELECTRONICS AND TELECOMMUNICATIONS RESEARCH INSTITUTE, Daejeon (KR)

(72) Inventors: Jae Seung Lee, Daejeon (KR); Min Ho Cheong, Daejeon (KR); Hyoung Jin Kwon, Daejeon (KR); Sok Kyu Lee, Daejeon (KR); Wun Cheol Jeong, Daejeon (KR); Chang Sub Shin, Daejeon (KR); Cheol Sig Pyo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/648,206

(22) PCT Filed: Nov. 29, 2013

(86) PCT No.: PCT/KR2013/011012
§ 371 (c)(1),
(2) Date: May 28, 2015

(87) PCT Pub. No.: WO2014/084665
PCT Pub. Date: Jun. 5, 2014

(65) Prior Publication Data
US 2015/0327265 A1 Nov. 12, 2015

(30) Foreign Application Priority Data

Nov. 30, 2012 (KR) .......................... 10-2012-0137861
Jan. 7, 2013 (KR) .......................... 10-2013-0001796
(Continued)

(51) Int. Cl.
*G08C 17/00* (2006.01)
*H04W 72/08* (2009.01)
(Continued)

(52) U.S. Cl.
CPC ...... *H04W 72/082* (2013.01); *H04B 7/15507* (2013.01); *H04W 52/0203* (2013.01);
(Continued)

(58) Field of Classification Search
CPC .......... H04W 72/082; H04W 52/0203; H04W 64/003; H04W 72/0446; H04W 74/006;
(Continued)

(56) References Cited

U.S. PATENT DOCUMENTS

| | | | | |
|---|---|---|---|---|
| 8,982,864 B2* | 3/2015 | Takano | ............... | H04L 5/0037 370/341 |
| 2012/0088533 A1* | 4/2012 | Khoshnevis | .......... | H04L 1/0026 455/509 |
| 2013/0195036 A1* | 8/2013 | Quan | .................... | H04W 72/04 370/329 |

FOREIGN PATENT DOCUMENTS

| KR | 10-2011-0035969 A | 4/2011 |
|---|---|---|
| KR | 10-2011-0102847 A | 9/2011 |

(Continued)

OTHER PUBLICATIONS

Xueli AN et al., "Extending WPANs to Support Multi-hop Communication with QoS Provisioning", IEEE CCNC 2010 proceedings, Jan. 9-12, 2010, pp. 1-6.
(Continued)

*Primary Examiner* — Afshawn Towfighi

(57) ABSTRACT

Provided are a method of allocating resources in a wireless local area network (WLAN) system and the WLAN system including an access point (AP) to allocate a resource for communication between a relay and a station associated
(Continued)

with the relay, the relay to allocate a restricted access window (RAW) or a slot for communication with a station based on the allocated resource, and the station to communicate with the relay based on the allocated RAW or the allocated slot.

16 Claims, 55 Drawing Sheets

(30) Foreign Application Priority Data

| Mar. 11, 2013 | (KR) | 10-2013-0025865 |
|---|---|---|
| Apr. 22, 2013 | (KR) | 10-2013-0044361 |
| Jun. 14, 2013 | (KR) | 10-2013-0068655 |
| Jun. 18, 2013 | (KR) | 10-2013-0069392 |
| Jul. 9, 2013 | (KR) | 10-2013-0080605 |
| Nov. 28, 2013 | (KR) | 10-2013-0146441 |

(51) Int. Cl.
| H04W 72/04 | (2009.01) |
|---|---|
| H04B 7/155 | (2006.01) |
| H04W 64/00 | (2009.01) |
| H04W 52/02 | (2009.01) |
| H04W 74/00 | (2009.01) |
| H04W 84/04 | (2009.01) |
| H04W 84/12 | (2009.01) |

(52) U.S. Cl.
CPC ..... *H04W 64/003* (2013.01); *H04W 72/0446* (2013.01); *H04W 74/006* (2013.01); *H04W 84/047* (2013.01); *H04W 84/12* (2013.01); *Y02B 60/50* (2013.01)

(58) Field of Classification Search
CPC .............. H04W 84/047; H04W 84/12; H04B 7/15507
See application file for complete search history.

(56) References Cited

FOREIGN PATENT DOCUMENTS

| KR | 10-2012-0070482 A | 6/2012 |
|---|---|---|
| WO | WO 2011/102652 A2 | 8/2011 |

OTHER PUBLICATIONS

J.K. Choi et al., "Review on QoS issues in IEEE 802.11 W-LAN", Feb. 22-26, 2006, pp. 2109-2113, ICACT2006.
International Search Report for PCT/KR2013/011012 filed on Nov. 29, 2013.

* cited by examiner

|  | Beacon (0) | Beacon (1) | Beacon (2) | Beacon (3) | Beacon (4) | Beacon (5) |
|---|---|---|---|---|---|---|
| RAW 0 R-AP AID | 00_00001_000 _000 (64) | 00_00010_000 _000 (128) | 00_00011_000 _000 (192) | 00_00100_000 _000 (256) | 00_00001_000 _000 (64) | 00_00010_000 _000 (128) |
| RAW 1 R-AP AID | 01_00001_000 _000 (2112) | 01_00010_000 _000 (2176) | 01_00011_000 _000 (2240) | 01_00100_000 _000 (2304) | 01_00001_000 _000 (2112) | 01_00010_000 _000 (2176) |
| RAW 2 R-AP AID | 10_00001_000 _000 (4160) | 10_00010_000 _000 (4224) | 10_00011_000 _000 (4288) | 10_00100_000 _000 (4352) | 10_00001_000 _000 (4160) | 10_00010_000 _000 (4224) |
| RAW 3 R-AP AID | 11_00001_000 _000 (6208) | 11_00010_000 _000 (6092) | 11_00011_000 _000 (6156) | 11_00100_000 _000 (6220) | 11_00001_000 _000 (6208) | 11_00010_000 _000 (6092) |

| | R-AP-AID | Maximum STA number | STA AID range |
|---|---|---|---|
| RAW 0 | 00_00001_000_000 (64) | 63 | 65~127 |
| RAW 1 | 01_00001_000_000 (2112) | 63 | 2113~2175 |
| RAW 2 | 10_00001_000_000 (4160) | 63 | 4161~4223 |
| RAW 3 | 11_00001_000_000 (6208) | 63 | 6209~6091 |

FIG. 50

| Operating Class | Channel Number | Actual Measurement Start Time | Measurement Duration | Reported Frame Information |
|---|---|---|---|---|

Octets:  1  1  8  2  1

| RCPI | RSNI | BSSID | Antenna ID | Parent TSF | Optional Subelements |
|---|---|---|---|---|---|

Octets:  1  1  6  1  4  variable

FIG. 51
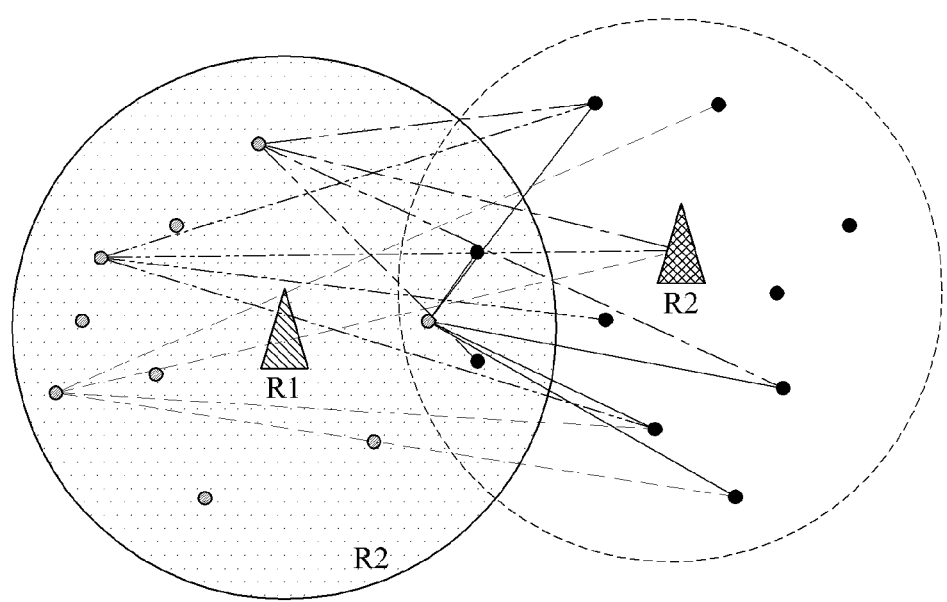
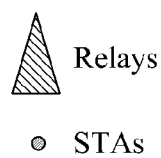 Relays
○ STAs

METHOD FOR ALLOCATING RESOURCES IN WIRELESS LAN SYSTEM AND WIRELESS LAN SYSTEM

TECHNICAL FIELD

The present invention relates to a method of allocating resources in a wireless local area network (WLAN) system.

BACKGROUND ART

A recent wireless local area network (WLAN) system adopts a slotted channel access to reduce collisions between stations during an operation of a basic service set (BSS) including thousands of stations. When thousands of stations access a channel and attempt to perform transmission at the same time, a collision probability may increase. In the slotted channel access method, a restricted access window (RAW) may be set to prevent collisions, and a transmission duration in the RAW transmission duration may be divided into slots. A slot in which transmission is allowed may be allocated to each station. A station may be allowed to contend for transmission in a slot allocated to the station. Thus, a sudden surge of channel accesses may be distributed, and collisions may be reduced.

In addition, the WLAN system introduces a relay operation to extend the coverage of an access point (AP). In a case in which the relay operation is employed, the slotted method may be adopted to efficiently support transmission of a large number of stations.

DISCLOSURE OF INVENTION

Technical Solutions

According to an aspect, there is provided a wireless location area network (WLAN) system including an access point (AP) to allocate a resource for communication between a relay and a station associated with the relay, the relay to allocate a restricted access window (RAW) or a slot for communication with a station based on the allocated resource, and the station to communicate with the relay based on the allocated RAW or the allocated slot.

According to an aspect, there is provided an AP including a resource allocator to allocate a resource for communication between a relay and a station associated with the relay, and a communication unit to transmit, to the relay, resource allocation information on the allocated resource.

According to an aspect, there is provided a relay including a resource allocator to allocate a resource for communication between the relay and a station associated with the relay based on resource allocation information received from an AP, and communication unit to transmit information on the allocated resource to the station.

According to an aspect, there is provided a station including a controller to identify a resource allocated to the station based on a beacon received from a relay, and a communication unit to communicate with the relay based on the identified resource.

According to an aspect, there is provided a method of allocating resources in a WLAN system including an AP, a relay, and a station, the method performed by the AP, the method including allocating a first resource for communication between the AP and the relay, and communication between the AP and a station associated with the AP, and allocating a second resource for communication between the relay and a station associated with the relay.

The method may further include transmitting, to the relay, resource allocation information on the allocated second resource.

The method may further include adjusting the allocated second resource based on interference information received from the relay.

The method may further include adjusting the allocated second resource based on station information received from the relay.

The method may further include transmitting, to the relay, a beacon including information on the allocated first resource and information on the associated second resource.

According to an aspect, there is provided a method of allocating resources in a WLAN system including an AP, a relay, and a station, the method performed by the relay, the method including receiving resource allocation information from the AP, and allocating a resource for communication between the relay and a station associated with the relay based on the received resource allocation information.

The method may further include transmitting, to the station, a beacon including information on the allocated resource.

According to an aspect, there is provided a communication method performed by a station in a WLAN system including an AP, a relay, and the station, the method including identifying a resource allocated to the station based on a beacon received from the relay, and communicating with the relay based on the identified resource.

BRIEF DESCRIPTION OF DRAWINGS

FIG. 50 illustrates an example of a format of a management report field according to an embodiment.

FIG. 51 illustrates a method of measuring an interference level from a neighboring relay or a neighboring relay BSS using a frame request/response according to an embodiment.

BEST MODE FOR CARRYING OUT THE INVENTION

Figure 1:
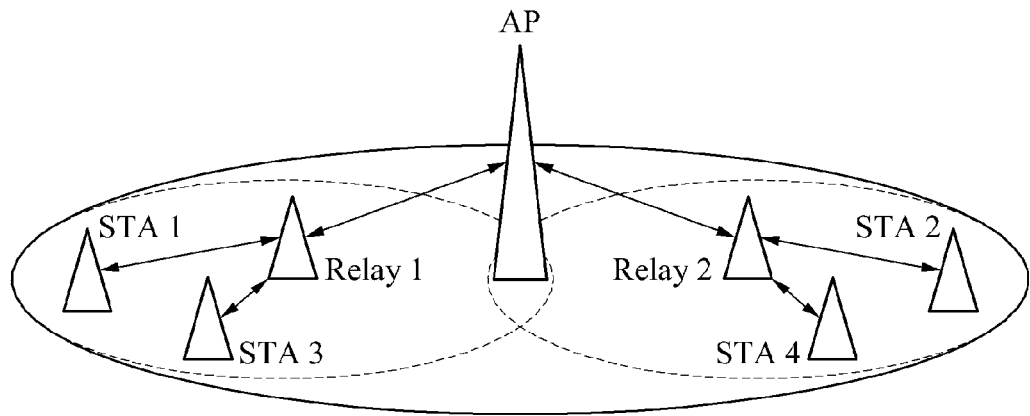
FIG. 1 illustrates an example of a method of transmitting data using a relay in a wireless local area network (WLAN) system according to an embodiment.

Hereinafter, exemplary embodiments will be described with reference to the accompanying drawings. It is to be understood that the detailed description, which will be disclosed along with the accompanying drawings, is intended to describe exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

The following embodiments are proposed by combining constituent components and characteristics of the present invention according to a predetermined format. The individual constituent components or characteristics should be considered to be optional factors on the condition that there is no additional remark. The individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments.

In the following description, specific terminologies used for embodiments of the present invention are provided to help the understanding of the present invention. And, the use of the specific terminology can be modified into another form within the scope of the technical idea of the present invention.

In some cases, to prevent ambiguity in the concept of the present invention, structures and apparatuses of the known art will be omitted, or will be shown in the form of a block diagram based on main functions of each structure and apparatus. Also, the same reference numerals will be used throughout the drawings and the specification to refer to the same or like parts.

Embodiments of the present invention are supportable by standard documents disclosed in at least one of wireless access systems including an Institute of Electrical and Electronics Engineers (IEEE) 802 system, a third generation partnership project (3GPP) system, a 3GPP long term evolution (3GPP LTE) system, and a third generation partnership project 2 (3GPP2) system. In particular, the steps or parts, which are not explained to clearly reveal the technical idea of the present invention, in the embodiments of the present invention can be supported by the above documents. Moreover, all terminologies disclosed in the present disclosure can be supported by the standard documents.

The following embodiments of the present invention can be applied to a variety of systems using wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. The CDMA may be implemented with radio technologies, for example, Universal Terrestrial Radio Access (UTRA) and CDMA2000. The TDMA may be implemented with radio technologies, for example, Global System for Mobile communications (GSM)/General Packet Radio Service (GPRS)/Enhanced Data Rates for GSM Evolution (EDGE). The OFDMA may be implemented with radio technologies, for example, IEEE 802.11 (Wi-Fi), IEEE 802.16 (WiMAX), IEEE 802-20, and Evolved UTRA (E-UTRA). For clarity, the following description focuses on the IEEE 802.11 system. However, technical features of the present invention are not limited thereto.

FIG. 1 illustrates an example of a method of transmitting data using a relay in a wireless local area network (WLAN) system according to an embodiment.

In a case in which an access point (AP) transmits data or a frame to a station (STA), a transmission efficiency may be reduced by an obstacle between the AP and the STA. In a case in which a STA transmits data to an AP, the STA may not transmit the data properly to the AP since in general a STA has a lower transmission power than an AP. To resolve such an issue and extend a coverage for data transmission between an AP and an STA, a relay may be used.

In FIG. 1, an STA 1 and an STA 3 are remote from an AP. Thus, data transmitted from the STA 1 and the STA 3 may not reach the AP or intensities of signals may be weakened. By forwarding the data transmitted from the STA 1 and the STA 3 using a relay 1 and a relay 2, such issues may be resolved. A relay may be used for uplink (UL) transmission, and downlink (DL) transmission from an AP to an STA.

In a case of a relay operation using a slotted method in a WLAN system, efficient resource allocation, for example, efficient restricted access window (RAW) operation, transmission slot allocation, transmission time duration allocation, and subband allocation, may be required to increase a transmission efficiency. To increase the transmission efficiency, a RAW and a transmission slot may be properly allocated so that a large number of STAs may transmit data without collisions. In addition, simultaneous data transmission may need to be performed using a method of sharing the same RAW or transmission slot among a greater number of STAs, or using a method using different subbands in the same time duration.

Figure 2:
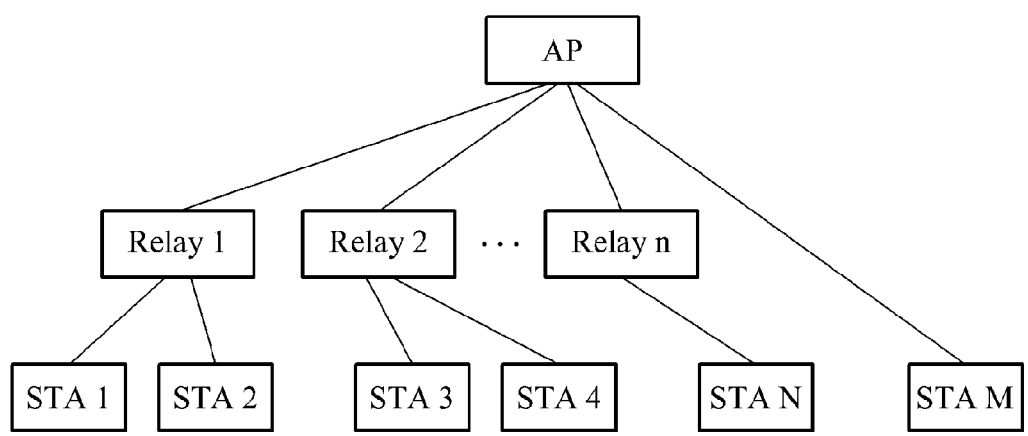
FIG. 2 illustrates an example of a configuration of a basic service set (BSS) in a case in which a relay operation is employed according to an embodiment.

FIG. 2 illustrates an example of a configuration of a basic service set (BSS) in a case in which a relay operation is employed according to an embodiment.

A WLAN system may include an AP, a relay, and an STA. A range of a BSS of the AP may be extended by the relay. An access point may be referred to as an AP, root AP, or Rt-AP. A relay may be referred to as a relay AP, relay STA, or R-AP. A station may be referred to as an STA, and include a variety of communication terminals that may be associated with the AP or the relay.

A BSS of the AP may be referred to as a root AP BSS. The relay may constitute a relay BSS that is a BSS of the relay. In the relay BSS, the relay may act as an AP with respect to the STA. The root AP BSS may overlap the relay BSS. The root AP BSS indicates an area in which the STA may maintain communication with the root AP, and the relay BSS indicates an area in which the STA may maintain communication with the relay. A communication area of the root AP BSS may be extended by the relay. A BSS of the root AP with an area extended by the relay may be referred to as an extended BSS. The extended BSS may include the root AP BSS, and the relay BSS of the relay associated with the root AP.

The root AP may inspect an overall network state of the WLAN system. The root AP and the relay may transmit beacons including information on an allocated resource. The beacon transmitted by the root AP may be referred to as a root beacon, Rt-beacon, or root AP beacon. The beacon transmitted by the relay may be referred to as a relay beacon, or R-beacon. The STA may be associated with the root AP through the relay, or directly associated with the root AP.

The AP may generate a single BSS, and the BSS may include a large number of STAs. In general, an STA may transmit data directly to an AP, like an STA M of FIG. 2. However, an STA may exchange data with the AP through a relay for range extension. A number of relays may be associated with a single AP, and each relay may relay, to the AP, data transmitted and received from a plurality of STAs.

In a case in which a relay is used to extend the coverage, a slotted transmission method may be employed when a large number of STAs are included in the BSS. In addition, an efficient slot allocation method and operation performed in view of relay-involved transmission may be needed.

Figure 3:
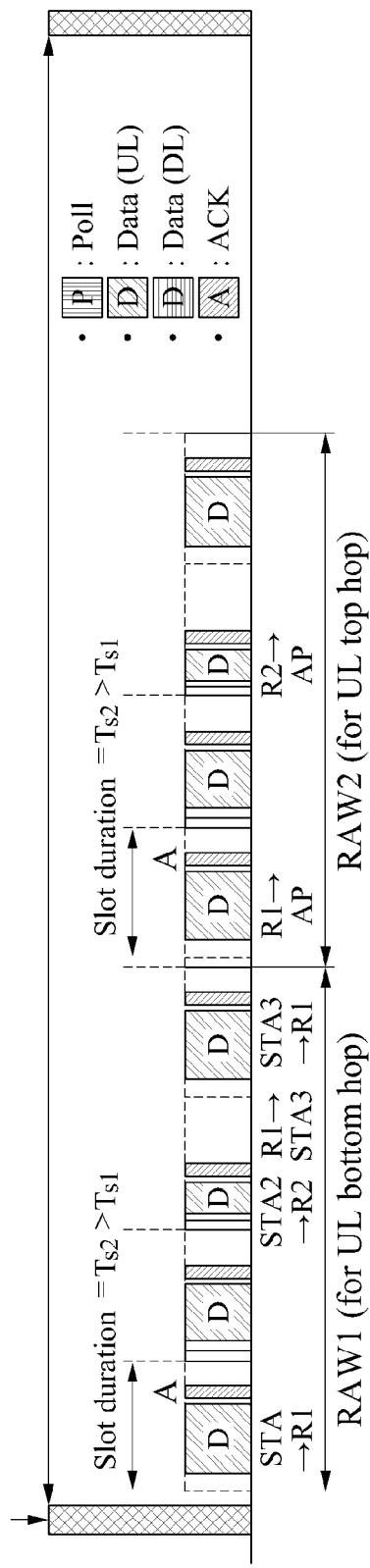
FIG. 3 illustrates an example of a method using a restricted access window (RAW) in a case in which a relay is used according to an embodiment.

FIG. 3 illustrates an example of a method using a RAW in a case in which a relay is used according to an embodiment.

Examples of a method of allocating a resource, for example, a RAW and a slot, in a case in which data is transmitted using a relay will be described hereinafter.

A first example of the resource allocation method is a method of allocating a RAW for each of transmission between an STA and a relay and transmission between a relay and an AP, which is illustrated in FIG. 3. Hereinafter, the transmission between an STA and a relay may be referred to as "bottom hop" transmission, and the transmission between a relay and an AP will be referred to as "top hop" transmission.

Referring to FIG. 3, a RAW 1 may be allocated for bottom hop transmission, and a RAW 2 may be allocated for top hop transmission. In the RAW 1, each of an STA 1, an STA 2, and an STA 3 may transmit data to a relay 1 (R1) or a relay 2 (R2) that is used by the each corresponding STA. In the RAW 2, the relay 1 and the relay 2 may transmit data to an AP. In this example, the UL transmission and the DL transmission may also be performed in a single RAW.

Figure 4:
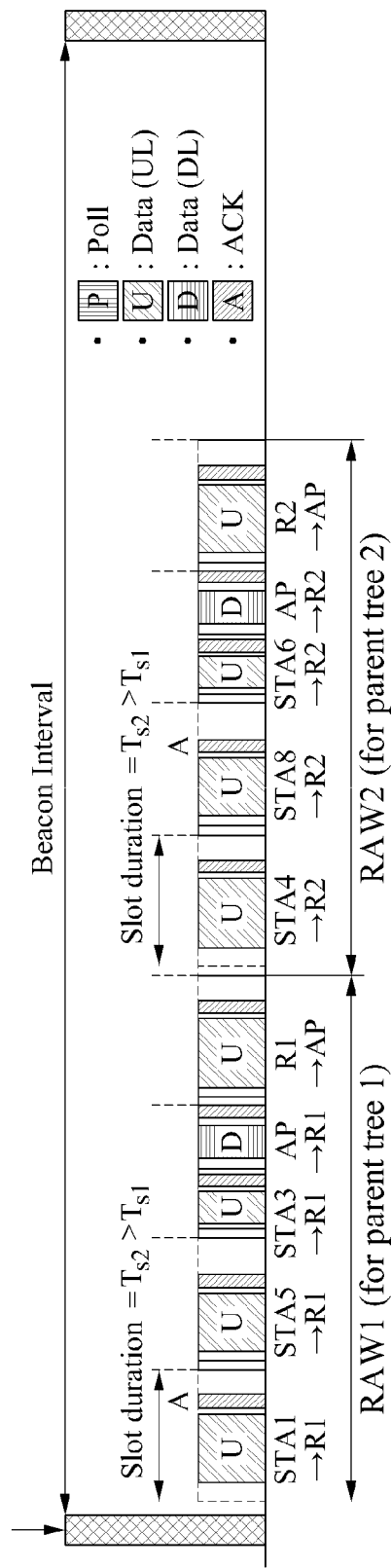
FIG. 4 illustrates another example of a method using a RAW in a case in which a relay is used according to an embodiment.

FIG. 4 illustrates another example of a method using a RAW in a case in which a relay is used according to an embodiment.

Another example of the resource allocation method is a method of allocating a RAW for each single STA-relay-AP. The STA-relay-AP may be referred to as a "parent tree".

Referring to FIG. 4, a RAW 1 may be allocated for transmission between a relay 1 (R1) and an STA 1, an STA 3, and an STA 5 using the relay 1, and transmission between the relay 1 and an AP. A RAW 2 may be allocated for transmission between a relay 2 (R2) and an STA 2, an STA 4, an STA 6, and an STA 8 using the relay 2, and transmission between the relay 2 and an AP.

RAW and slot allocation information may be transferred using a beacon. In this example, the beacon may be used to transfer RAW and slot allocation information related to an AP and an STA not using a relay, RAW and slot allocation information related to a relay, and RAW and slot allocation information on a RAW and a slot in which transmission of the relay and the STA is allowed.

Figure 5:
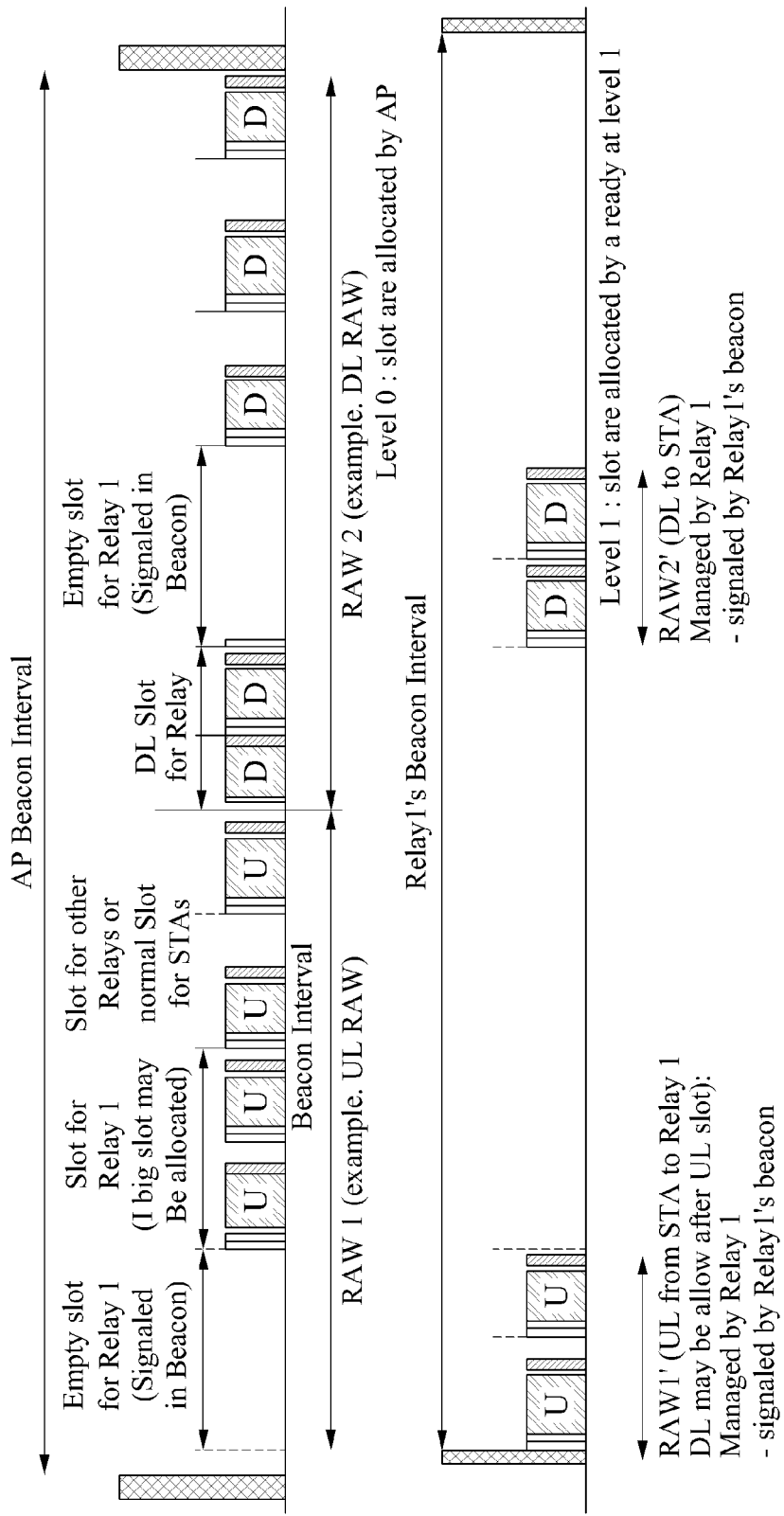
FIG. 5 illustrates still another example of a method using a RAW in a case in which a relay is used according to an embodiment.

FIG. 5 illustrates still another example of a method using a RAW in a case in which a relay is used according to an embodiment.

Still another example of the resource allocation method is a method in which a root AP may transmit a root beacon in a BSS, each relay may transmit a beacon, and an STA using the each corresponding relay may include RAW and slot allocation information in the beacon transmitted by the each corresponding relay, and transmit the beacon. The RAW and slot allocation information may correspond to information on a RAW and a slot in which UL or DL transmission with the relay is allowed. The beacon transmitted by the each corresponding relay may be referred to as a relay beacon.

RAW and slot allocation for transmission between the relay and the root AP and transmission between the root AP and an STA not using the relay may be performed by the root AP. The transmission between the root AP and an STA not using the relay may refer to transmission performed by the root AP to transmit and receive data directly to and from the STA. The transfer of the RAW and slot allocation information may be performed using the beacon transmitted by the root AP. The transfer of the RAW and slot allocation information may be referred to as "level-0 slot allocation", and the beacon transmitted by the root AP may be referred as a "root beacon". In the transmission between the relay and the STA, for example, bottom hop transmission, the corresponding relay directly involved in the transmission between the relay and the STA may allocate a RAW and a slot, and perform transmission of RAW and slot allocation information using a relay beacon. The transmission of RAW and slot allocation information may be referred to as "level-1 slot allocation".

The relay may exchange information with the root AP for the level-1 slot allocation, and the root AP may allocate, to the corresponding relay, an optimized length of time duration based on the exchanged information. The optimized length of the time duration may refer to a time duration independent from a RAW, a slot, or a RAW/slot for the root AP. The relay may directly allocate, based on the exchanged information, a RAW or a slot to be used for transmission between the relay and an STA within the time duration allocated for the transmission between the relay and the STA.

The root AP may directly perform the level-1 slot allocation, and provide level-1 slot allocation information to the relay, and the relay may transfer the level-1 slot allocation information using a beacon. However, a RAW or a slot to be used for the transmission between the relay and the STA may be allocated directly by the relay. Since the relay may be more aware of information related to STAs directly associated with the relay than the root AP, the relay may perform the level-1 slot allocation more efficiently. Thus, the root AP may allocate a transmission duration for transmission between the relay and the STA, and delegate, rather than directly performing, detailed RAW/slot allocation within the allocated transmission duration to the corresponding relay. Hereinafter, the foregoing operation will be referred to as "leveled slot allocation" or "leveled RAW allocation".

Due to the extension of the range of the BSS using the relay, an STA associated with the relay may not receive the root beacon. In a case in which RAW/slot allocation information to be used for the transmission between the relay and the STA is included in a relay beacon, the corresponding STA may only have to receive the relay beacon, rather than receiving the root beacon. In addition, since only the RAW/slot allocation information to be used for the transmission between the relay and the STA may be included in the relay beacon, a length of the relay beacon may be reduced.

The leveled slot allocation method or the RAW allocation method may include a method (A) in which the root AP allocates resources, for example, a relay transmission duration, and a relay transmission subband, at a level 0 in a form of a delegated RAW (DRAW), and allocates a DRAW duration to the relay, and a method (B) in which the root AP allocates resources, for example, the relay transmission duration, and a transmission band, to the relay separately from the RAW for the root AP based on separate resource allocation information not in a form of a RAW.

<(A) Method in which a Root AP Allocates Resources, for Example, a Relay Transmission Duration, and a Relay Transmission Subband, at a Level 0 in a Form of a DRAW, and Allocates a DRAW Duration to a Relay (Method Using a DRAW)>

FIG. 5 illustrates an example of a method of allocating a slot for each level in a case in which a relay transmits a beacon, in the case of a DRAW.

At a level 0 on the top, a root AP may directly allocate a RAW and a slot. The root AP may allocate a RAW and a slot for transmission between the root AP and a relay, and a RAW and a slot for transmission between the root AP and an STA performing transmission and reception directly with the AP not using the relay. Since the relay may collect data transmitted from a number of STAs through bottom hop transmission and transmit the collected data to the AP, a longer transmission period may be allocated. To allocate a longer transmission period to the relay, many slots or an overly long single slot may be allocated to the relay. In the example of FIG. 5, UL transmission and DL transmission are set to be performed in separate RAWs. However, UL transmission and DL transmission may also be performed through a single RAW. In addition, transmission to a normal STA, and transmission to a relay are included in a UL RAW and a DL RAW. However, only transmission with the relay may be included in a single RAW.

At a level 1 on the bottom, each relay may allocate a RAW and a slot for transmission with an STA using the corresponding relay. Each relay may manage a level-1 slot, and may include, in a beacon to be transmitted by the corresponding relay, slot allocation information for the transmission between the relay and the STA, and transfer the beacon. A relay may exchange RAW and slot allocation information with an AP for efficient RAW and slot allocation. Although the AP may perform level-1 RAW and slot allocation, and provide RAW and slot allocation information to the relay, it may be more efficient for the relay to directly perform RAW/slot allocation for the transmission between the relay and the STA.

At the level 1, another STA or another relay using the same channel may be disallowed to transmit and receive data to and from an AP while the relay is transmitting and receiving data to and from the STA. To prevent collisions, a root beacon including level-0 RAW and slot allocation information of the root AP, and information on a duration in which transmission is performed at the level 1 may be transferred. The duration in which transmission is performed at the level 1 may be referred to as an "empty slot", "empty RAW", or "delegated RAW".

To determine an empty slot duration at the level 0, the AP may exchange information with the relay. The empty slot duration may also be referred to as an empty RAW duration, or DRAW duration. The empty slot duration for UL transmission may be set based on an amount of data to be transmitted by the relay to the AP. Accordingly, the AP may receive uplink data indication (UDI) information from the relay, and set the empty slot duration. The AP may be previously aware of an amount of DL data received by STAs using the relay. Thus, to set the empty slot duration for DL transmission, the AP may set the empty slot duration based on the amount of the data received by the STAs using the relay, and inform the relay of the set empty slot duration.

In the example provided above, the empty slot duration for UL transmission is separated from the empty slot duration for DL transmission. However, the empty slot duration for UL transmission and the empty slot duration for DL transmission may be set as a single empty RAW, and the relay may allocate an UL RAW, a DL RAW, and a power save poll (PS-Poll) RAW at a proper ratio within the single empty RAW, as necessary. The single empty RAW may also be referred to as a single DRAW. In this example, the relay may distribute and use slots properly based on an amount of UL or DL data transmitted and received to and from an STA associated with the relay.

In a case in which an amount of traffic is relatively constant and transmission is performed periodically, for example, in a sensor network or a smart grid service, an AP may initially allocate a RAW and a slot in a uniform pattern, and provide RAW/slot allocation information. In this example, a periodic RAW (PRAW) may be used for the RAW and slot allocation. For example, a RAW, for example, a DRAW, to be used for transmission between a relay and an STA may be allocated to a full beacon to be transmitted occasionally. In a case in which relay allocation information is unchanged, relay RAW allocation information may not be specified separately in a short beacon to be transmitted subsequent to the full beacon.

The foregoing example may be applied to two-hop relay transmission performed using a single relay. In a case of multi-hop transmission performed using a number of relays, a lower level may be set to correspond to a relay level, and a level may be extended using the same method described above.

In the example of FIG. 5, an empty slot for a single relay may be allocated in a RAW. However, empty slots for a number of relays may be allocated in a single RAW, or empty slots for each relay may be allocated in the entire single RAW.

A relay beacon may be transmitted by each relay, and transmitted periodically. For example, after a beacon of a root AP is transmitted, a relay beacon may be transmitted in a RAW or slot allocated by the root AP to the corresponding relay. The allocated RAW or slot may correspond to a first empty slot for the corresponding relay of a level 0.

The relay may aggregate data received from each STA using the relay and transmit the aggregated data to the root AP, whereby a transmission efficiency may increase. The root AP may aggregate and transmit data, related to a number of STAs, to be transmitted using the relay. The relay may divide data received from the root AP for each STA and transmit the divided data to the corresponding STA, whereby the transmission efficiency may increase. To achieve the foregoing, conventional data aggregation technologies, for example, an aggregation-medium access control (MAC) service data unit (A-MSDU), and an aggregation-MAC protocol data unit (A-MPDU), may be used.

In the slot allocation method described above, when the same RAW and the same slot are enabled to be shared by a greater number of STAs, utilization of the slot may increase and the transmission efficiency may increase. For example, when the STAs are enabled to transmit and receive data at the same time, the transmission efficiency may increase further.

Figure 6:
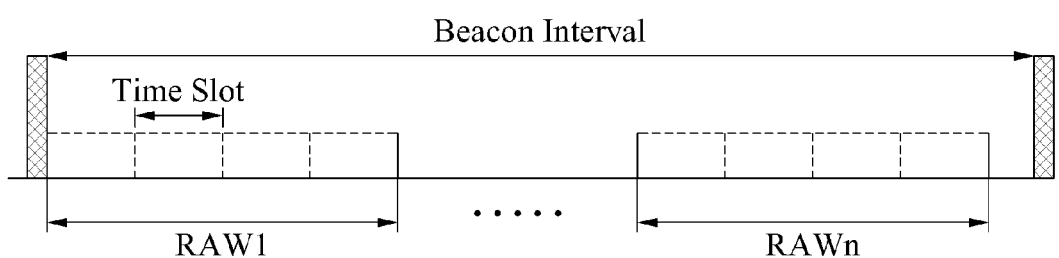
FIG. 6 illustrates a RAW structure in a slotted transmission method according to an embodiment.

FIG. 6 illustrates a RAW structure in a slotted transmission method according to an embodiment.

A number of RAWs included in a single beacon period may be restricted, and the restricted number of RAWs may be insufficient to perform transmission in each cluster. A cluster refers to a unit that includes a relay and STAs using the relay.

To resolve an issue of the restricted number of RAWs and efficiently utilize the RAWs, the following methods may be employed.

(1) Allocation of a Number of Clusters to a Single RAW in a Time Domain

When a few STAs are included in a cluster, a number of clusters may be allocated to a single RAW. In this example, although STAs of a number of clusters are allocated to a single RAW, a probability of collisions may be relatively low since the total number of the STAs is not great. Each STA may contend for channel allocation, and data may be transmitted in a chronological order in which a channel is allocated to each STA. In a case in which transmission is not completed in a time duration allocated to a predetermined relay cluster, a RAW allocated to be used simultaneously by a number of clusters may be used to additionally transmit remaining data in a shared time duration.

(2) Allocation of a Number of Clusters to a Single RAW in a Spatial Domain

When clusters are remote from each other, a single RAW may be allocated to the spatially separated clusters so that simultaneous data transmission may be performed.

For example, referring to FIG. 1, a cluster 1 including the relay 1 and a cluster 2 including the relay 2 may be allocated to the same RAW. In FIG. 1, the STA 1 and the STA 2 are spatially separated from each other. UL transmission performed by the STA 1 to transmit data to the relay 1 and UL transmission performed by the STA 2 to transmit data to the relay 2 may be performed simultaneously. Such simultaneous transmission may be readily applied to a transmission duration between each relay and an STA using the each corresponding relay.

(3) Allocation of a Number of Clusters to a Single RAW in a Frequency Domain

Figure 7:
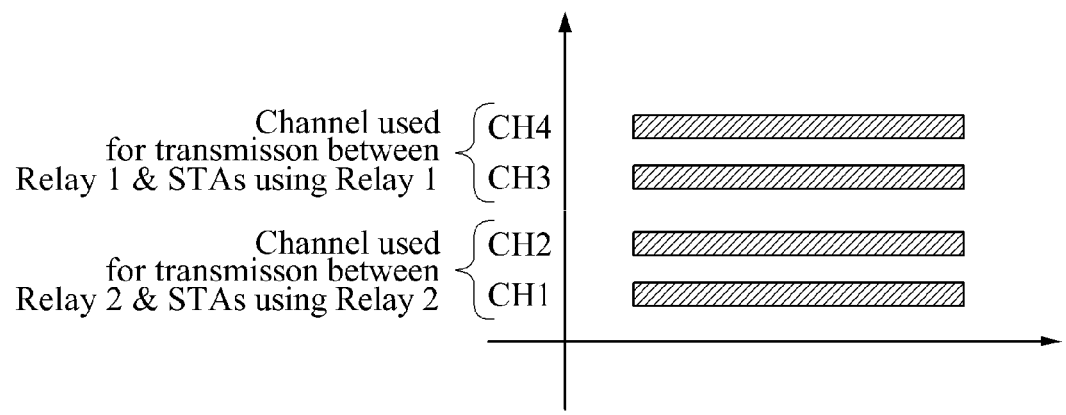
FIG. 7 illustrates an example of sharing the same RAW using different channels according to an embodiment.

Clusters may be enabled to perform transmission and reception with an STA using different channels. As shown in FIG. 7, when transmission between a relay 1 and STAs in a cluster 1 including the relay 1 is performed using a channel 3 (CH3) and a channel 4 (CH4), and transmission between a relay 2 and STAs in a cluster 2 including the relay 2 is performed using a channel 1 (CH1) and a channel 2 (CH2), simultaneous data transmission may be performed, and the two clusters may be allocated to a single RAW. FIG. 7 illustrates an example of sharing the same RAW using different channels according to an embodiment. The example may be useful in a case in which a relatively narrow bandwidth (BW) is used, for example, in a sensor network or a smart grid.

Such simultaneous transmission may be readily applied to a level-1 transmission duration in which transmission between a relay and an STA using the relay is performed.

When simultaneous transmission is performed, communication between an AP and the relay 1 or the relay 2 may be performed using all of the channels (CH1 to CH4). A relay may aggregate data received from each STA and transmit the aggregated data using a wider channel, whereby a transmission efficiency may increase.

As shown in FIG. 5, in the leveled slot allocation method of allocating a slot for each level, information exchange between a relay and an AP, and traffic information exchange of STAs may be performed for the most efficient utilization of a RAW and a slot. In a case in which STAs continuously join and leave a BSS, or in a case in which STA grouping is re-performed, RAW and slot allocation may need to be changed, which may act as overhead.

The RAW sharing methods (1) to (3) may also be applied to a case in which the method (B) in which the root AP allocates resources, for example, the relay transmission duration, and a transmission frequency band, to the relay separately from the RAW for the root AP based on separate resource allocation information not in a form of a RAW, is used.

In a case in which the method (B) is used in relation to the method (1) of allowing simultaneous transmission in a time domain, relays that may simultaneously perform transmission within a cluster in a time domain may be allocated to the same transmission duration. The transmission duration allocated to be used simultaneously in a number of clusters may be used to additionally transmit remaining data within a shared time duration in a case in which transmission is not completed within the time duration allocated to a predetermined relay cluster.

In a case in which the method (B) is used in relation to the method (2) of allowing simultaneous transmission in a spatial domain, a transmission time may be allocated to relays that may simultaneously perform transmission in spatially separated clusters so that transmission may be performed at the same time. Transmission in different clusters that are separated by a sufficient distance and hardly affected by each other may be performed separately at the same time. A transmission time duration for transmission between the spatially separated clusters may not be aligned based on a mutual transmission time duration.

In a case in which simultaneous transmission is performed using different frequency subbands, a method similar to the method (B) may be applied. Different relays may be set to perform transmission in a cluster using different subbands. In a case in which a root AP uses a subband different from the subbands used by the relays, transmission between the root AP and a relay or an STA directly associated with the root AP may be performed simultaneously with transmission in each relay cluster. When a subband used for transmission performed by the root AP is different from a subband used for transmission in each relay cluster, a transmission duration may not be adjusted, and data may be transmitted separately at the time same in respectively allocated subbands. In this example, a time duration may be allocated to prevent a relay and an STA using the same subband from simultaneously performing transmission.

The methods (1), (2), and (3) may be applied all together. For example, by allocating different subbands, a root AP and a plurality of relays may simultaneously perform transmission in a cluster. When relays using the same subband are spatially separated from each other and hardly affected by each other, the relays may simultaneously perform transmission. In a case in which a few STAs belong to a single cluster although the same subband is used, a number of clusters may be allocated to a single RAW.

Figure 8:
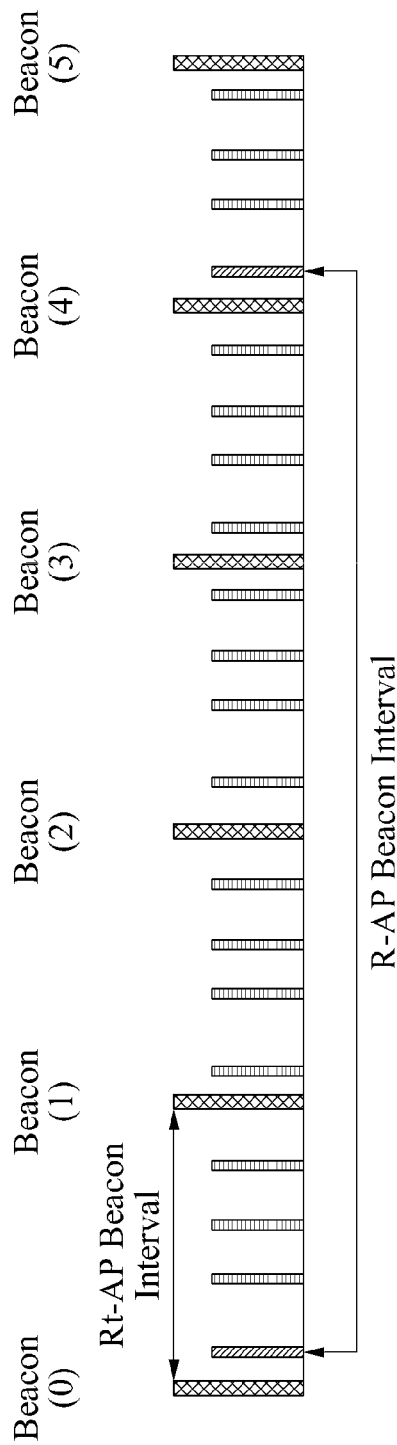
FIGS. 8 and 9 illustrate examples of allocating a plurality of clusters to a single RAW based on offset information according to an embodiment.
Figure 9:
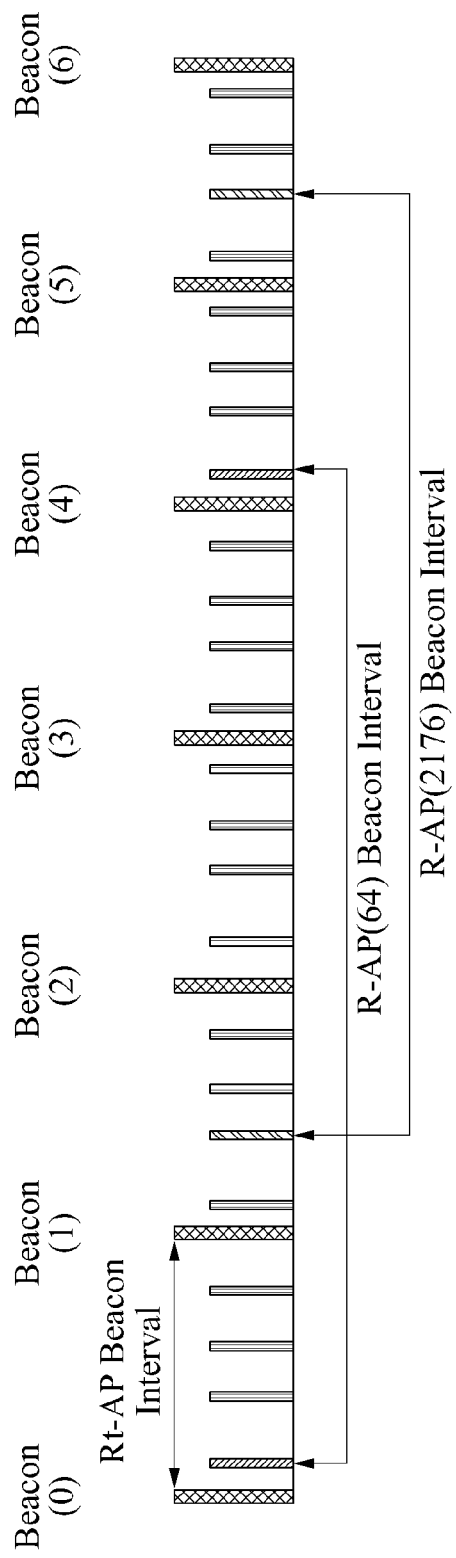

(4) Allocation of a Plurality of Clusters to a Single RAW Based on Offset Information Referring to FIG. 8, a method of allocating a plurality of clusters including a single R-AP and a plurality of STAs to a single RAW duration based on an allocation offset (AO) value may be used. FIGS. 8 and 9 illustrate examples of allocating a plurality of clusters to a single RAW based on offset information according to an embodiment.

As shown in FIGS. 8 and 9, in a case in which four RAWs, for example, a RAW 0 to a RAW 3, are allocated within a beacon interval of an Rt-AP, and four clusters are allocated to each RAW, an R-AP may calculate an allocation location of the R-AP based on the following values.

Information included in Rt-AP beacon frame
ASN (Allocation Sequence Number): 1 octet
AIO (Allocation Interval Order): 4 bit
R-AP parameters
Allocated RAW number: 1 octet
AO (Allocation Offset): 1 octet ($0<=AO<=2^{(AIO+1)}-1$)
R-AP Location: current ASN % $2^{(AIO+1)}==AO$ When a currently received beacon ASN of the Rt-AP corresponds to a current ASN, and a result value of "current ASN % $2^{(AIO+1)}$" matches a value of the AO allocated from the Rt-AP, a current beacon duration may be determined to be a duration allocated to a predetermined R-AP. In addition, the R-AP may identify an accurate allocation location based on a location value of a RAW allocated by the Rt-AP.

In FIG. 9, calculation may be performed based on allocation parameters shown in FIG. 9. Referring to FIG. 9, in a case in which an ASN corresponds to "0, 4, 8, . . . ", a RAW may be allocated to an R-AP having an allocation identifier (AID) of 64. In a case in which an ASN corresponds to "1, 5, 9, . . . ", a RAW may be allocated to an R-AP having an AID of 2176 may correspond to an allocation duration of the R-AP.

Figure 10:
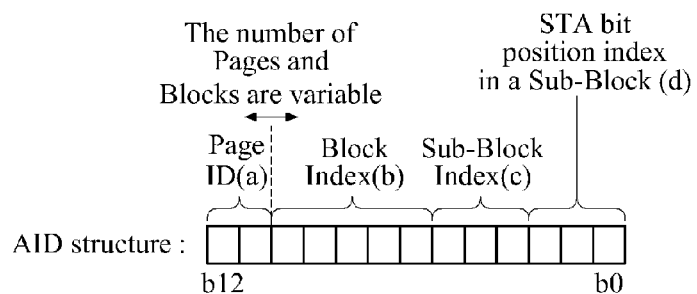
FIG. 10 illustrates a method of allocating an allocation identifier (AID) to a cluster according to an embodiment.

FIG. 10 illustrates a method of allocating an AID to a cluster according to an embodiment.

An R-AP in each cluster may be allocated a block AID in a process of being associated with an Rt-AP. As shown in FIG. 10, the block AID may be allocated using an AID structure in page units, block index units, and sub-block index units. In this example, a first AID value of the allocated block AID may be set to be an AID of the R-AP. Remaining AID values, excluding the AID of the R-AP, within a determined range may be allocated to STAs in a cluster when the STAs request association. By allocating an AID for each cluster or each level in a 2-hop network, an AP may simply allocate and efficiently manage AIDs. In the example of FIG. 10, each RAW may be allocated in page ID units, and allocated in block index units for each cluster. Thus, an R-AP in each cluster may manage a total of 64 block AIDs including its own AID. In such a structure, a single R-AP may accommodate up to 63 STAs.

Figure 11:
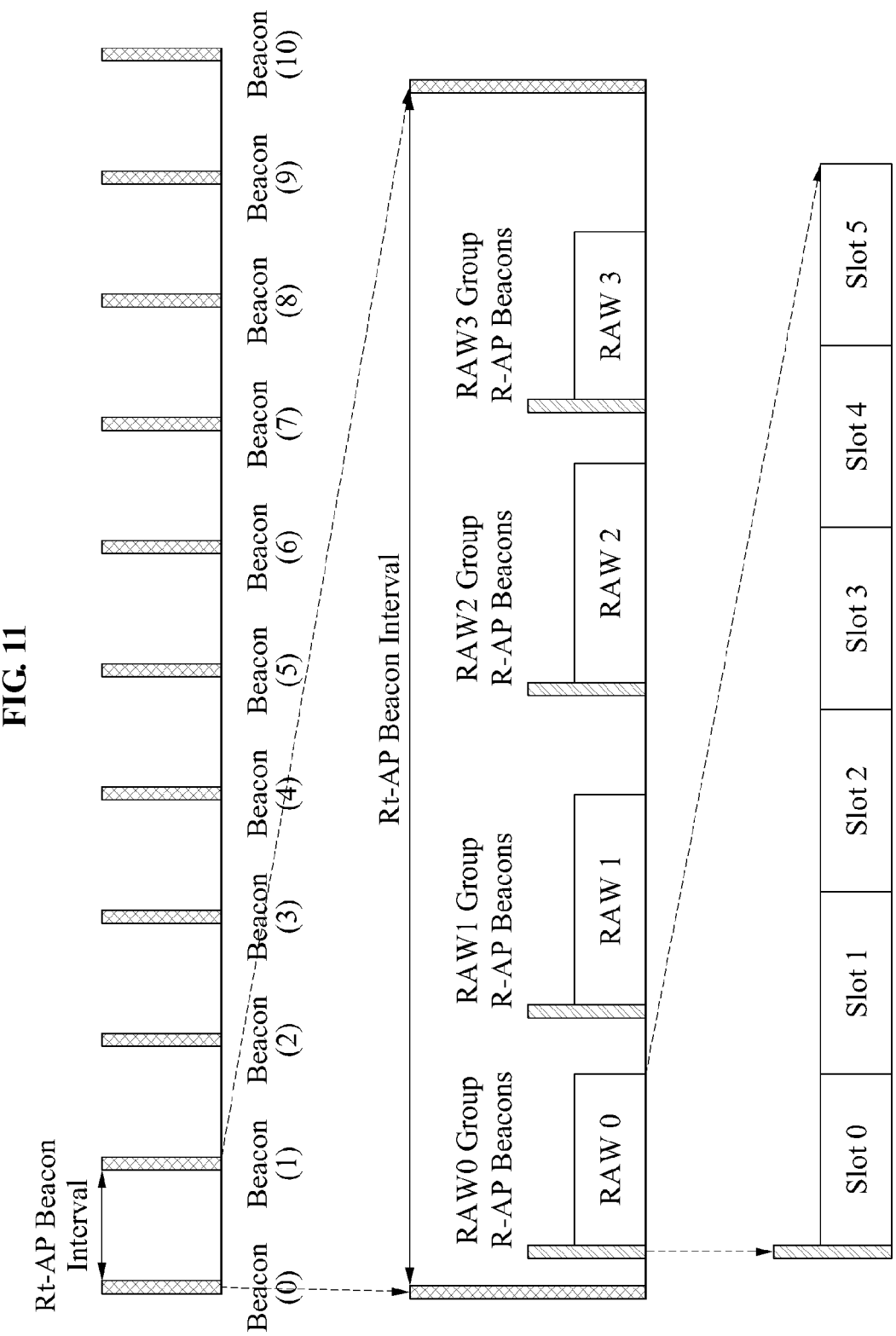
FIG. 11 illustrates an allocation location of a beacon transmitted by a relay access point (R-AP) according to an embodiment.

FIG. 11 illustrates an allocation location of a beacon transmitted by an R-AP according to an embodiment.

FIG. 11 illustrates an example of an allocation location of a beacon of the R-AP in a case in which a RAW is allocated in cluster or tree level units. Each RAW may start with a beacon of the R-AP, and be configured based on the number of slots having the same lengths. The allocation location of the beacon of the R-AP may be automatically determined based on such a configuration, and a length of the RAW and location information may be determined by an Rt-AP.

Figure 12:
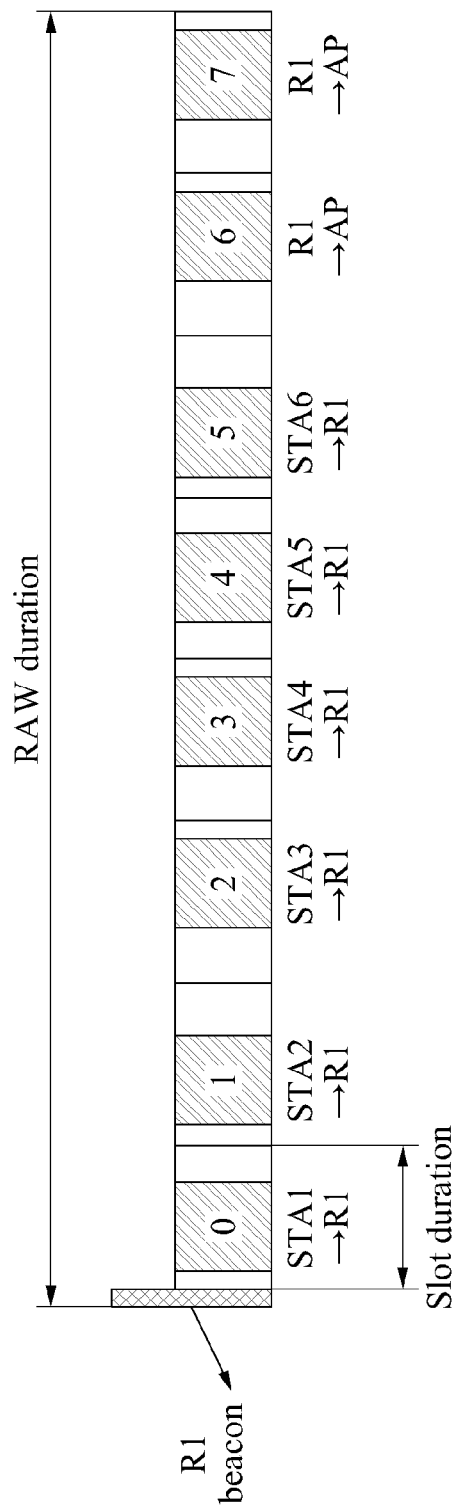
FIG. 12 illustrates a method of allocating slots to stations according to an embodiment.

FIG. 12 illustrates a method of allocating slots to stations according to an embodiment.

Referring to FIG. 12, slots for STAs may be allocated within a RAW duration.

In FIG. 12, an R-AP (R1) may transfer allocation information to an STA requesting association to R1, and the STA may be allocated a slot simply without performing a separate procedure for allocation. The allocation information transferred from R1 to the STA may include information as follows.

Information included in R-AP beacon frame
Length information of slot, the total number of slots
STA Slot Allocation bitmap (0: Empty slot, 1: Allocated slot)
STA slot allocation info: allocated by R-AP in association process
Allocated slot number The STA may transmit and receive data to and from the R-AP in the slot duration allocated to the STA. In a case in which DL data, for example, data transmitted from the R-AP to the STA, is present, the R-AP may transmit the data using an acknowledgement (ACK) frame or traffic indication map (TIM) information.

Figure 13:
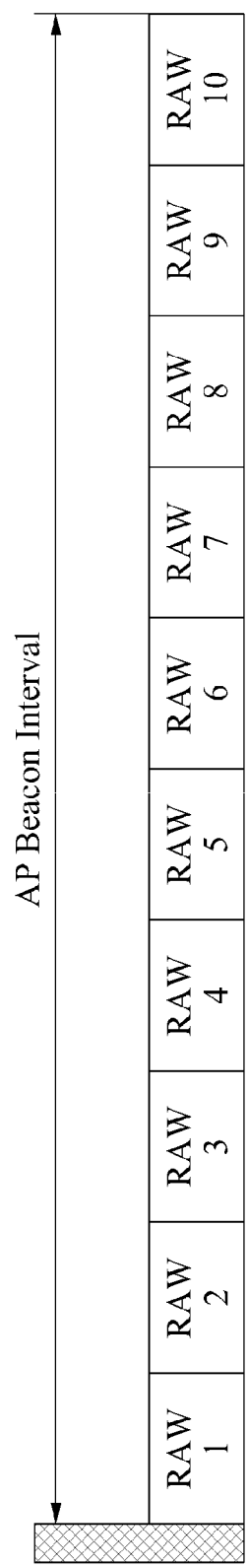
FIG. 13 illustrates more simplified leveled slot allocation according to an embodiment.

FIG. 13 illustrates more simplified leveled slot allocation according to an embodiment.

In a case in which a network configuration is changed relatively slightly, RAW and slot allocation performed by an AP may be more efficient to reduce overhead. For such a case, an example of a simplified leveled slot allocation method with less overhead will be described.

FIG. 13 illustrates a RAW configuration for simplified leveled slot allocation. An AP may determine a RAW structure based on the total number of STAs and relay numbers at a beginning of BSS generation. Each RAW may have the same length, and information on the RAW structure may include the following fields in a beacon frame of an Rt-AP.

Length of RAW
Total number of RAWs
RAW allocation bitmap (0: Empty RAW, 1: Allocated RAW)
RAW type Information (R-AP RAW, Rt-AP RAW, common RAW)

A RAW may be classified based on a RAW type. An R-AP RAW may indicate a duration in which an R-AP and an STA in a cluster may transmit and receive data exclusively. An Rt-AP RAW may indicate a duration for communication between an Rt-AP and an STA managed directly by the Rt-AP. A common RAW may indicate a duration commonly available for all nodes based on contention.

Figure 14:
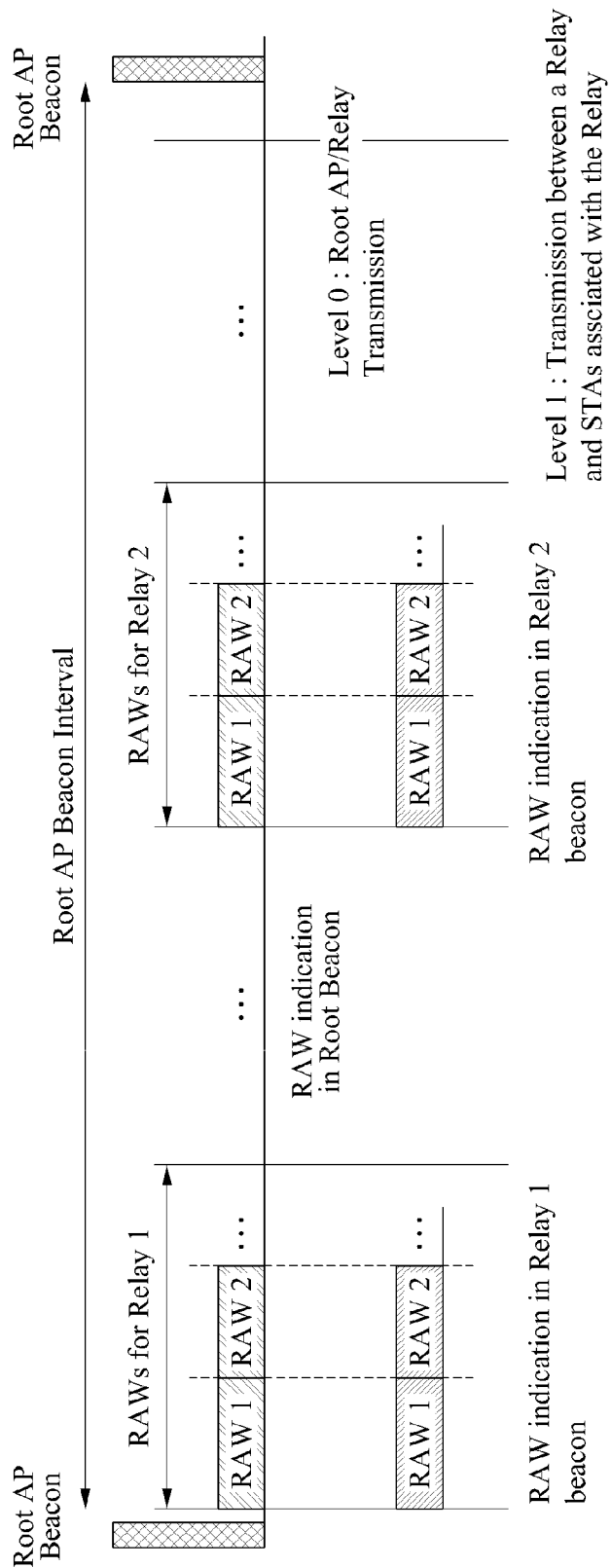
FIG. 14 illustrates a RAW allocation method for a relay in a case in which a plurality of relays is used according to an embodiment.

FIG. 14 illustrates a RAW allocation method for a relay in a case in which a plurality of relays is used according to an embodiment.

RAWs for a plurality of relays may be allocated in a beacon interval of a root AP. A single RAW or a number of RAWS may be allocated to a single relay. For example, for STA/relay/root AP transmission, a PS-Poll RAW for UL and DL resource allocation, a DL RAW, a UL RAW, or a DL/UL RAW for transmission between an STA and a relay, and a DL RAW, a UL RAW, or a DL/UL RAW for transmission between a root RP and a relay may be allocated as necessary using various combinations thereof. In a case in which STAs associated with the relay have different transmission intervals, RAWs for transmission between a plurality of relays/ STAs may be allocated in a single relay beacon interval.

A transmission duration for transmission from a root AP to another relay or another STA may also be allocated in a relay RAW group for a predetermined relay.

Since a relay may be used for transmission range extension, STAs associated with the relay may not receive a beacon of the root AP and may not obtain information on a RAW allocated by the root AP. Thus, each relay may receive a root beacon from the root AP, and transfer, to STAs associated with the corresponding relay, RAW allocation information related to the corresponding relay and slot allocation information to be used for level-1 transmission that are included in the root beacon. The relay may extract necessary information from the information included in the root beacon, rather than transferring the information included in the root beacon. The relay may transmit the extracted information including additional slot allocation information for level-1 transmission. Thus, a length of a relay beacon to be transmitted by the relay to an STA may be shorter than a length of the root beacon.

The root AP may include, in the root beacon, RAW allocation information with respect to level-0 transmission, and transmit the root beacon. The level-0 transmission may include, for example, transmission between the root AP and the relay, and transmission between the root AP and an STA directly associated with the root AP.

The relay may receive a root AP beacon from the root AP, and identify RAW allocation information of the root AP from the root AP beacon. The relay may include, in a relay beacon, RAW allocation information necessary for an STA associated with the relay, and transmit the relay beacon to the STA. For example, the RAW allocation information necessary for the STA may include RAW and slot allocation information for transmission between the relay and the STA, and information on a duration in which transmission between the root AP and the relay is performed. The STA associated with the relay may receive the relay beacon, and determine when data is to be transmitted, based on the received relay beacon.

Figure 15:
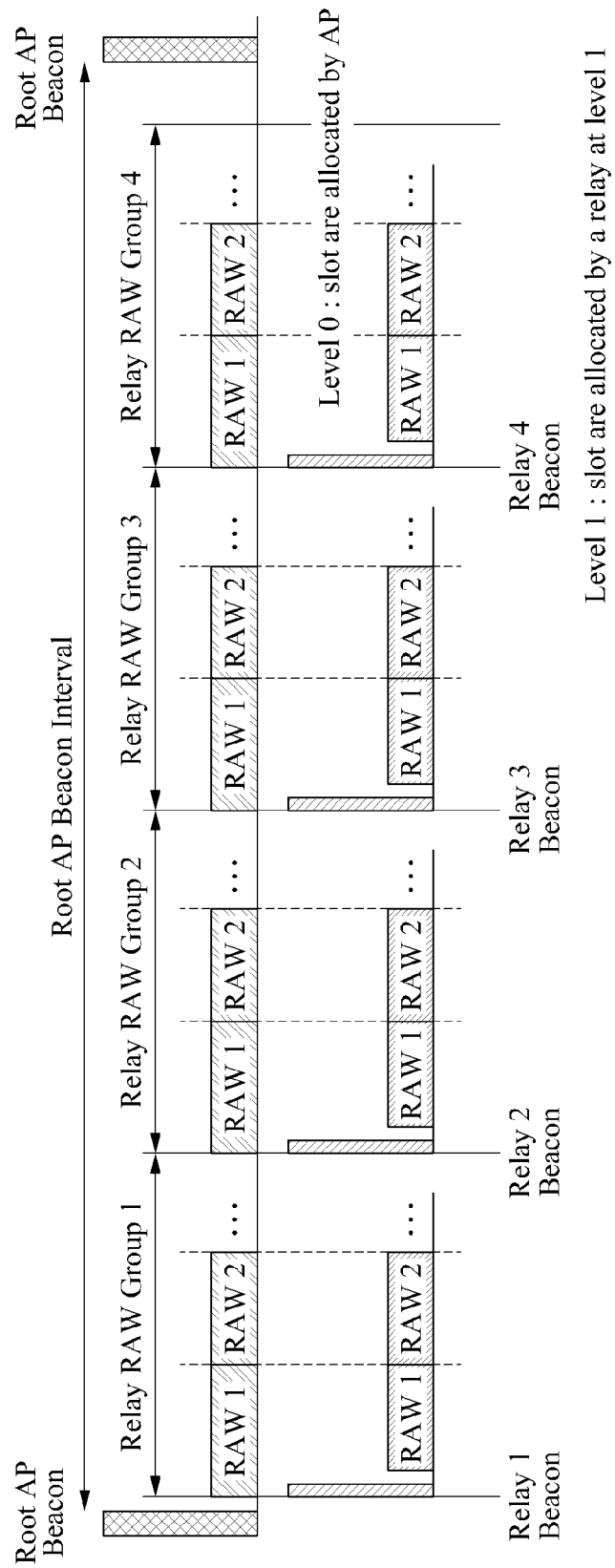
FIG. 15 illustrates an example of a RAW allocation method in a case in which a plurality of relays is used according to an embodiment.

FIG. 15 illustrates an example of a RAW allocation method in a case in which a plurality of relays is used according to an embodiment.

In FIG. 15, a relay RAW group may indicate RAWs allocated to a single relay. In the example of FIG. 15, a beacon of each relay may be transmitted at a point in time at which a first RAW for the corresponding RAW group starts. The relay may allocate a first RAW immediately subsequent to transmission of each relay beacon as a PS-Poll RAW. An STA may transmit a PS-Poll and a UDI to a relay which the STA is associated with. To optimize a UL RAW and a DL RAW for transmission between the root AP and the relay and transmission between the relay and the STA, the relay may transmit the PS-Poll and the UDI to the root AP.

Figure 16:
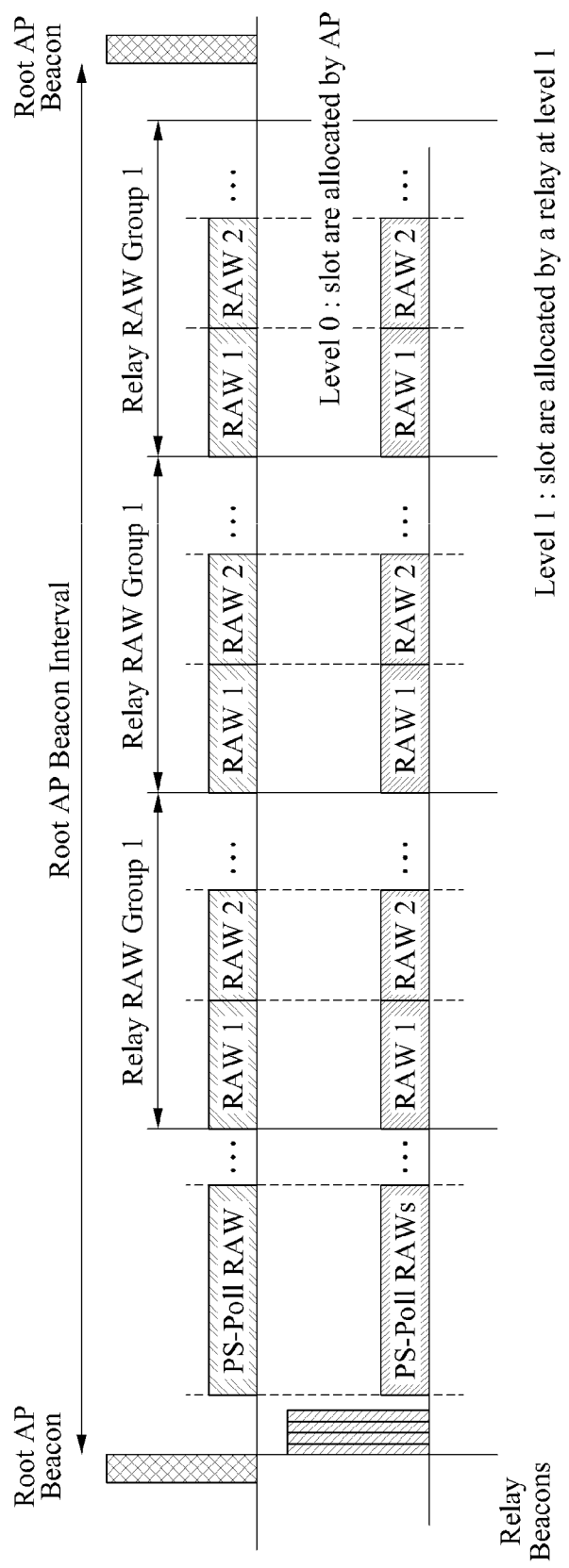
FIG. 16 illustrates an example of a RAW allocation method for a relay in a case in which a plurality of relays is used according to another embodiment.

FIG. 16 illustrates an example of a RAW allocation method for a relay in a case in which a plurality of relays is used according to another embodiment.

In the example of FIG. 16, the point in time at which the relay beacon is to be transmitted in the example of FIG. 15 is changed to be immediately subsequent to transmission of a root AP beacon. Beacons of all relays allocated in a single beacon interval may be transmitted sequentially immediately after the root AP beacon is transmitted, and a first RAW starting subsequent thereto may be allocated as a PS-Poll duration for a number of relays.

In the example of FIG. 15, a PS-Poll duration may be allocated to each relay RAW group. However, in the example of FIG. 16, a single PS-Poll RAW may be used, and a PS-Poll and a UDI for all relay transmission may be transmitted in the PS-Poll RAW. In this example, a separate PS-Poll duration may not be allocated to each relay RAW group.

In this example, by setting a single PS-Poll RAW, a probability of waste of RAWs may be reduced in comparison to a case in which a separate PS-Poll RAW is allocated to each relay. In addition, an STA searching for a relay to be associated with may select an optimal relay within a relatively short time since beacons of relays may be transmitted sequentially immediately after a root AP beacon is transmitted.

The methods of transmitting a relay beacon described above, for example, the method (1) of transmitting a relay beacon at a point in time at which a RAW allocated to each relay starts in a case in which points in time at which relay beacons are to be transmitted are distributed, and the method (2) of transmitting a relay beacon of each relay subsequent to a root AP beacon and preventing each relay RAW from starting immediately subsequent to the corresponding relay beacon, may be selectively applied to other examples. The distributed relay beacon transmission method or the centralized relay beacon transmission method may be applicable to both examples of the method (A) using a DRAW and the resource allocation method (B) using resource allocation information.

In the method of transmitting relay beacons in a distributed manner, a relay RAW may not be immediately subsequent to a relay beacon. Based on relay RAW scheduling, the relay RAW may be allocated at a point in time far away from the relay beacon.

In the method of transmitting relay beacons in a centralized manner, relay beacons to be transmitted simultaneously may be transmitted safely by allocating a separate RAW for relay beacon transmission in a root AP beacon.

Figure 17:
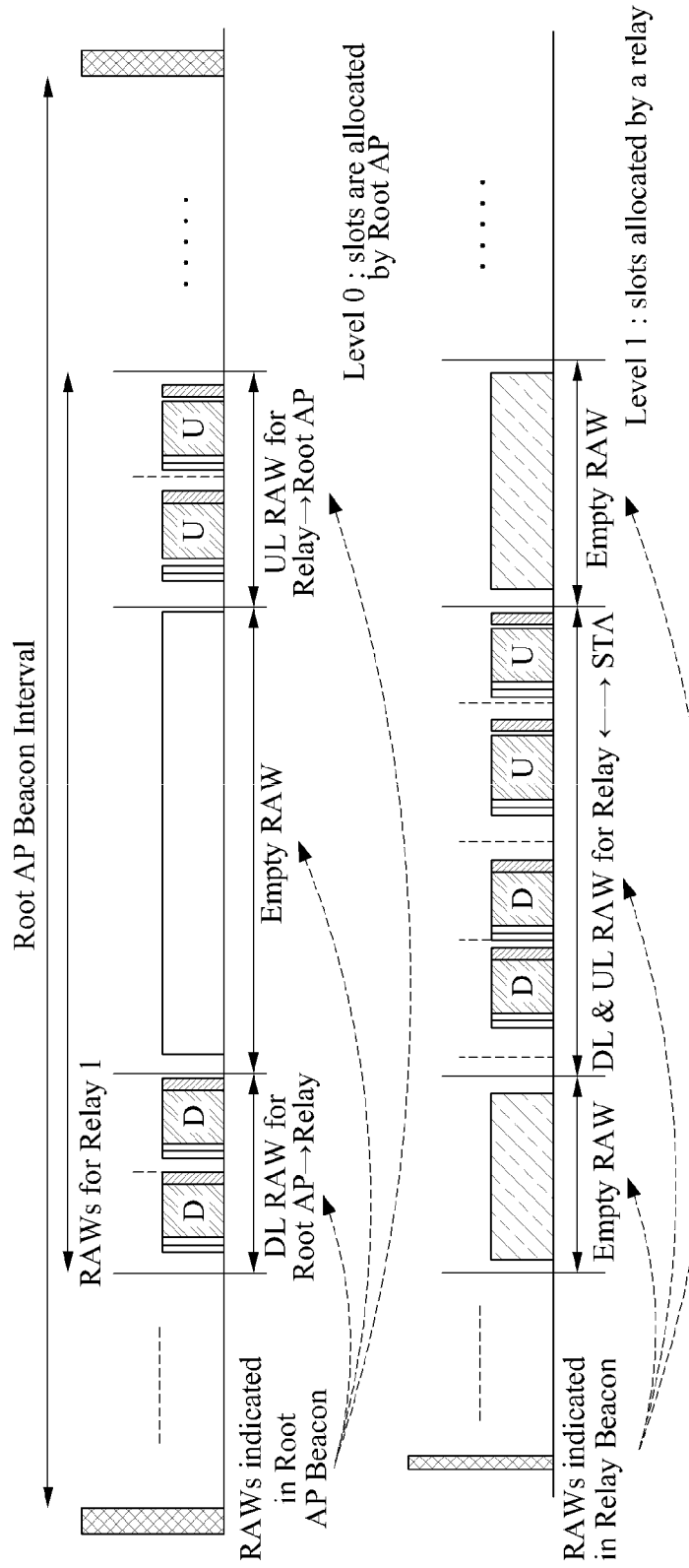
FIG. 17 illustrates a generalized example of a leveled slot allocation method according to an embodiment.

FIG. 17 illustrates a generalized example of a leveled slot allocation method according to an embodiment.

Referring to FIG. 17, allocation with respect to the entire RAW may be performed by a root AP, and allocation information on the entire RAW may be provided through a root beacon. A slot for a RAW corresponding to level-0 transmission may be allocated by the root AP. The RAW for the level-0 transmission may be allocated by the root AP as an empty RAW or as an empty slot, and detailed slot allocation may not be performed. Hereinafter, the empty RAW may also be referred to as a delegated RAW, and the empty slot may also be referred to as a delegated slot. In the empty RAW or the empty slot of the root beacon, a duration for transmission between a relay and an STA may be indicated. Based on the duration, occurrence of collisions may be prevented. The collisions may occur when another STA transmits data in a transmission duration between the relay and the STA. The slot for the level-1 transmission, for example, the transmission between the relay and the STA, may be allocated by the relay, and information on the allocated slot may be included in a relay beacon.

In the relay beacon, slot allocation information of a RAW for level-0 transmission may be omitted. In the relay beacon, the RAW for the level-0 transmission may be indicated as an empty RAW or an empty slot. In the empty RAW or the empty slot of the relay beacon, a transmission duration between the relay and an AP may be indicated, and the transmission duration may prevent an STA associated with the relay from transmitting data while the transmission between the relay and the AP is being performed. The STA associated with the relay may receive the RAW allocation information of the relay beacon, and may not receive the root beacon.

In FIG. 17, a RAW for relay transmission may include a DL RAW in which data is transmitted from the root AP to the relay, a DL and UL RAW between the relay and an STA, and an UL RAW in which data is transmitted from the relay to the root AP. The DL and UL RAW may indicate a RAW in which both DL transmission and UL transmission are possible in a single RAW. The RAW configuration of FIG. 17 may be provided as an example, and other combinations may also be possible.

The root AP may allocate slots for the DL RAW and the UP RAW. The root AP may set the DL and UL RAW between the relay and the STA as an empty RAW. The root AP may include, in a root AP beacon, RAW allocation information on the DL and UL RAW between the relay and the STA, and transmit the root AP beacon.

The relay may receive the root AP beacon, and allocate slots for the DL and UL RAW between the relay and the STA set by the root AP as the empty RAW. The relay may set the DL RAW and the UL RAW as empty RAWs. The relay may include RAW allocation information in a relay beacon, and transmit the relay beacon.

The relay may perform UL or DL transmission with the root AP based on slot allocation information of the root AP in the DL RAW and the UL RAW that is identified through the root AP beacon.

An STA associated with the relay may perform UL or DL transmission with the relay based on information on slots allocated in the DL and UL RAW between the relay and the STA that is identified through the relay beacon.

A RAW subsequent to the transmission of the root AP beacon and the relay beacon may be allocated as a PS-Poll RAW. The STA may transmit a PS-Poll and a UDI to the relay, and the relay may transmit the PS-Poll and the UDI to the root AP, whereby the UL RAW and the DL RAW for transmission between the root AP and the relay and transmission between the relay and the STA may be optimized.

Figure 18:
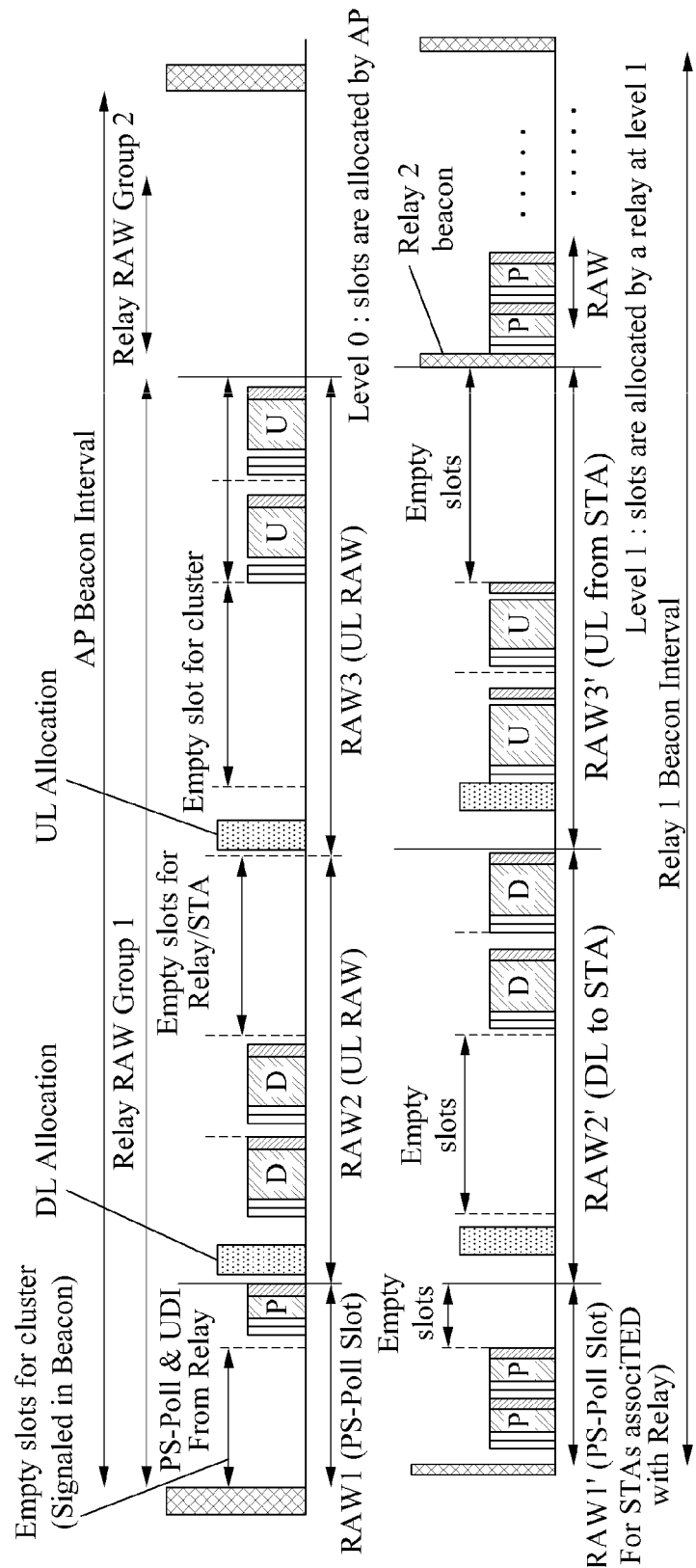
FIG. 18 illustrates an example of a leveled slot allocation method using an empty slot according to an embodiment.

FIG. 18 illustrates an example of a leveled slot allocation method using an empty slot according to an embodiment.

In the example of FIG. 18, each relay RAW group may include a combination of a PS-Poll RAW, a DL RAW, a UL RA, and a UL/DL RAW.

Each STA may transmit a PS-Poll and a UDI to a relay immediately after a root beacon and a relay beacon are transmitted. The relay receiving the PS-Poll and the UDI may identify an amount of UL data of the STA and resource allocation requirements, and transmit the PS-Poll and the UDI to a root AP based on the identified amount of UL data and the resource allocation requirements.

A duration in which the STA transmits the PS-Poll and the UDI to the relay may be set and protected as an empty slot at a level 0, and a duration in which the relay transmits the PS-Poll and the UDI to the AP may be set and protected as an empty slot at a level 1.

The root AP may receive the PS-Poll and the UDI, and adjust slot allocation to be used for UL and DL transmission of the STA and the relay. The root AP may adjust DL slot allocation with respect to the level 0 and the level 1 based on PS-Poll information at a start point of a RAW 2. The root AP may provide slot allocation information at the level 0 by transmitting a DL allocation frame. The DL allocation frame may include the slot allocation information at the level 0. In the DL allocation frame, the level-1 transmission duration is allocated as an empty slot. The relay may receive the slot allocation information from the root AP, and indicate the slot allocation information at the level 0 as an empty slot, rather than including the slot allocation information at the level 0. The relay may allocate slots during the duration allocated by the root AP as an empty slot at the level 0, and transmit the slot allocation information through the DL allocation frame at the level 1.

The STA may receive DL allocation information, and identify a slot allocated to the STA based on the DL allocation information.

Similarly, the root AP may adjust slot allocation at the level 0 and the level 1 using UDI information and a UL allocation frame with respect to an UL RAW.

The empty slot may be indicated in a DL or UL allocation frame or a RAW parameter set information element (RPS IE) included in a beacon. An RPS IE of a root beacon may indicate a relay allowed to perform transmission in a relay RAW group.

Figure 19:
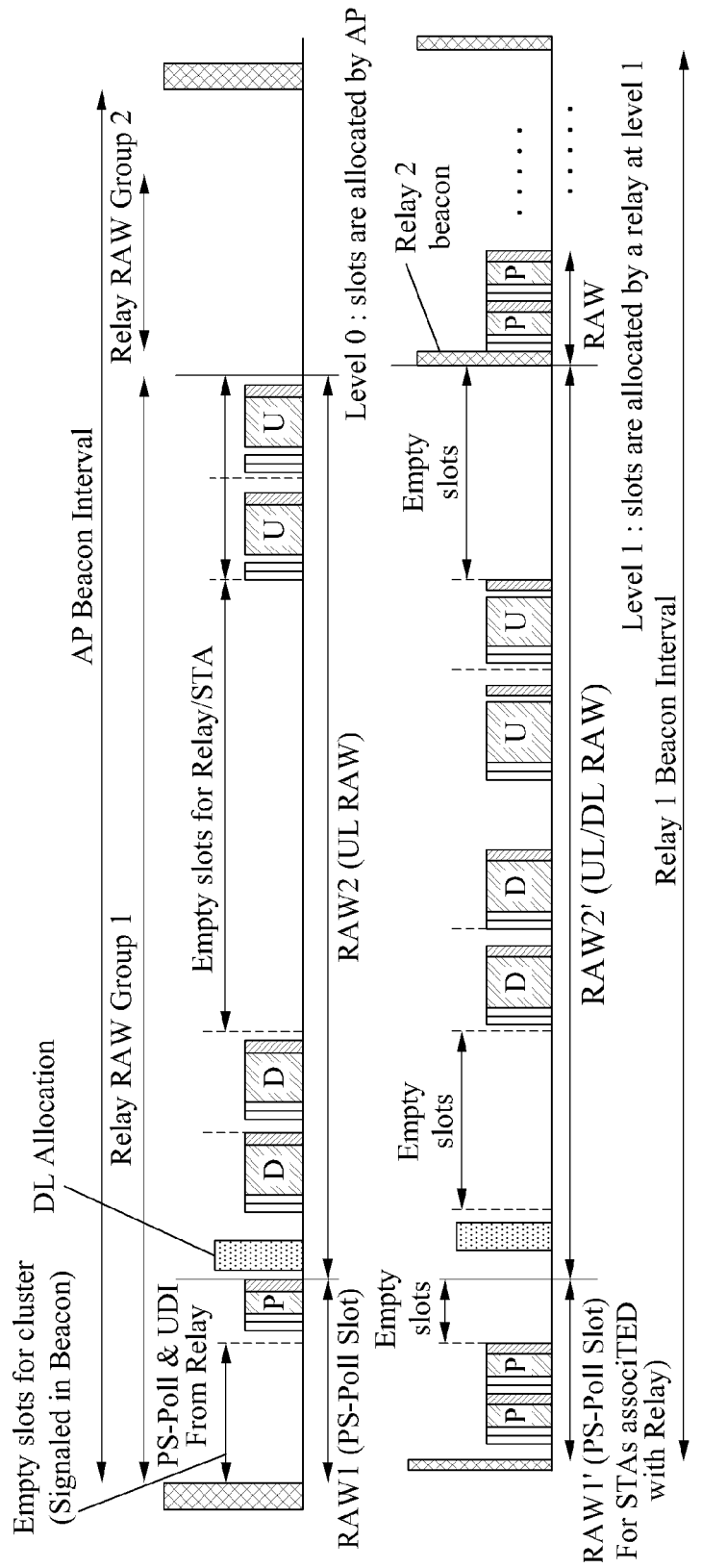
FIG. 19 illustrates an example of a leveled slot allocation method using an empty slot according to another embodiment.

FIG. 19 illustrates an example of a leveled slot allocation method using an empty slot according to another embodiment.

FIG. 19 illustrates an example of allocating a DL RAW and a UL RAW as a single RAW, for example, a UL/DL RAW, rather than allocating the DL RAW and the UL RAW as separate RAWs. A root AP may transmit a UL/DL allocation frame to adjust DL and UL slot allocation based on a PS-Poll and a UDI received through a relay from an STA. In this example, since the DL RAW and the UL RAW may not be separated, the root AP may flexibly adjust and allocate a UL transmission duration and a DL transmission duration within the single RAW.

Figure 20:
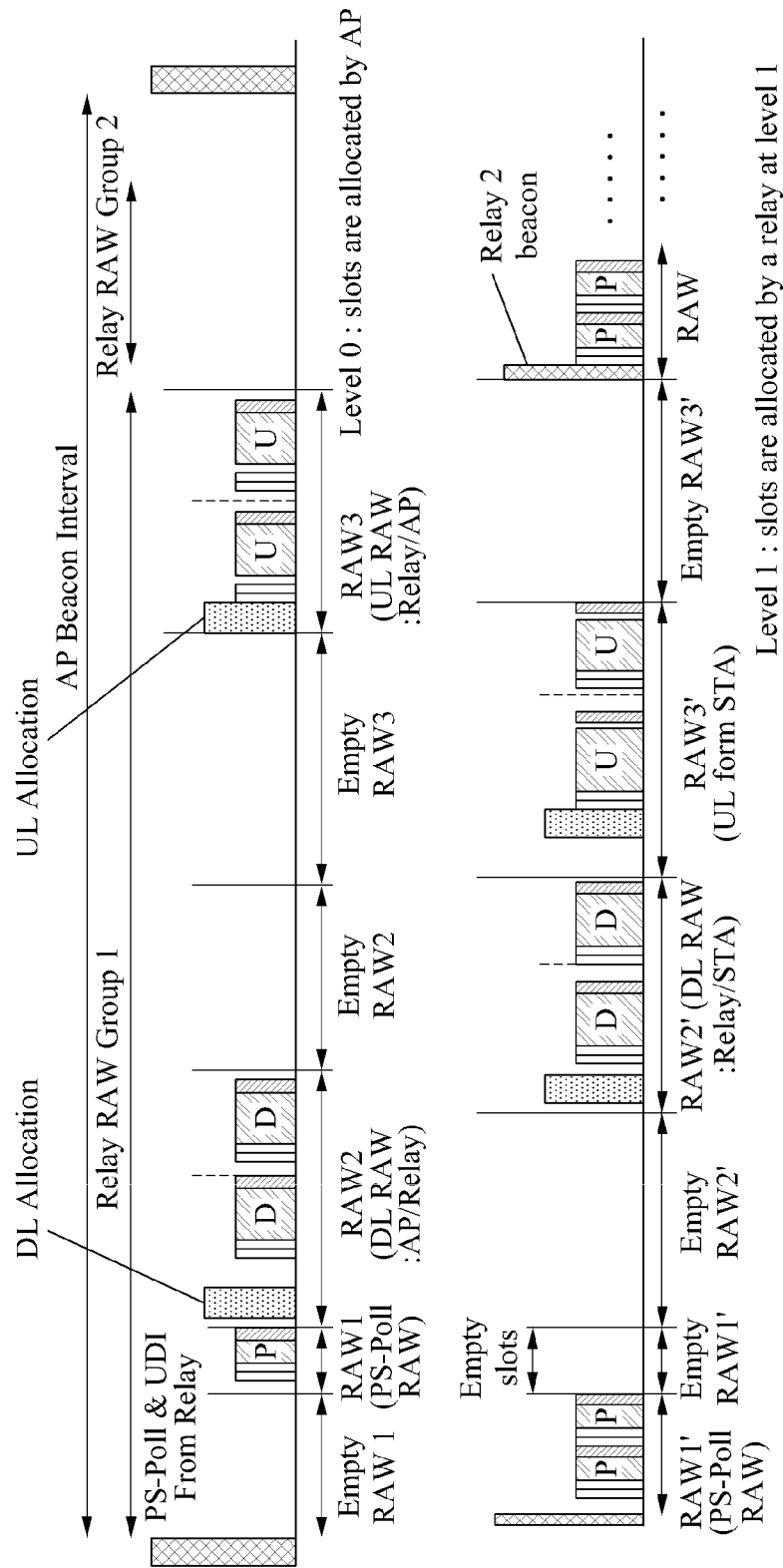
FIG. 20 illustrates an example of a leveled slot allocation method using an empty RAW according to an embodiment.

FIG. 20 illustrates an example of a leveled slot allocation method using an empty RAW according to an embodiment.

Referring to FIG. 20, each relay RAW group may include a combination of a PS-Poll RAW, a DL RAW, a UL RAW, and a UL/DL RAW, and an empty slot may be allocated to a single separate RAW.

Each STA may transmit a PS-Poll and a UDI to a relay immediately after a root beacon and a relay beacon are transmitted. The relay receiving the PS-Poll and the UDI may identify an amount of UL data of the STA and resource allocation requirements, and transmit the PS-Poll and the UDI to a root AP based on the identified amount of UL data and the resource allocation requirements.

A duration in which the STA transmits the PS-Poll and the UDI to the relay may be set and protected as an empty slot at a level 0, and a duration in which the relay transmits the PS-Poll and the UDI to the AP may be set and protected as an empty slot at a level 1.

The root AP may receive the PS-Poll and the UDI, and adjust slot allocation to be used for UL and DL transmission of the relay. The root AP may adjust DL slot allocation with respect to the level 0 based on PS-Poll information at a start point of a RAW 2. The root AP may provide the adjusted slot allocation information at the level 0 by transmitting a DL allocation frame including slot allocation information with respect to the level 0.

The relay may adjust DL slot allocation with respect to the level 1 based on the PS-Poll information received from the STA at a start point of a RAW 2'. The relay may provide the adjusted slot allocation information at the level 1 by transmitting a DL allocation frame including slot allocation information with respect to the level 1.

The relay may adjust UL slot allocation with respect to the level 1 based on the UDI information received from the STA at a start point of a RAW 3'. The relay may provide the adjusted slot allocation information at the level 1 by transmitting a UL allocation frame including slot allocation information with respect to the level 1.

The root AP may adjust UL slot allocation with respect to the level 0 based on the UDI information received from the relay at a start point of a RAW 3. The root AP may provide the adjusted slot allocation information at the level 0 by transmitting a UL allocation frame including slot allocation information with respect to the level 0.

An empty RAW may be indicated in an RPS IE included in a beacon. An RPS IE of a root beacon may indicate a relay allowed to perform transmission in a relay RAW group.

Figure 21:
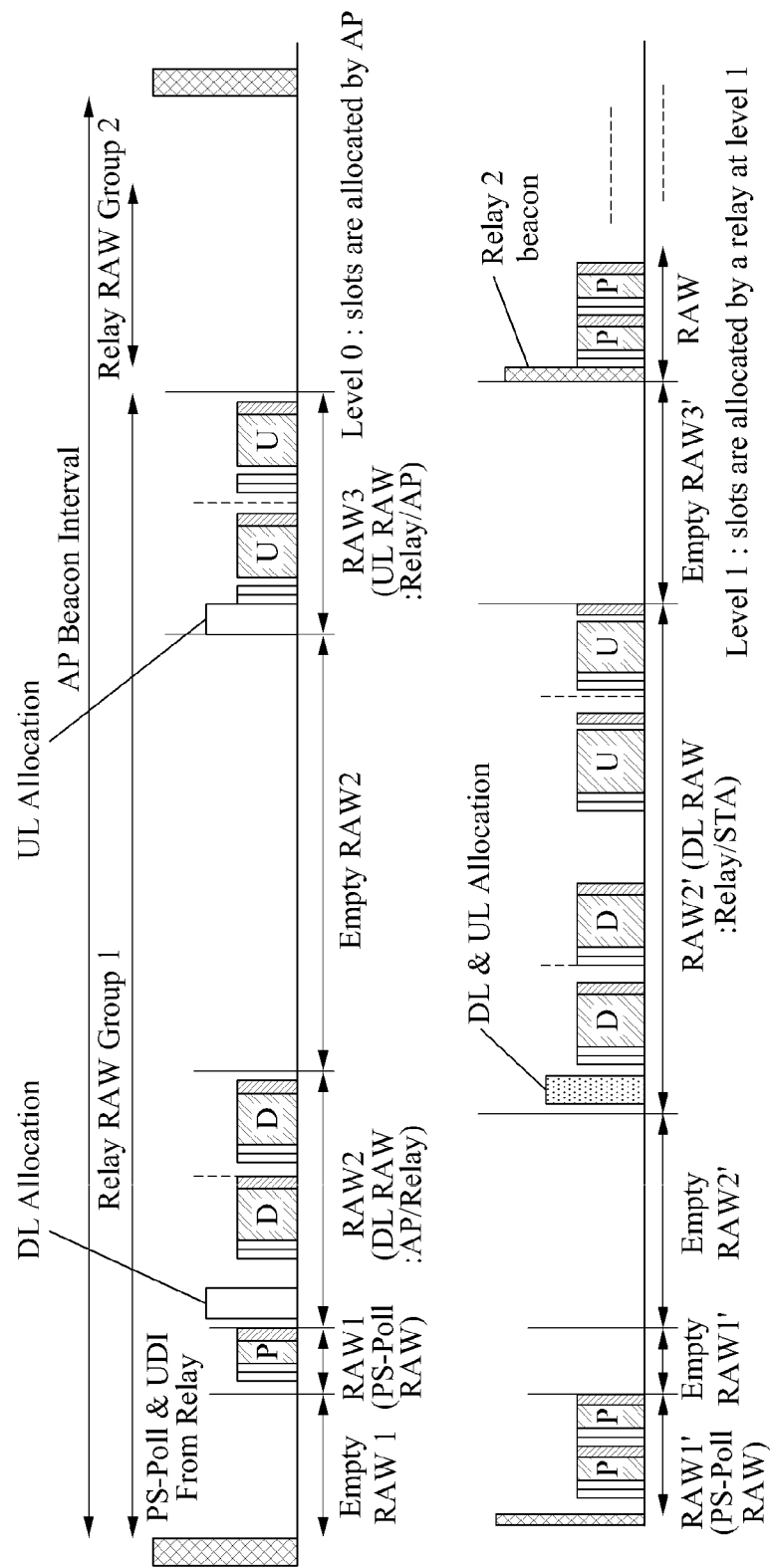
FIG. 21 illustrates an example of a leveled slot allocation method using an empty RAW according to another embodiment.

FIG. 21 illustrates an example of a leveled slot allocation method using an empty RAW according to another embodiment.

In FIG. 21, a transmission duration between a relay and an STA may be allocated as a single DL/UL RAW, in contrast to the example of FIG. 20 in which the transmission duration is divided into a DL RAW and a UL RAW. In this example, a DL allocation frame for the DL RAW and a UL allocation frame for the UL RAW may not be separated, and a DL and UL allocation frame including UL slot and DL slot information adjusted based on PS-Poll and UDI information of an STA may be transmitted at a start point of a RAW 2'.

By setting the DL/UL RAW as a single RAW, a UL slot and a DL slot for transmission between the STA and a relay may be allocated to be flexible, whereby the RAW may be utilized more efficiently. Transmission in a cluster in which transmission between the relay and the STA is performed may be performed more efficiently.

Figure 22:
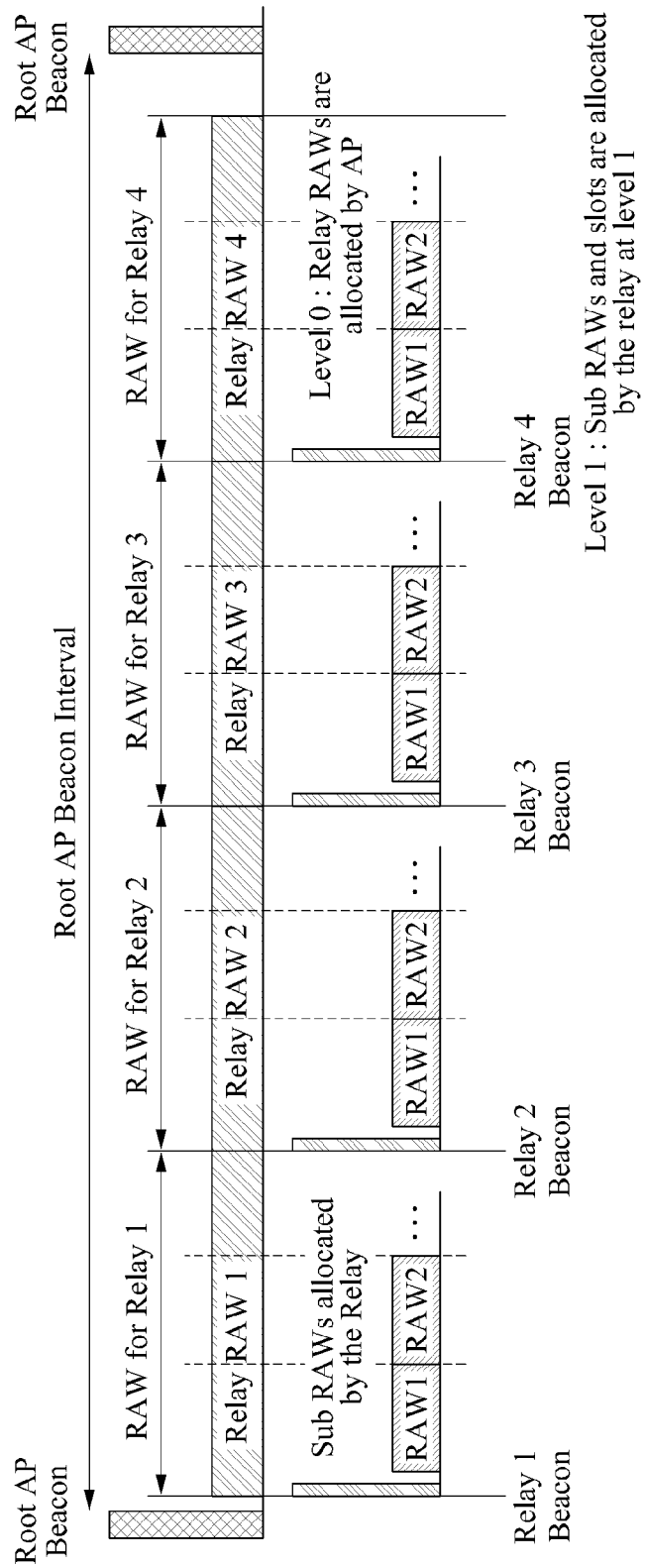
FIG. 22 illustrates an example of a leveled slot allocation method using a sub RAW according to an embodiment.

FIG. 22 illustrates an example of a leveled slot allocation method using a sub RAW according to an embodiment.

In the example of FIG. 22, a root AP may allocate a single RAW for single relay transmission, include RAW allocation information in a root AP beacon, and transmit the root AP beacon.

Each relay may divide a single relay RAW allocated to the corresponding relay into sub RAWs, include sub RAW allocation information in a relay beacon, and transmit the relay beacon.

The root AP and an STA associated with the relay may determine, based on the sub RAW allocation information included in the relay beacon, when transmission between the STA and the relay and transmission between the relay and the AP are performed.

Figure 23:
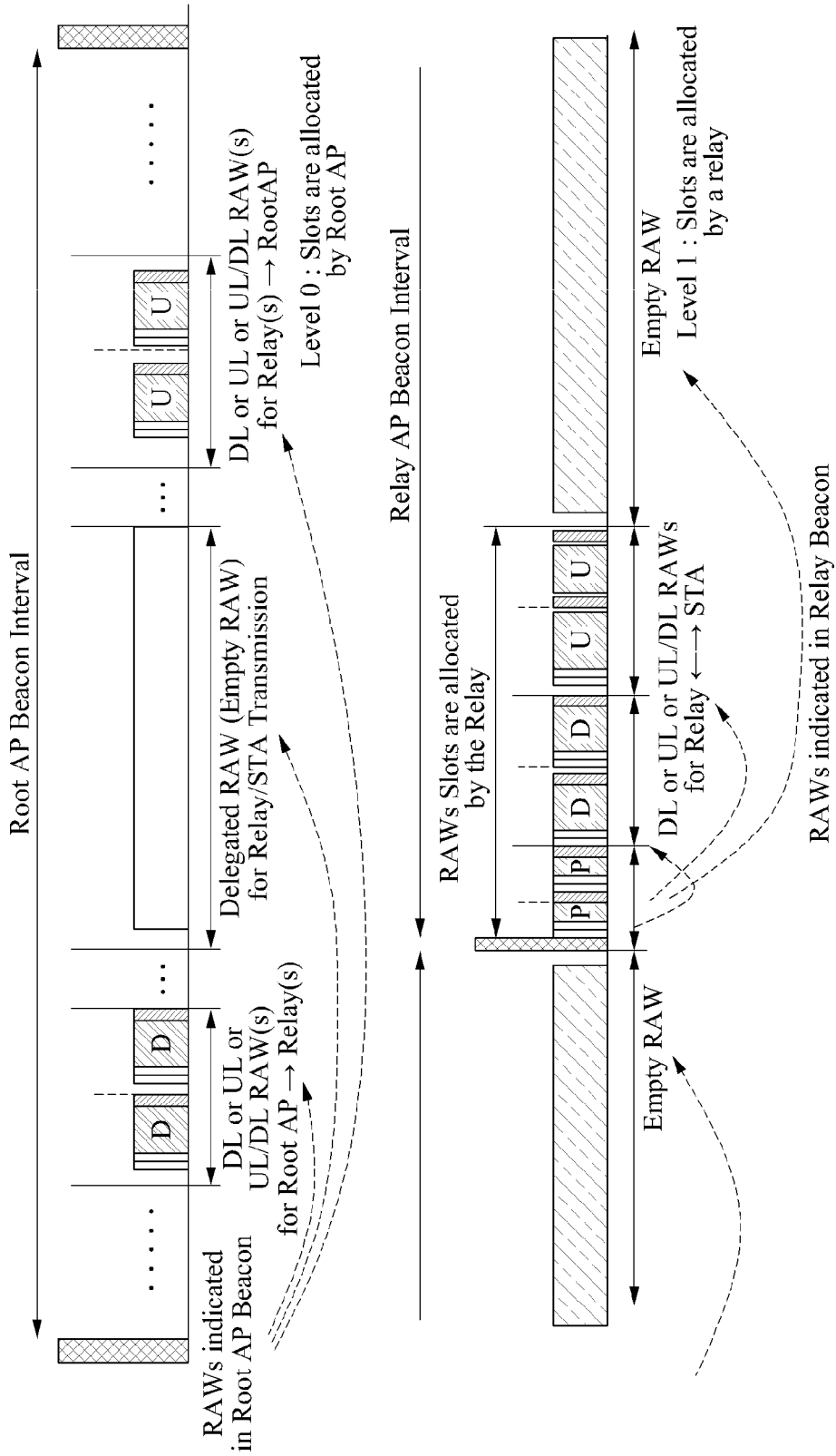
FIG. 23 illustrates a generalized example of a leveled slot allocation method according to another embodiment.

FIG. 23 illustrates a generalized example of a leveled slot allocation method according to another embodiment.

Although the example of FIG. 23 is similar to the example of FIG. 17, a transmission duration between a root AP and a relay may be allocated to an arbitrary duration in a form similar to transmission between a normal AP and an STA, rather than being subordinate to a transmission duration between the relay and an STA. The example of FIG. 23 is different from the examples related to FIG. 17 in that a relay beacon may be transmitted at a point in time at which or at a point in time before a DRAW to be used for transmission between the relay and the STA starts. The DRAW may correspond to an empty RAW at a level 0.

A RAW and slot in the transmission duration between the root AP and the relay, or a RAW and slot in a transmission duration between the root AP and an STA directly associated with the root AP may be allocated by the root AP. RAW and slot allocation information may be transmitted in a form of being included in a root AP beacon. In this example, the transmission duration between the root AP and the relay may be allocated to an arbitrary duration in a form similar to transmission between a normal AP and an STA, rather than being subordinate to the transmission duration between the relay and the STA. The transmission duration between the root AP and the relay and the transmission duration between the root AP and the STA directly associated with the root AP may be allocated to a single RAW, or allocated to separate RAWs respectively.

The root AP may allocate the transmission duration between the relay and the STA by indicating the transmission duration between the relay and the STA as a DRAW, and delegate detailed RAW/slot allocation to the relay. A root beacon may not include level-1 RAW/slot allocation information.

The root AP may allocate a single DRAW or a number of DRAWs for the transmission between the relay and the STA.

Based on a DRAW, a relay allowed to perform transmission in the corresponding DRAW, and a transmission allow duration may be identified. In the DRAW, data transmission between a relay that is specified to be allowed to perform transmission and STAs associated with the corresponding relay may be allowable in principle. Thus, collisions between STAs associated with different relays caused by an extended service range in a BSS may be prevented effectively.

For efficient use of a medium, transmission of an STA belonging to a root BSS may be prohibited with respect to a duration in which an empty RAW is explicitly set by the root AP, and allowed with respect to the other durations, among DRAW durations. In this example, to protect relay transmission, the following two methods may be employed.

<1. Protection Method with Respect to a Resource Allocated to Another Relay>

A root AP may verify whether a root BSS is spatially separated from another relay BSS. When the spatial separation is insufficient, the root AP may prohibit data transmission of an STA associated with the root AP by setting another relay transmission duration as an empty RAW or an AP power management (PM) RAW. The other relay transmission duration may correspond to a DRAW duration. In a duration not explicitly set as an empty RAW although the duration corresponds to a DRAW duration, an STA may transmit data. The root AP may prohibit transmission of a predetermined STA that is greatly affected by interference of the other relay BSS, among STAs in the root BSS, rather than prohibiting data transmission of all of the STAs in the root BSS with respect to the other relay transmission duration. In this example, a method using a modified empty RAW or a modified AP PM RAW that may indicate an STA explicitly prohibited from performing transmission, or a method of excluding an STA prohibited from performing transmission from a target to be allocated a transmission duration may be used.

The root AP may verify whether a predetermined STA in the root BSS is affected by interference of the other relay BSS, by receiving interference information of the STA using "a method of determining a spatial separation between (BB) relays", which will be described later, or by receiving, directly from an STA, information related to another STA or the other relay BSS that interferes with the STA. The STA affected by interference may be included in the root BSS and affected by interference of the other STA or the other relay BSS.

To prevent collisions occurring when an STA belonging to a relay BSS performs transmission in a transmission duration for another relay BSS using the same channel, the relay AP may prohibit transmission by setting the transmission duration of the other relay BSS as an empty RAW or an AP PM RAW. Data transmission of the STA in a duration not set as an empty RAW may be allowed.

The relay BSS may periodically verify whether the relay BSS is spatially separated from the other relay BSS. When it is verified that the spatial separation is insufficient, the relay BSS may prohibit data transmission of STAs associated with the relay BSS by setting another relay transmission duration as an empty RAW or an AP PM RAW.

The relay BSS may prohibit, with respect to the other relay transmission duration, data transmission of a predetermined STA greatly affected by interference of the other relay BSS, among STAs in the relay BSS, rather than prohibiting data transmission of all the STAs in the relay BSS. In this example, a method using a modified empty RAW or a modified AP PM RAW that may indicate an STA prohibited from performing transmission, or a method of excluding an STA prohibited from performing transmission from a target to be allocated may be used.

The relay AP may verify whether a predetermined STA in the relay BSS is affected by interference of the other relay BSS or another root BSS, by receiving interference information of the STA using "a method of determining a spatial separation between (BB) relays", or by receiving, directly from an STA, information related to another STA or the other relay BSS that interferes with the STA. The STA may be included in the relay BSS and affected by the interference of the other STA or the other relay BSS.

In a case in which there is a frame to be urgently transmitted by the root AP, transmission in a DRAW duration may be allowed as an exception. In level-1 transmission, an STA may be allowed to perform transmission, as an exception, in a duration (1) in which transmission being performed in the other relay BSS is not sensed, or in a duration (2) in which a RAW is not allocated within a duration allocated for transmission in the corresponding relay BSS when a beacon of another relay in which transmission is being performed is received, although the duration corresponds to a time duration not allocated to a relay which the STA belongs to.

An STA belonging to a root AP and an STA belonging to a relay may be allowed to perform transmission through contention, similar to transmission in a conventional overlapping basic service set (OBSS) environment, even in a duration in which transmission of the STAs to an AP is not allowed. However, since a probability of collisions may be relatively high in a case in which data is transmitted in a duration not allocated to a BSS which an STA belongs to, the STA may perform request to send (RTS)/clear to send (CTS) in advance of data transmission.

The relay or the root AP may explicitly prohibit transmission of STAs associated with the relay or the root AP by setting, as an empty RAW, a duration in which intense contention or collisions are expected, among transmission durations not allocated to the relay or the root AP. In addition, the relay AP may prohibit an STA from performing transmission to a relay in a duration in which transmission between the relay and the root AP is performed, by setting, as an empty RAW, the duration in which the transmission between the relay and the root AP is performed.

<2. Protection Method with Respect to a Resource Allocated to a Relay>

A relay may request a root AP to protect a resource allocated to the relay. In response to the request from the relay, the root AP may explicitly prohibit transmission of other predetermined relay BSSs or a portion of STAs in the other predetermined BSSs with respect to the resource allocated to the relay. The portion of the STAs may also include STAs in a root BSS. The resource allocated to the relay may include, for example, a transmission duration or a duration allocated by the root AP as a DRAW.

In an example, in a case in which a relay is seriously affected by interference caused by transmission of another relay BSS, predetermined STAs belonging to the other relay BSS, or STAs of the root BSS, and desires to prohibit the entire or a portion of the STAs of the other relay BSS from performing transmission in a transmission duration allocated to the relay, for example, in a case in which the relay desires protection, the relay may request the root AP to protect the resource allocated to the relay. When requesting the root AP to protect the allocated resource, the relay may transfer, to the root AP, a list of the other relay BSSs or the predetermined STAs of the relay BSSs that seriously interfere with the relay.

The relay AP may inform the root AP of a relay BSS or predetermined STAs interfering with the relay AP. In addition, each STA in the relay BSS may inform the relay AP of another relay BSS or predetermined STAs that seriously interfere with the corresponding STA, and the relay AP may transmit, to the root AP, information on the other relay BSS and the STAs that interfere with the STA. In this example, the STA may not require a measurement function specified in the 802.11k standards, and the like.

In a case in which STAs have the measurement function, the relay AP may request the STAs to perform a measurement, and identify another relay BSS or STA that interferes with an STA associated with the relay AP, based on a result of the measurement received from each STA. The relay AP may notify the identified relay BSS and the STA to the root AP.

In response to a resource protection request received from a relay, the root AP may indicate a relay BSS or predetermined STAs of the relay BSS strictly disallowed to perform transmission in a DRAW for the relay requesting the resource protection.

When the relay is included in a list of relays prohibited from performing transmission in a DRAW allocated to another relay BSS, the relay may not perform transmission in the transmission duration for the other relay BSS. The relay may explicitly prohibit transmission of an STA by allocating an empty RAW or AP PM RAW to the STA belonging to the relay, thereby protecting the resource of the relay. When in the DRAW is indicated that transmission with respect to a portion of STAs in a relay BSS, rather than the entire relay BSS, is prohibited, the relay may prohibit the predetermined designated STAs from performing transmission in the transmission duration of the corresponding relay BSS.

To prohibit transmission of a predetermined STA in the relay BSS, a method (1) using a modified AP PM RAW or a modified empty RAW, or a method (2) using RAW allocation may be employed. In the method (1), a relay may include, in the AP PM RAW or the empty RAW, an AID or partial AID list of STAs to be prohibited from performing transmission in a predetermined duration. The relay may explicitly disallow a prohibited STA to perform transmission in an AP PM RAW duration or an empty RAW duration, and allow remaining STAs to perform transmission through contention. In the method (2), the relay may disallow an explicitly prohibited STA to perform transmission by not allocating the prohibited STA to a RAW. The prohibited STA may correspond to an STA affected by interference of another relay.

In a case in which the relay is affected by interference of a predetermined STA in the root BSS and requests resource protection, the corresponding STA may not be included in a DRAW, and the root AP may prohibit the corresponding STA from performing transmission for the relay transmission duration.

When a DRAW is used, fields may be added to the DRAW, and a strictly disallow bit, and a list of relay APs and STAs may be indicated in the fields.

In a case in which information related to a strictly disallowed STA is indicated in the DRAW, a length of a beacon may overly increase. As another method, the root AP may collect information related to a relay AP and an STA to be strictly disallowed. The information related to the relay AP and the STA to be strictly disallowed may be received from the relay. The root AP may broadcast or unicast, to each relay using a separate frame, a message including the information related to the relay AP and the STA to be strictly disallowed for each relay BSS. The relay receiving the message may verify whether the relay or an STA associated with the relay is strictly disallowed in a transmission duration of another relay. When it is verified that the relay or the STA associated with the relay is strictly disallowed, the relay may not perform transmission in the transmission duration of the other relay.

A DRAW may be allocated periodically. In this example, a PRAW may be used. Since a relay beacon may be transmitted periodically at a point in time at which or before the DRAW starts, use of the PRAW may be suitable.

A transmission interval of the relay beacon may be determined through a negotiation between the relay and the root AP when the relay is associated with the root AP. The transmission interval of the relay beacon may be identical to a root AP beacon interval or a multiple of the root AP beacon interval.

The relay may receive the root beacon and verify whether a DRAW is allocated to the relay. In a case in which the DRAW is allocated to the relay, the relay may allocate a RAW/slot for transmission with STAs associated with the relay within a duration range allocated to the DRAW. The relay may verify, based on a TIM of the root beacon, whether the STAs associated with the relay include DL data. When DL data is received from the root AP, the relay may schedule DL transmission for an STA. When the relay transmits a relay beacon to an STA, the relay may inform the STA of RAW/slot allocation information and information regarding which STA includes DL data, through a TIM of the relay beacon. An STA associated with the relay may not confirm the root beacon, but may confirm the beacon of the relay which the STA is associated with.

The relay may receive a PS-Poll from an STA by enabling a PS-Poll RAW to be allocated immediately after the relay beacon is transmitted. In addition, the relay may receive UDI information from the STA and transmit a resource allocation frame, thereby adjusting initial RAW/slot allocation performed when the relay transmits the relay beacon.

The relay may utilize a DRAW allocated to the relay to be suitable for transmission with an STA associated with the relay through proper RAW/slot allocation. In this example, standards identical to those for general RAW/slot allocation may be used in a method of allocating a RAW/slot within the DRAW.

In a case in which an STA transmits data in a duration other than a DRAW in which transmission between the relay and the STA is guaranteed by the root AP, a collision with transmission of an STA associated with another relay or transmission between the relay and the root AP may occur.

The relay may disallow STAs associated with the relay to perform transmission in the duration other than the DRAW duration allocated to the relay, thereby preventing collisions in the BSS. In this example, transmission of an STA may be allowed in a duration in which the transmission of the STA is explicitly allowed, and may be disallowed in remaining durations, in RAW/slot allocation of the DRAW. In an example, 1 bit may be used to indicate whether transmission is to be prohibited in durations other than the DRAW duration in which the transmission of the STA is allowed.

As another method, among durations other than a DRAW, a duration in which STAs associated with the relay are strictly disallowed to perform transmission may be explicitly allocated as a RAW, and prohibition of the transmission may be informed through the RAW. Such a RAW may be referred as an empty RAW at a level 1. All durations other than the DRAW may be allocated as empty RAWs, or a duration in which an STA is strictly disallowed to perform transmission, among the durations other than the DRAW, may be allocated as an empty RAW. In an example, 1 bit that indicates whether a RAW corresponds to an empty RAW, for example, a RAW in which transmission is prohibited, may be allocated to the RAW. A start point at which transmission is disallowed and a duration in which transmission is disallowed may be signaled by a start time and a duration of the RAW.

In a duration, corresponding to an empty RAW, in which transmission is not explicitly prohibited, an STA belonging to the relay may perform transmission as an exception in a duration in which transmission being performed in another relay BSS is not sensed, or in a duration in which a RAW is not allocated within a duration allocated for transmission in the other relay BSS when a beacon of the corresponding relay is received.

As still another method, STAs belonging to the relay may perform transmission through contention, similar to transmission in a conventional OBSS environment, even in a duration in which transmission of the STAs to an AP is not allowed. Since a probability of collisions may be relatively high in a case in which transmission is performed in a duration not allocated to a BSS which an STA belongs to, the STA may perform RTS/CTS in advance of data transmission.

The relay or the root AP may explicitly prohibit transmission of STAs associated with the relay or the root AP by setting, as an empty RAW, a duration in which intense contention or collisions are expected, among transmission durations not allocated to the relay or the root AP.

In addition, the relay AP may prohibit an STA in the relay from performing transmission to the relay by allocating, as an empty RAW, a duration in which transmission between the relay and the root AP is performed.

The relay may sleep for power saving in a duration in which transmission between the relay and the root AP is not performed, among durations in which transmission of an STA associated with the relay is prohibited. In addition, the root AP may sleep for power saving in a duration in which transmission with an STA or a relay directly associated with the root AP is not performed, among DRAW durations. The relay may wake for a DRAW duration allocated to the relay.

Figure 24:
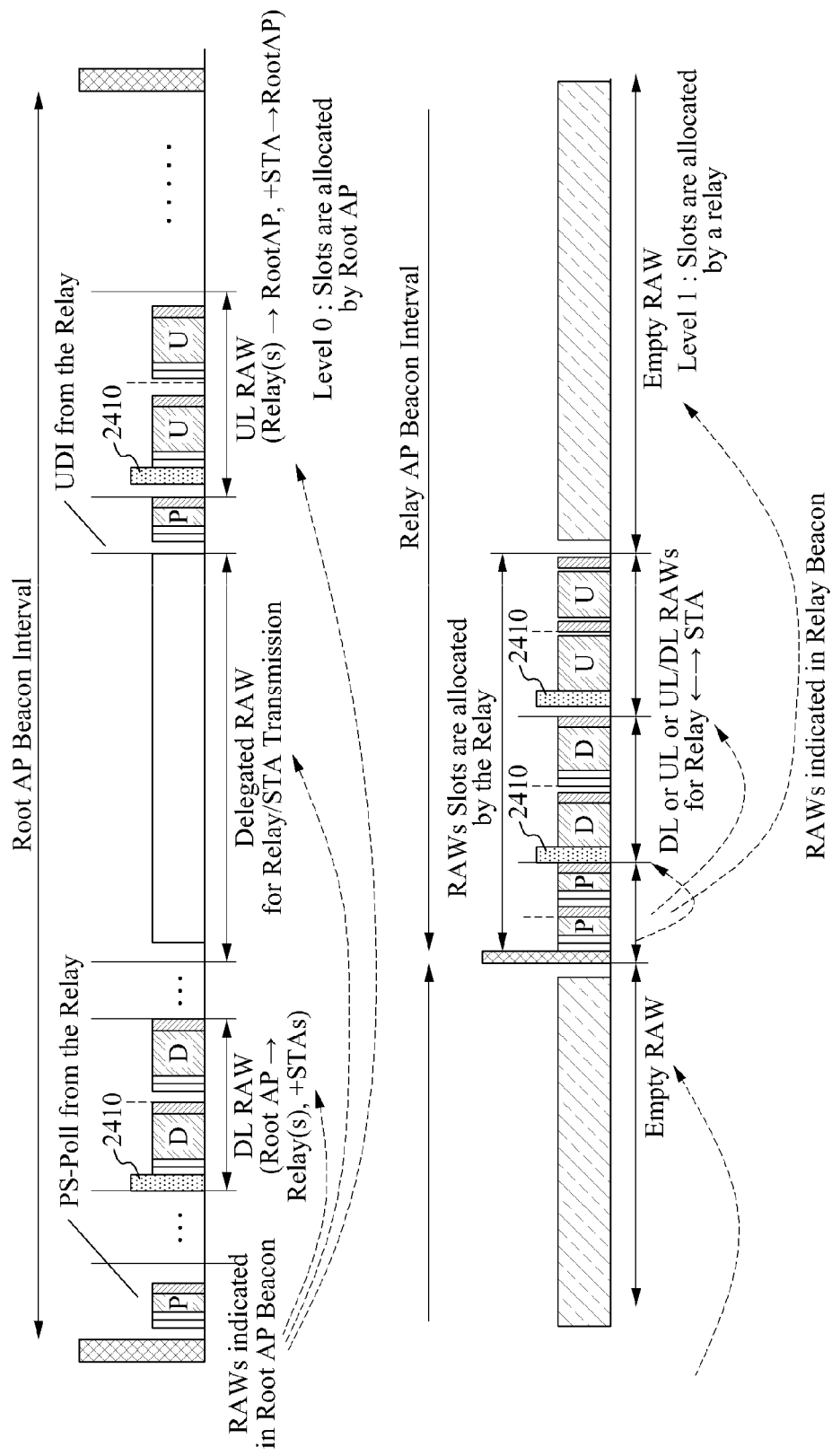
FIG. 24 illustrates an example of a leveled slot allocation method using a delegated restricted access window (DRAW) according to an embodiment.

FIG. 24 illustrates an example of a leveled slot allocation method using a DRAW according to an embodiment.

Referring to FIG. 24, a DRAW at a level 0 may be disposed to be adjacent to a DL RAW and a UL RAW, and DL transmission in an order of a root AP, a relay, and an STA and UL transmission in an order of an STA, a relay, and a root AP may be performed sequentially. In such disposition of the RAW, a transmission delay may be relatively modest since an STA may receive DL data and immediately transfer response UL data to the root AP consecutively in a case in which DL transmission from the root AP to the corresponding STA is performed.

The relay may receive a root beacon, verify whether data transferred by the relay is present, based on a TIM, and transmit a PS-Poll based on a result of the verification. The root AP may receive the PS-Poll from the relay, and transmit a resource allocation frame 2410 to optimize RAW/slot allocation.

The relay may receive a PS-Poll and a UDI from the STA after a relay beacon is transmitted, and optimize a UL RAW and a DL RAW in a relay transmission duration corresponding to a DRAW duration allocated by the relay.

The relay may transfer, to the root AP, a size of UL data received from the STA in a form of a UDI before transmitting UL data to the root AP, and the root AP may optimize the UL RAW at the level 0 using the resource allocation frame.

Figure 25:
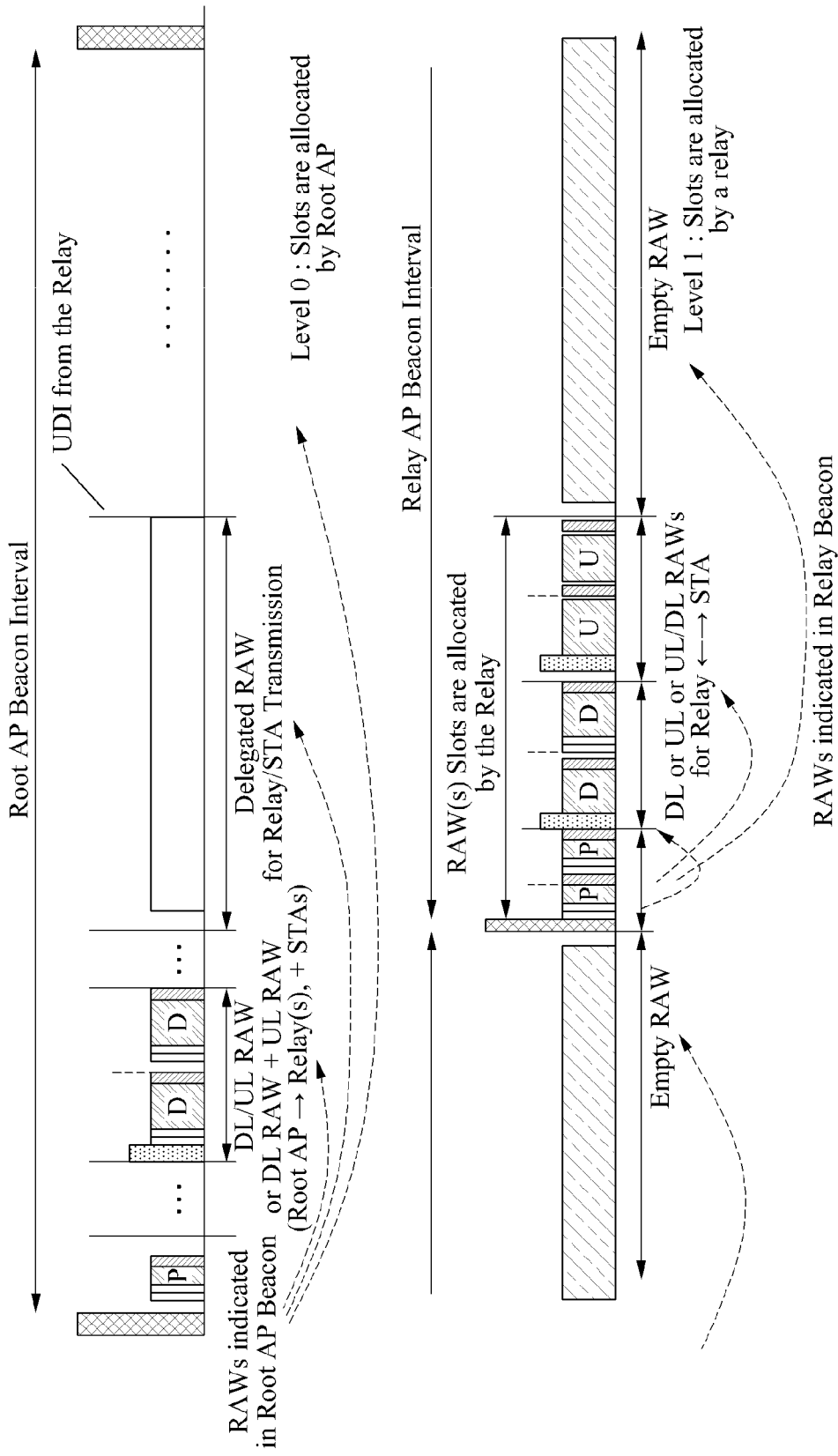
FIG. 25 illustrates another example of a leveled slot allocation method using a DRAW according to an embodiment.

FIG. 25 illustrates another example of a leveled slot allocation method using a DRAW according to an embodiment.

In FIG. 25, transmission may be performed in an order different from the transmission order shown in FIG. 24. Referring to FIG. 25, an STA may receive DL data from a root AP through a relay. When the STA transmits UL data to the relay, the relay may transmit the UL data in an UL RAW to be allocated when a subsequent root beacon is transmitted, or transmit the UL data in a UL/DL RAW, rather than immediately transmitting the UL data to the root AP. In this example, the relay may not immediately transmit the UL data to the root AP and may store the UL data. When a subsequent root beacon is received and the relay transmits a PS-Poll to the root AP, the relay may inform the root AP of a size of the UL data received from the STA in a previous beacon duration, through a UDI. The root AP may optimize the UL/DL RAW for the relay by transmitting a single PS-Poll RAW and a single resource allocation frame.

The relay may transmit the UDI to the root AP prior to a point in time at which a subsequent root beacon is transmitted. Since the root AP may be aware of a size of the UL data from the relay based on the UDI received from the relay prior to the point in time at which the root beacon is transmitted, the root AP may allocate a UL RAW with an optimized length from the beginning when the root beacon is transmitted. In this example, a delay may occur in transfer of UL data from the STA to a final destination. Thus, a memory to store the UL data may be needed.

Figure 26:
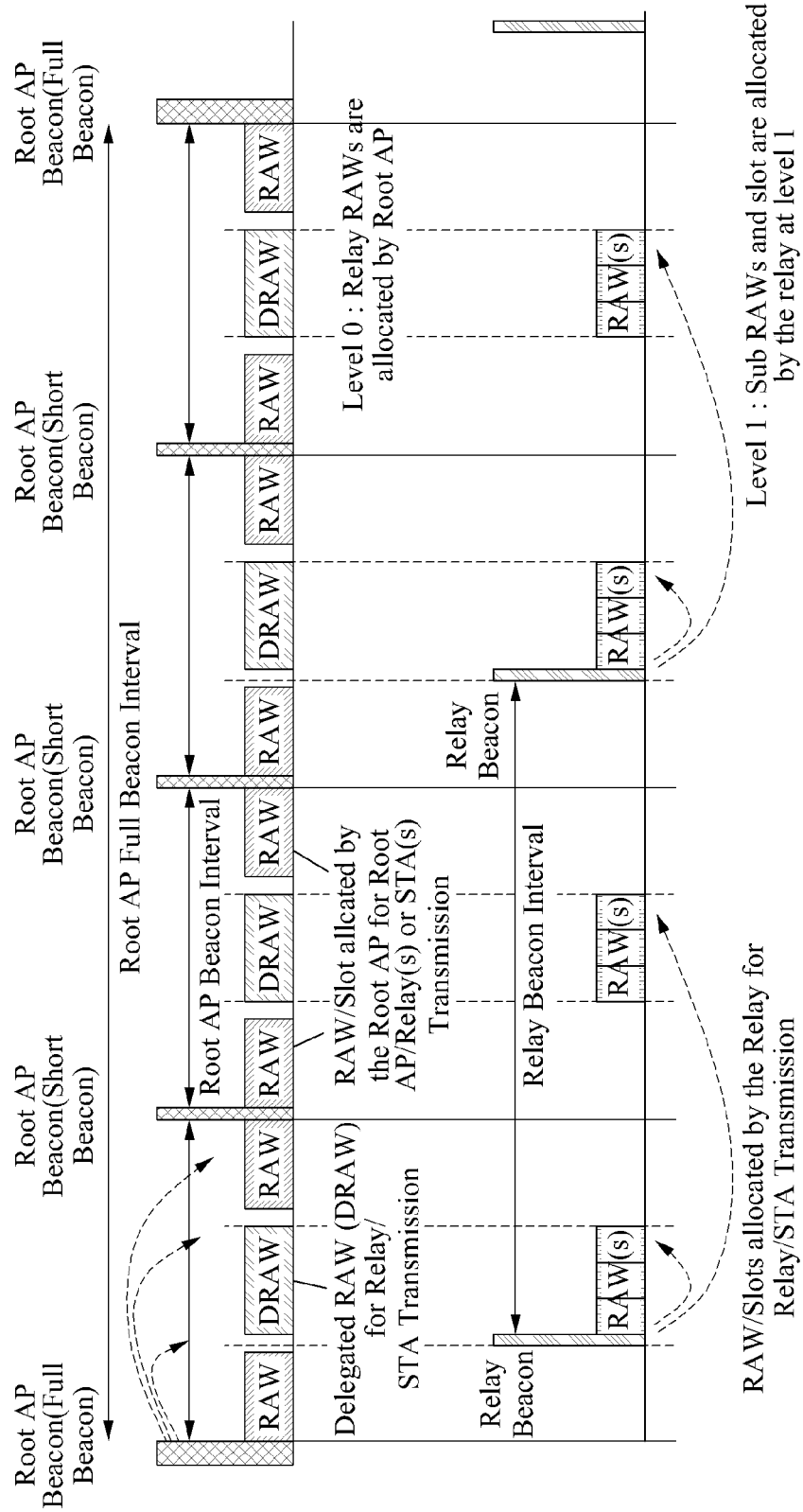
FIGS. 26 through 28 illustrate examples of a DRAW allocation method in a case in which a leveled slot allocation method is employed according to an embodiment.
Figure 27:
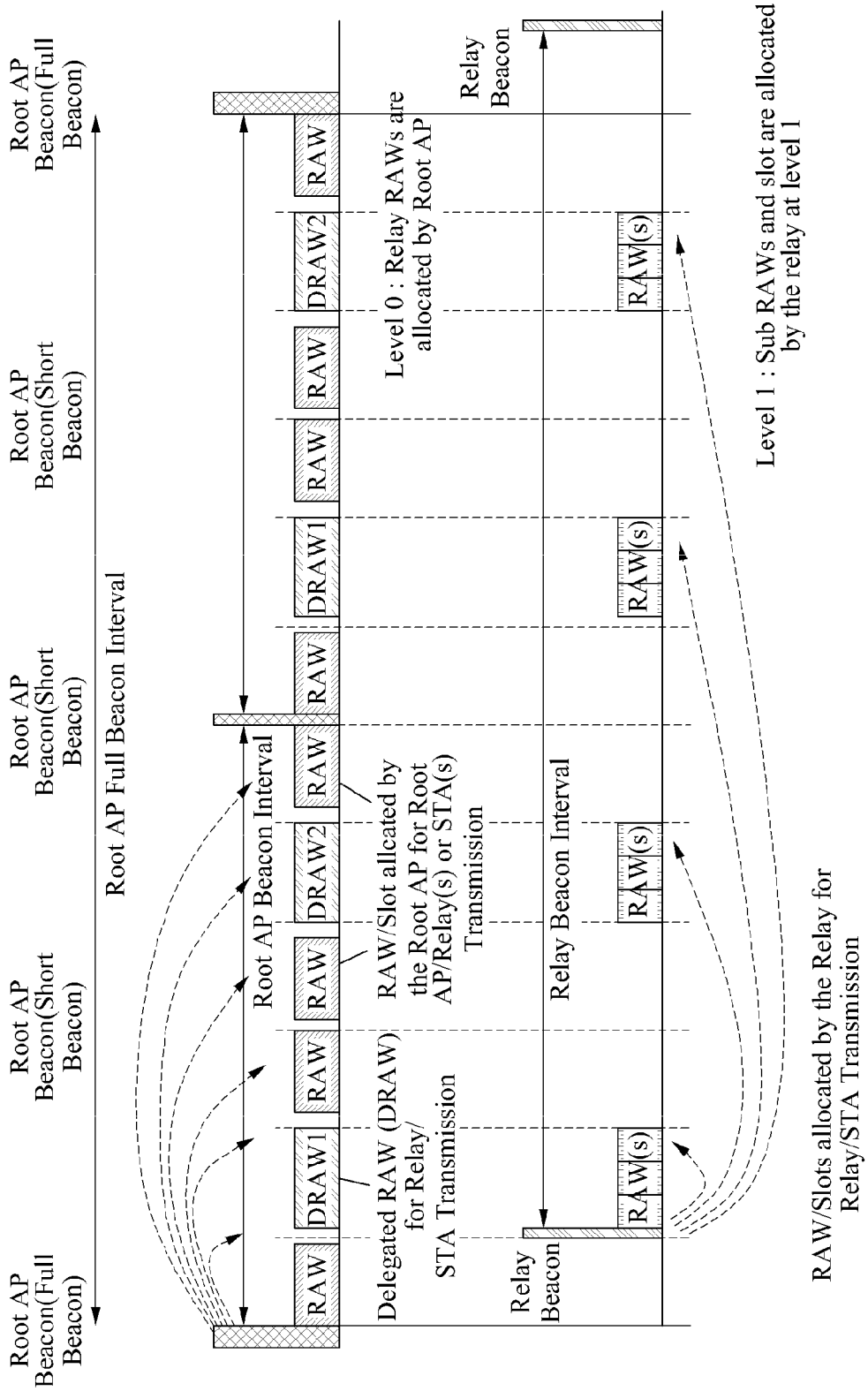
Figure 28:
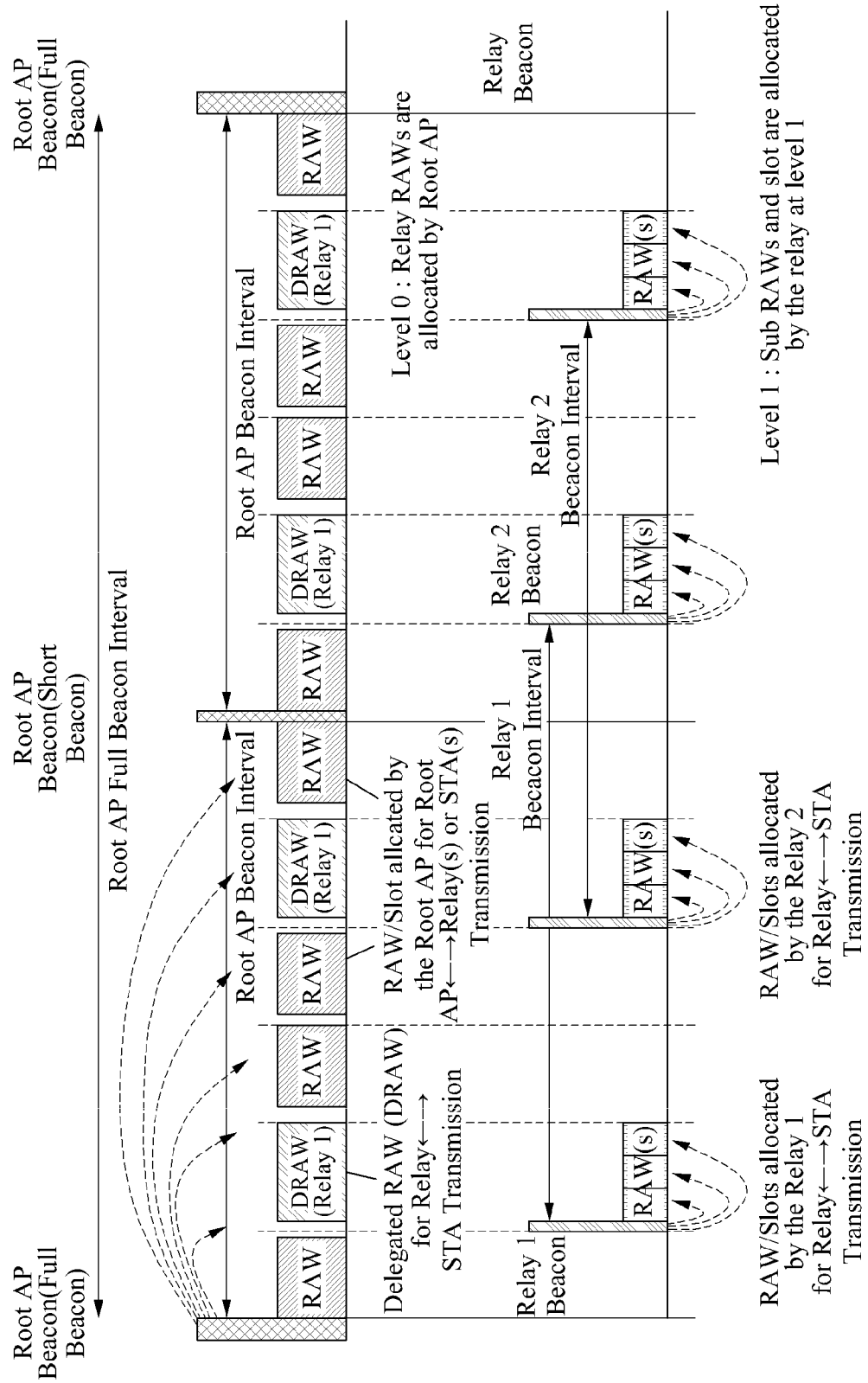

FIGS. 26 through 28 illustrate examples of a DRAW allocation method in a case in which a leveled slot allocation method is employed according to an embodiment.

FIGS. 26 through 28 illustrate examples of a DRAW allocation method in a case in which the leveled slot allocation method of FIG. 23 is employed, and examples of a DRAW allocation method in a case in which a relay beacon interval is different from a root beacon interval.

The relay beacon interval may not be identical to the root beacon interval. A relay may negotiate with the root AP about a relay beacon interval for transmission of an association request/response frame when the relay is associated with the root AP.

Since STAs associated with the relay may have different wake-up intervals, the relay may allocate a RAW at a higher frequency for a predetermined STA group although the same relay beacon interval is used. The root AP may allocate a DRAW to periodically guarantee transmission with respect to the STA group. The relay may transmit, to the root AP, information on a type of an STA, a traffic type of the STA, or a wake up/listen interval along with AID or partial AID information of the STA associated with the relay, when the relay is associated with the root AP. The root AP may allocate a DRAW based on the information received from the relay. In a case in which a service type of an STA associated with the relay is changed, or a new STA is associated with the relay, the relay may inform such a change to the root AP.

In FIG. 26, the root beacon interval may correspond to "3", the relay beacon interval may correspond to "6", and a single DRAW for a predetermined relay may be allocated at each root AP beacon interval. The relay may allocate RAWs/slots for STAs based on a DRAW duration allocated to the relay.

In another example, in a case in which a DRAW is allocated periodically, RAW/slot allocation information may be transmitted through a full beacon, rather than transmitting the RAW/slot allocation information through each beacon using a PRAW, and a transmission interval of the full beacon may be designated to be a multiple of a beacon interval, for example, a short beacon interval.

In a case in which the allocated RAW in the DRAW duration is repeated periodically, the relay may provide information related to the repetition of the RAW through a relay beacon using a PRAW.

In FIG. 26, two DRAWs are allocated in the relay beacon interval for the relay. The relay may allocate a transmission duration for an STA that wakes up more frequently to perform DL/UL transmission to the two DRAWs, and allocate a transmission duration for an STA that wakes up less frequently to a single DRAW, among STAs associated with the relay. For example, the relay may allocate a transmission duration for an STA so that a transmission interval for the STA that wakes up more frequently may corresponds to "3", and a transmission interval for the STA that wakes up less frequently may correspond to "6".

In FIG. 27, the root beacon interval may correspond to "6", the relay beacon interval may correspond to "12", and two DRAWs for a predetermined relay may be allocated at each root beacon interval. The example of FIG. 27 may be suitable for a case in which an STA associated with the relay performs transmission more frequently than the root beacon interval. A DRAW 1 and a DRAW 2 may be allocated to the predetermined relay, and the STA may perform transmission at an interval shorter than the root beacon interval.

In FIG. 28, the DRAW 1 and the DRAW 2 of FIG. 27 may be allocated to different relays. The root beacon interval may correspond to "6", each relay beacon interval may correspond to "6", and each relay may be allocated a DRAW at an interval of "6".

Figure 29:
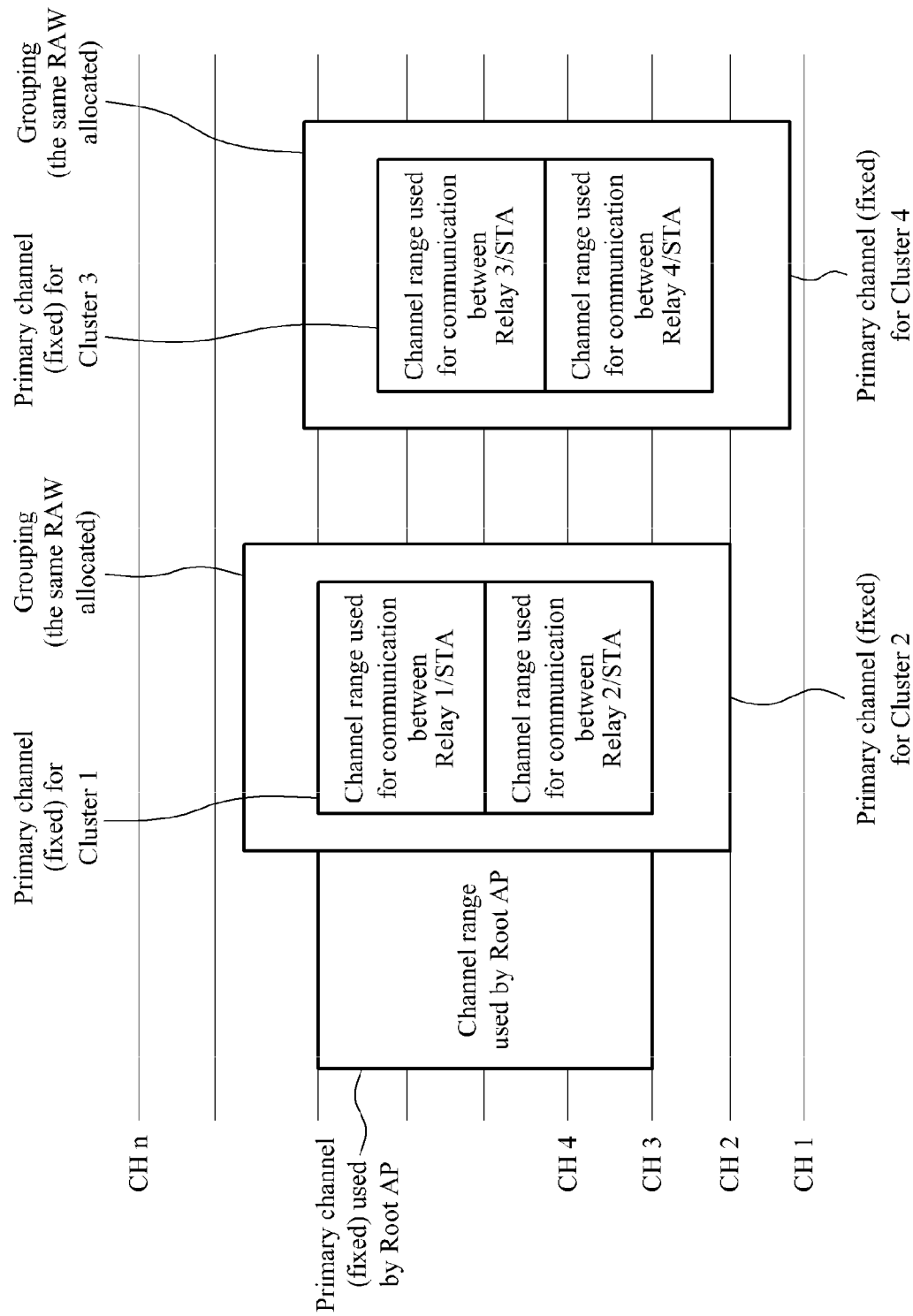
FIG. 29 illustrates an example of allocating a frequency subband to a relay according to an embodiment.

FIG. 29 illustrates an example of allocating a frequency subband to a relay according to an embodiment. For example, FIG. 29 illustrates an example of sharing a RAW between relay clusters, each corresponding to a group of a relay and STAs associated with the relay.

When transmission between the relay clusters is separable, a duration allocated as an empty slot or an empty RAW at a level 0 in a leveled slot allocation method may be shared between the relay clusters, and simultaneous transmission between the clusters may be enabled. For example, RAW sharing may be enabled (1) when different frequency subbands are used, or (2) when clusters are spatially separated, or when a few number of STAs are included in a single relay group and transmission is performable in a chronological order by allocating the STAs to a single RAW.

<1. Method of Performing RAW Sharing Using Different Frequency Subbands>

A root AP may allocate a channel to be used for transmission between each relay and an STA. The relay may inform the root AP of a channel range preferred by the relay when the relay is associated with the root AP. The root AP may allocate, to a relay to be newly associated with, a channel to be used for transmission between the relay and the STA based on a channel occupation state of other relays in a BSS.

The same primary channel may be used for transmission between the root AP and the relay. Each relay may use a channel different from the primary channel of the root AP for transmission with an STA associated with the corresponding relay.

The root AP may allocate relays using non-overlapping channels in a cluster to the same DRAW so that simultaneous transmission between clusters may be performed using different frequency subbands. FIG. 29 illustrates an example of subband allocation that allocates the relays using non-overlapping channels to the same DRAW.

The root AP may inform a transmission allow period and ID information of a relay allowed to perform transmission for a DRAW through an RPS IE of a root beacon or a new similar IE. For example, the ID information of the relay may include an AID, a partial AID, or a partial basic service set identification (BSSID) of the relay. The root AP may transmit information on an available channel and information related to the relay to STAs to be newly associated with the root AP or the relay. The root AP may include a per channel relay allocation bitmap in a beacon, and transmit the beacon to inform the STAs of whether a channel is available. In a case in which a beacon including a per channel relay allocation bitmap is transmitted, an STA attempting to be associated with a relay may identify a relay allocated to each channel, based on the root beacon. The STA may move to a primary channel in which a relay exists, perform scanning, and identify a point in time a beacon of each relay is to be transmitted, based on relay RAW allocation information in the root beacon. In addition, the STA may receive relay beacons from relays, and be associated with a relay existing in a predetermined channel that the STA prefers. The root AP may indicate, in a beacon or a probe response, information on a duration until a subsequent relay beacon is transmitted, a relay beacon interval, and a channel used by each relay to inform a relay allocation state for each channel. The STA may determine an optimal relay more quickly based on the relay allocation state for each channel. A shared DRAW may be allocated in a form of a PRAW. An STA associated with a relay may receive a beacon from the relay that the STA is associated with.

Transmission between a relay and an STA in each cluster may be performed in a form identical to conventional communication between an STA and an AP in an independent BSS. An STA in a cluster may perform transmission within a channel range allocated to be used by a relay that the STA is associated with in the cluster. The STA may perform transmission within a channel range including a primary channel in a cluster designated by a relay. A relay may inform STAs of a primary channel to be used in a cluster of the corresponding relay through a relay beacon using the same method in which a conventional AP informs STAs of a primary channel of a BSS through a beacon.

In a case in which a RAW is shared using a frequency subband, a root AP may delegate use of each channel to an AP using a DRAW. The AP may allocate a detailed RAW/slot of the DRAW. In relation to the DRAW allocation, in a case in which a primary channel used by the root AP for transmission with an STA directly associated with a relay or a root AP is not allocated to another relay, the root AP may delegate the primary channel of the corresponding DRAW to the root AP. The root AP may allocate a detailed RAW/slot for an STA or a relay that performs transmission directly with the root AP, based on the DRAW allocated to the root AP. In this example, the root beacon may include DRAW allocation information and RAW/slot allocation information between the root AP and the relay or the STA with respect to the DRAW duration allocated to the root AP.

In a case in which the relay desires to switch a channel to be used in a cluster of the relay, the relay may request the root AP to switch the channel to be used in the cluster of the relay. For example, the relay may request the root AP to switch the channel by defining a relay operating module notification frame. The root AP receiving a channel switching request from the relay may transfer an acknowledgement of the channel switching request to the relay, and the relay may move to another channel in a case in which the root AP approves channel switching. In a case in which the relay switches the channel, the root AP may change relay grouping. In a case in which channel switching in a cluster is allowed, information on the channel switching may be transferred to an STA through a conventional channel switch announcement.

Figure 30:
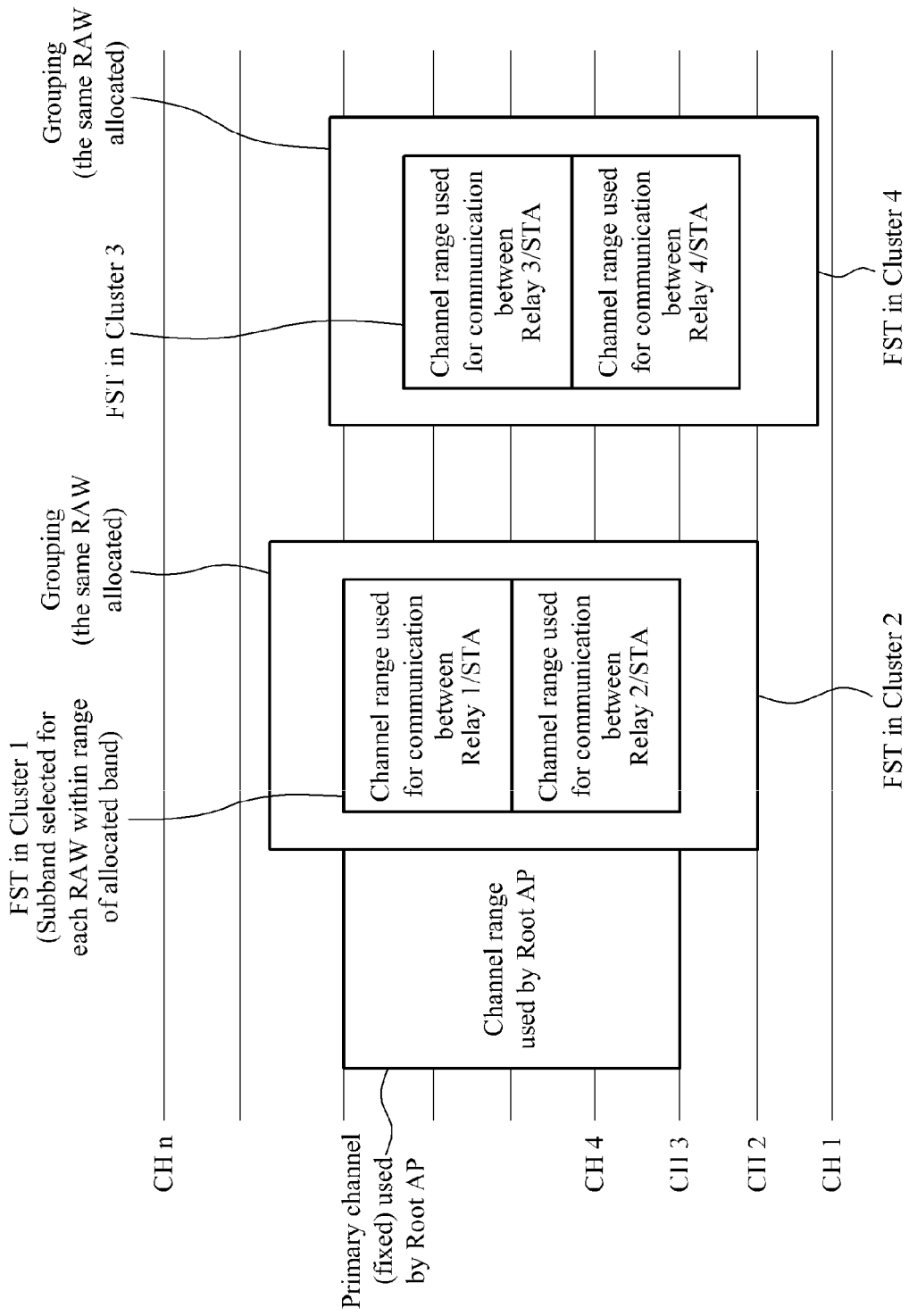
FIG. 30 illustrates a case in which frequency selective transmission (FST) is used in a cluster when a subband for a relay is allocated according to an embodiment.

FIG. 30 illustrates a case in which frequency selective transmission (FST) is used in a cluster when a subband for a relay is allocated according to an embodiment.

A primary channel in a cluster, for example, a primary channel to be used for transmission between a relay and an STA, may be allocated to be fixed. However, the FST may be applied to the cluster such that a temporary primary channel may be changed for each RAW. FIG. 30 illustrates an example of allocating a frequency subband to a relay. In contrast to FIG. 29, a primary channel in a cluster may not be fixed, and the primary channel may be changed for each RAW within a range of a band allocated to the cluster.

Figure 31:
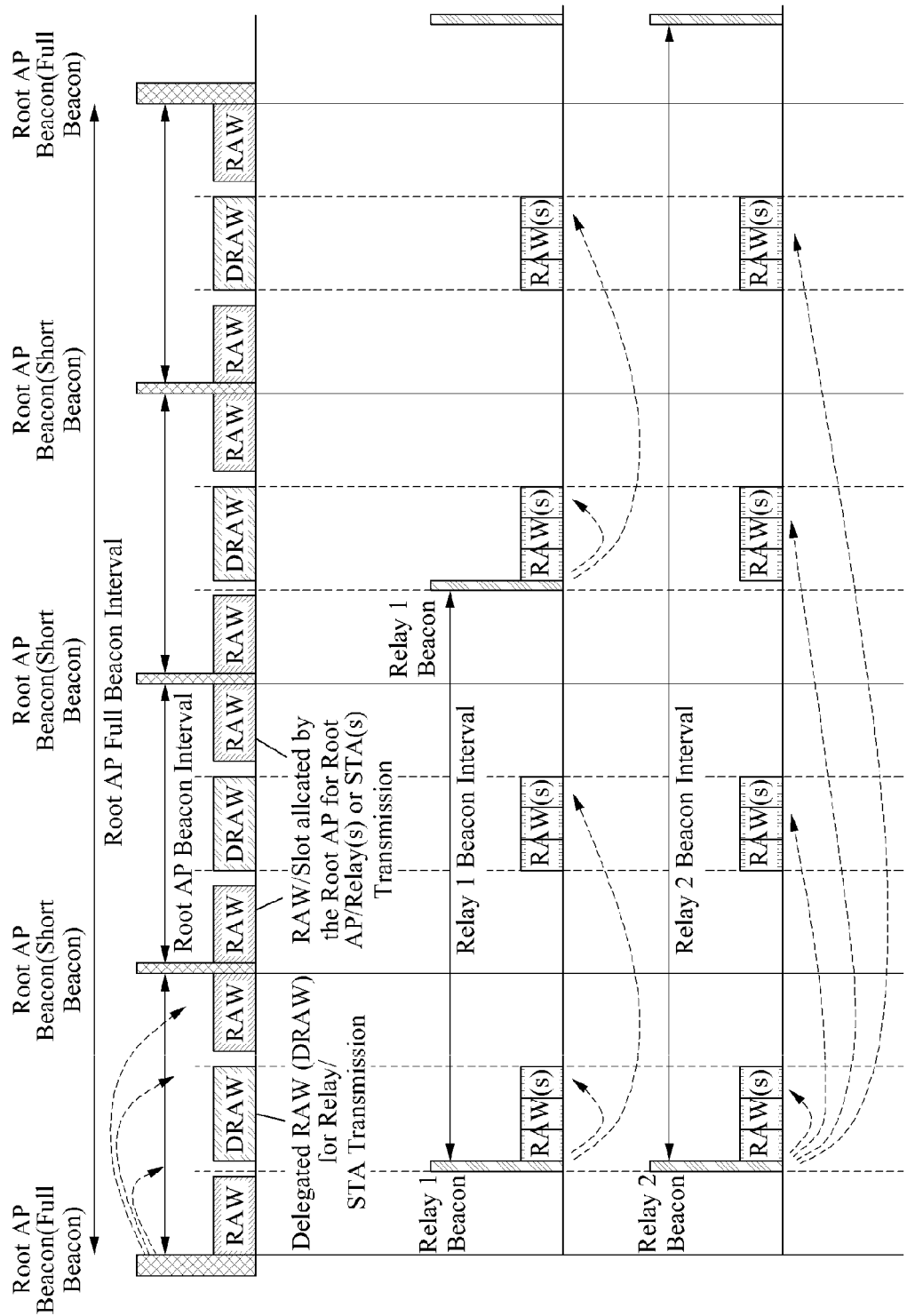
FIG. 31 illustrates an example of sharing a RAW using different frequency subbands according to an embodiment.

FIG. 31 illustrates an example of sharing a RAW using different frequency subbands according to an embodiment.

In FIG. 31, the leveled slot allocation method of FIG. 23 may be extended to a method of performing simultaneous transmission by sharing a DRAW using different frequency subbands. Various forms of DRAW allocation methods described with reference to FIGS. 26 through 28 may be extended to simultaneous transmission using different frequency subbands.

Figure 32:
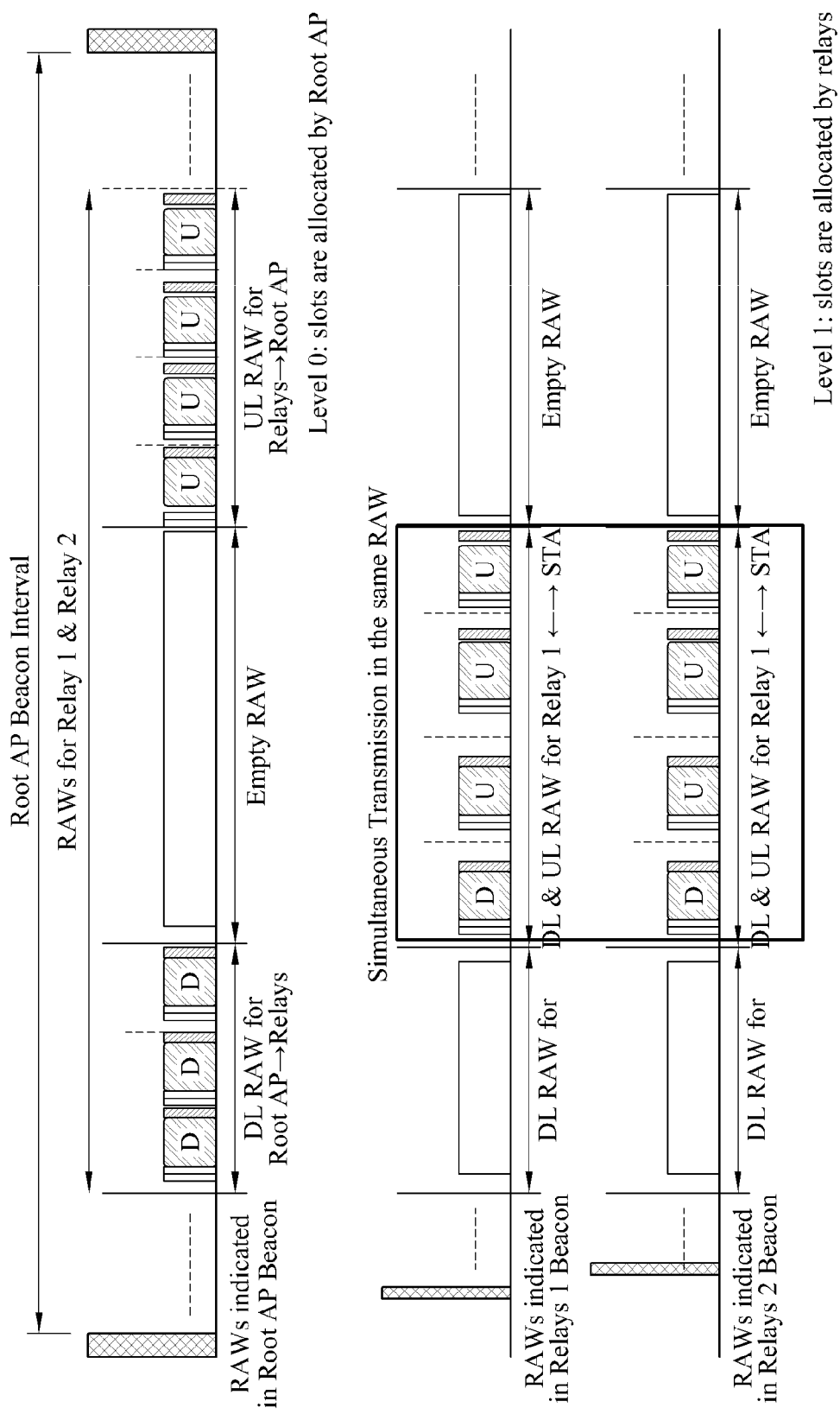
FIG. 32 illustrates an example of transmitting data using different frequency subbands according to an embodiment.

FIG. 32 illustrates an example of transmitting data using different frequency subbands according to an embodiment.

In FIG. 32, the general leveled slot allocation method of FIG. 17 may be extended to a case in which there are two relays that communicate with an STA using different frequency subbands.

In a DL RAW in which transmission is performed from a root AP to a relay at a level 0, and a UL RAW in which transmission is performed from a relay to a root AP at a level 0, transmission slots for a relay 1 and a relay 2 may be allocated sequentially, and a root beacon including slot allocation information may be transmitted.

A DL and UL RAW for transmission between the relay 1 and an STA and transmission between the relay 2 and an STA may be indicated in the root beacon in a form of an empty RAW. The empty RAW may correspond to a DRAW. In this example, information related to a relay allowed to perform transmission in the corresponding empty RAW, and channel information with respect to a frequency subband allocated to each relay may be indicated in the empty RAW of the root beacon. For example, the information related to the relay allowed to perform transmission may include an AID, a partial AID, a BSSID, or a partial BSSID of each of the relay 1 and the relay 2. The channel information may include information on a channel number with respect to a frequency subband allocated to each relay, whether transmission in a wideband including the allocated frequency subband is allowed, and a range of a wideband to be used when wideband transmission is allowed. The information on the range of the wideband to be used may be used to prevent relays from using overlapping channels.

Each relay may allocate a transmission slot for an STA associated with the corresponding relay to a relay beacon.

In FIG. 32, simultaneous transmission may be performed in the DL and UL RAW duration, for example, a shared RAW, since the relay 1 and the relay 2 use different frequency subbands.

Each relay may allocate a UL duration and a DL duration in the shared RAW differently as necessary. For example, in a case in which the relay 1 performs UL transmission from an STA more frequently than the relay 2, the relay 1 may be allocated more UL slots than the relay 2.

The root AP may negotiate with each relay about a preferred frequency subband, and whether RAW sharing using a frequency subband is to be used when the corresponding relay is associated with the root AP. In addition, even after the relay is associated with the root AP, the root AP may change whether the RAW sharing is to be used, and the preferred frequency subband through an operating mode change request/response between the relay and the root AP.

The root AP may allocate the same channel to a predetermined relay for each relay transmission duration, or may determine an optimal channel for each relay transmission duration and allocate the determined optimal channel to the corresponding relay transmission duration.

The root AP may allocate a frequency subband so that the relay may use a predetermined frequency subband, for example, 2 megahertz (MHz). The root AP may allow the relay to use a wider frequency subband, for example, 8 MHz, including the allocated predetermined frequency subband.

In a case in which the root AP allows the relay to use a wider frequency subband, there may be a risk that relays sharing a RAW may use overlapping frequency subbands. To prevent such a risk, the root AP may set selectable channel numbers, and restrictions on a bandwidth.

By enabling simultaneous transmission between different clusters as described above, a transmission efficiency may increase.

Figure 33:
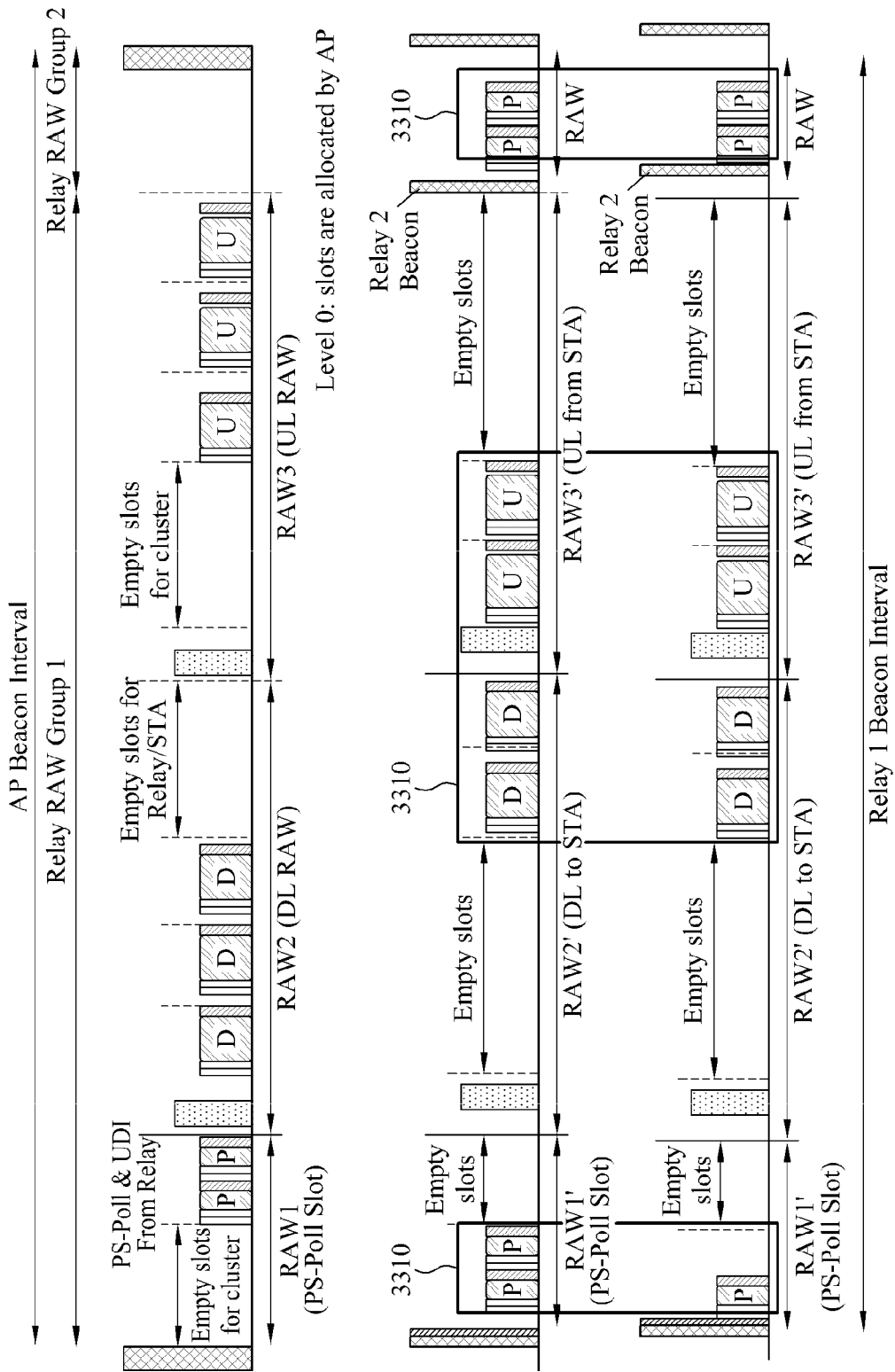
FIGS. 33 through 36 illustrate examples of a method of sharing a RAW using different frequency subbands in a leveled slot allocation method using an empty slot according to an embodiment.

FIG. 33 illustrates an example of a method of sharing a RAW using different frequency subbands in a leveled slot allocation method using an empty slot according to an embodiment.

FIG. 33 illustrates an example extended from the example of FIG. 18. Areas 3310 may correspond to durations in which simultaneous transmission between clusters is possible.

A DL slot allocated for a RAW 2' and a UL slot allocated for a RAW 3' may be indicated in a root beacon in a form of empty slots. In this example, information related to a relay allowed to perform transmission in the corresponding empty slot, and channel information with respect to a frequency subband allocated to each relay may be indicated in the root beacon. For example, the information related to the relay allowed to perform transmission may include an AID, a partial AID, a BSSID, or a partial BSSID of each of a relay 1 and a relay 2. The channel information may include information on a channel number with respect to a frequency subband allocated to each relay, whether transmission in a wideband including the allocated frequency subband is allowed, and a range of a wideband to be used when wideband transmission is allowed. The information on the range of the wideband to be used may be used to prevent relays from using overlapping channels.

In a case in which a frequency sub-channel used by a relay is changed for each relay transmission duration, the relay may transmit a sounding frame for each channel immediately after a relay beacon is transmitted. Each STA associated with the relay may search for an optimal channel based on the sounding frame, and the relay may transmit data using the optimal channel selected by the corresponding STA, whereby a transmission efficiency may increase.

Figure 34:
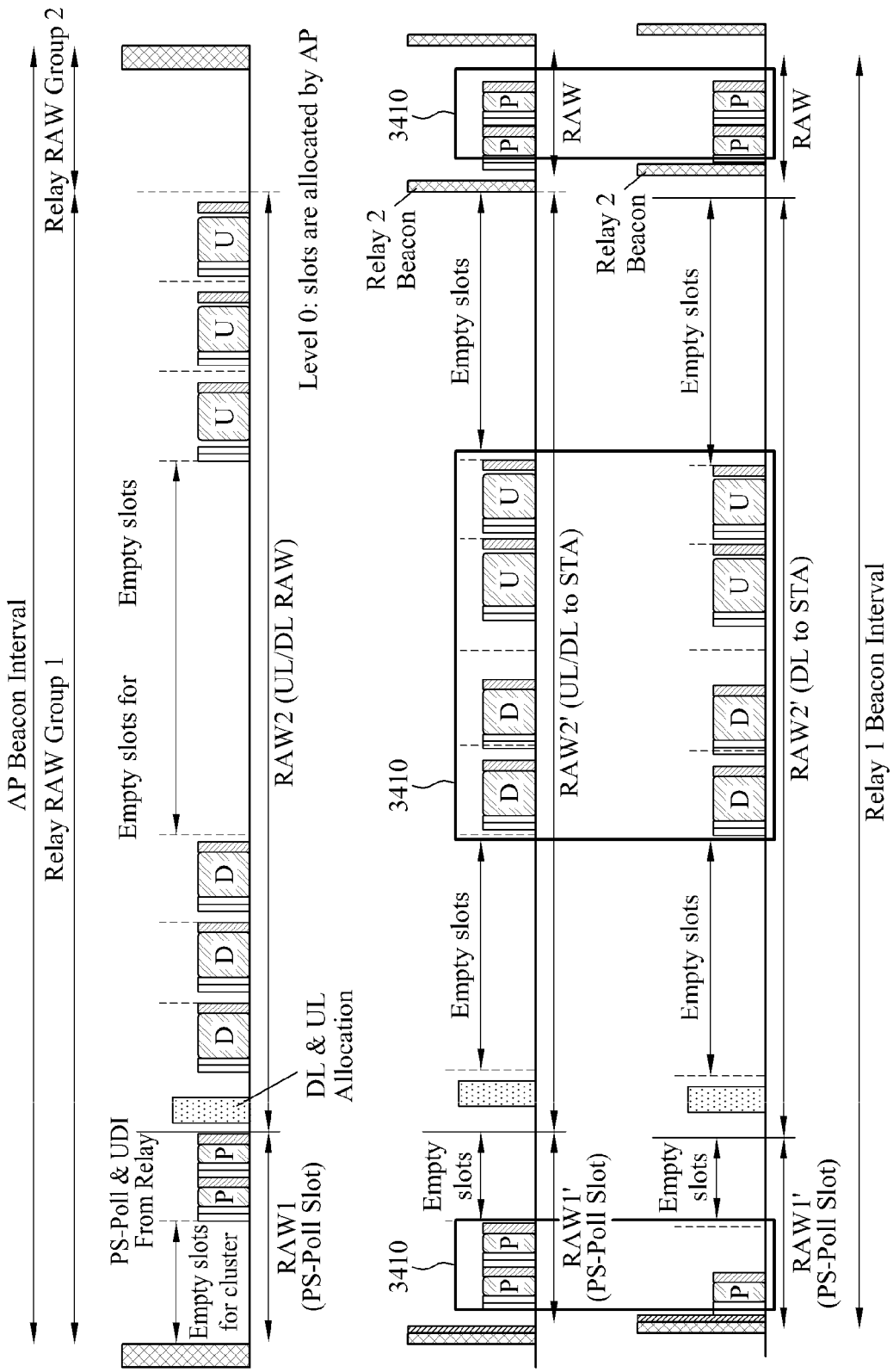
Figure 35:
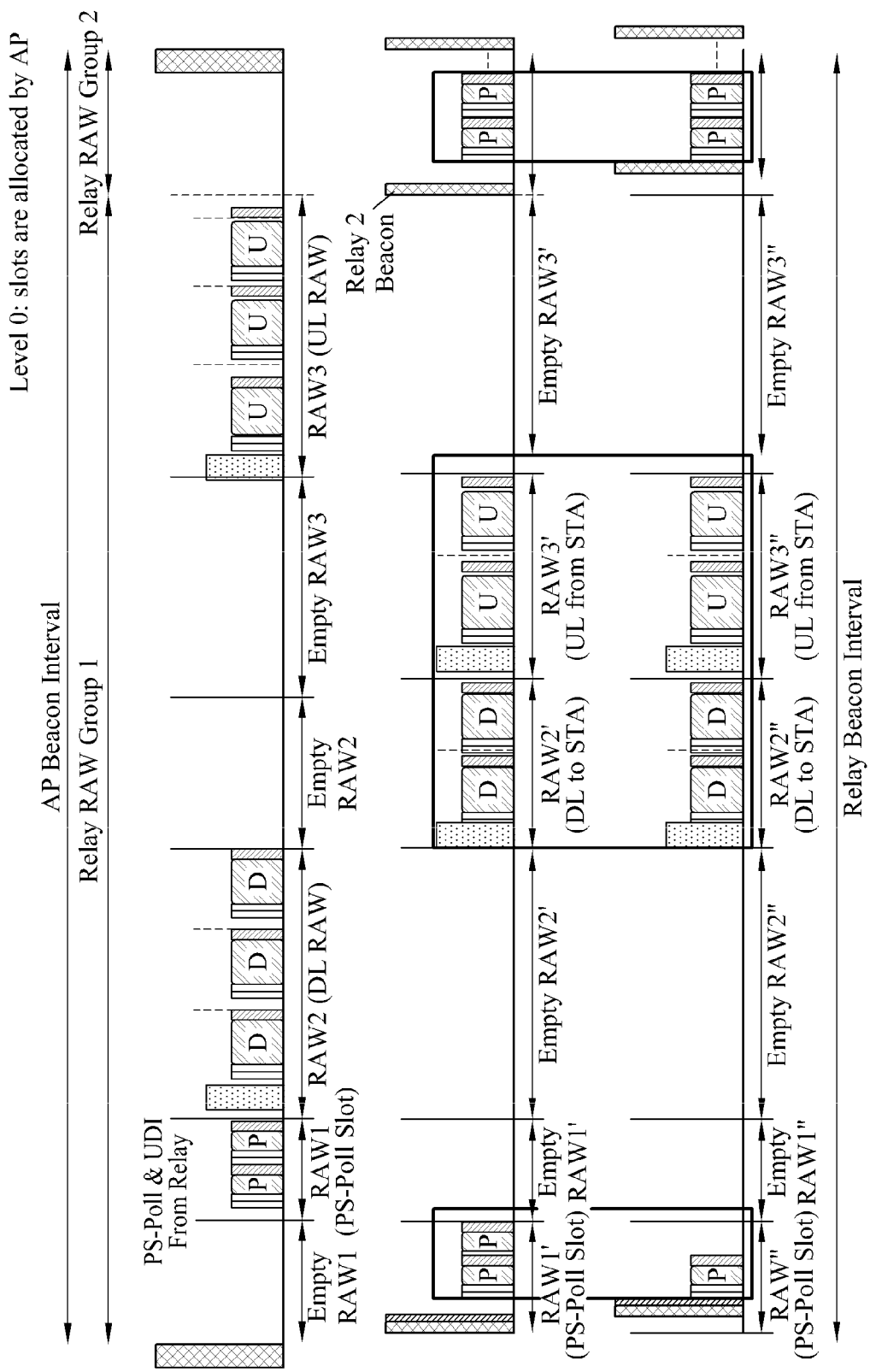

FIGS. 34 and 35 illustrate other examples of a method of sharing a RAW using different frequency subbands in a leveled slot allocation method using an empty slot according to an embodiment.

FIG. 34 illustrates an example extended from the example of FIG. 19. A shared DL RAW and a shared UL RAW may be allocated as a single shared RAW, for example, a UL/DL RAW. FIG. 35 illustrates an example extended from the example of FIG. 20. A DL RAW and a UL RAW may be shared for transmission between a relay 1 and an STA and transmission between a relay 2 and an STA.

Figure 36:
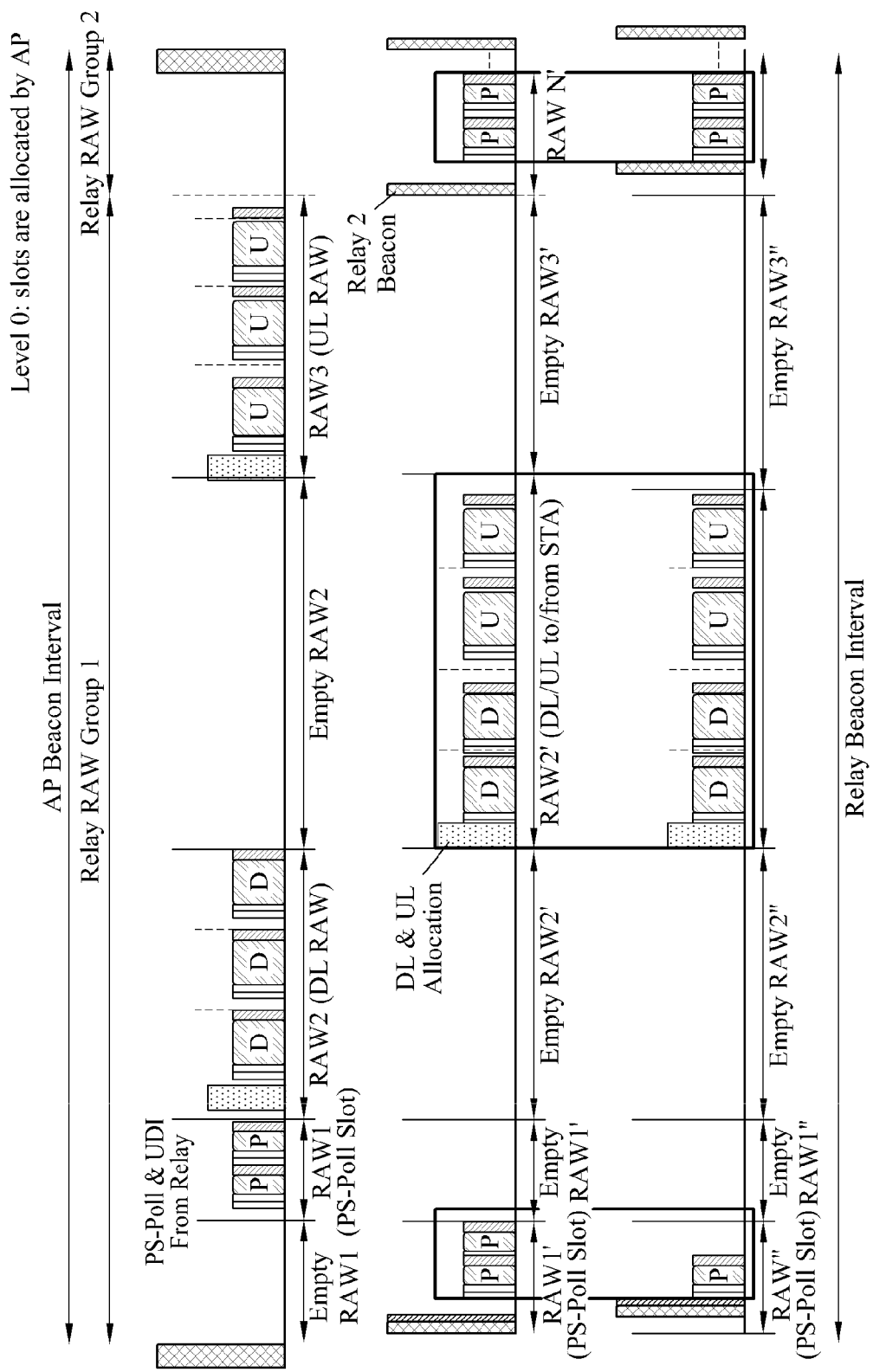

FIG. 36 illustrates still another example of a method of sharing a RAW using different frequency subbands in a leveled slot allocation method using an empty slot according to an embodiment.

FIG. 36 illustrates an example extended from the example of FIG. 21. A DL RAW and a UL RAW may be allocated as a single shared RAW, for example, a DL/UL RAW, for transmission between a relay 1 and an STA and transmission between a relay 2 and an STA. By allocating the DL/UL RAW as a single RAW, a UL slot and a DL slot between the STA and the relay 1 and between the STA and the relay 2 may be flexibly allocated depending on a situation, whereby the RAW may be utilized more efficiently. In FIG. 36, since the relay 1 performs UL transmission from an STA more frequently than the relay 2, more UL slots may be allocated to the relay 1.

<1.1 Signaling Method in a Case of RAW Sharing Using a Frequency Subband>

In the case of RAW sharing using a frequency subband, a root AP may inform a relay of information on an AP allocated a transmission duration, a length of the transmission duration, a frequency used in a particular time duration, for example, a particular RAW or a particular slot, through signaling.

The root AP may transmit, to the relay, information on a transmission allow period and information related to a relay allowed to perform transmission for a DRAW using an RPS IE of a root beacon or a new IE similar to the RPS IE. The information related to the allowed relay may include information on an AID, a partial AID, or a partial BSSID of the relay.

For example, the signaling method may be performed based on Table 1. Table 1 shows DRAW signaling (signaled in root beacon—for level 0).

The root beacon may include DRAW allocation information.

In the information listed in Table 1, RAW start time and RAW duration information of a conventional RPS IE may be used, DRAW indication and DRAW allocation information may be added to the RPS IE, or a new IE containing similar information may be defined.

TABLE 1

| Feature | Value | Interpretation |
| --- | --- | --- |
| DRAW indication | 1 bit | describes whether RAW corresponds to Delegated RAW. |
| DRAW Start Time | 8 bits | describes point in time at which DRAW starts. Field present in conventional RPS IE may be used. In this example, DRAW Start Time is defined as Duration in TU from end of beacon transmission to DRAW Start time. |
| DRAW Duration | TBD(To Be Determined) bits | describes the length of DRAW. Field present in conventional RPS IE may be used. In this example, the DRAW Duration is defined as Duration of DRAW in TU. |
| DRAW allocation | TBD bits | describes list of AIDs or partial AIDs or BSSIDs or Partial BSSIDs of relays allowed to perform simultaneous transmission in the corresponding DRAW. |
| Strictly disallow | 1 bit | describes whether transmission of predetermined relay or STAs is to be explicitly prohibited in allocated duration. |
| List of Relay BSS and STAs (multiple) | TBD bit | describes strictly disallowed relay or BSS in relay. lists single Relay (Partial AID) + disallowed STA (partial) AID list in the corresponding relay. Multiple Relay AID lists may be provided. (When transmission of the entire Relay BSS is disallowed, STA (Partial) AID may be omitted, or indicated using predetermined pattern, for example, 000..0 or 111..11) |

The relay and the root AP may be aware of channel information to be used by each relay. The channel information to be used by each relay may be negotiated with the root AP. Thus, the root AP may not provide information regarding which channel is allocated to be used by which relay in each DRAW, in DRAW units. For example, the negotiated channel information may include a channel number in which transmission for a predetermined relay is allowed, a bitmap, or information regarding whether transmission in a wideband including an allocated frequency subband is allowed. However, in a case in which information on an available channel and information related to the relay are transmitted to STAs to be newly associated with the root AP or the relay, or a duration in which a RAW is yet to be allocated m or a RAW transmission duration remains, the root AP may transmit a beacon including a per channel relay allocation bitmap to inform STAs of whether a channel is available so that another STA may use the remaining RAW duration.

The root AP may allocate a sub-channel to the root AP when DRAW sharing is used. In this example, an AID, a partial AID, a BSSID, or a partial BSSID of the root AP may be included in DRAW signaling information, and RAW/slot allocation information for transmission between the root AP and a relay or an STA that performs transmission directly to the root AP may be included in a root beacon.

In a case in which a form of a PRAW is used, 1 bit indicating whether a RAW corresponds to a PRAW, and information on an interval of the PRAW may be additionally included in the root beacon. For example, the interval of the PRAW may correspond to an integer value that indicates a multiple of a short beacon. 1 bit indicating whether a RAW corresponds to a PRAW may be omitted, and information on the interval of the PRAW may be additionally included in the root beacon in addition to the items listed in Table 1.

DRAW signaling in a case in which DRAW sharing is not used may be performed in the same manner as the method described above, except a difference that a single relay allowed to perform transmission may be designated in DRAW allocation.

A strictly disallowed bit may indicate whether transmission of a predetermined relay or STAs is to be explicitly prohibited in an allocated duration. When the strictly disallowed bit corresponds to "1", information related to a strictly disallowed relay and a strictly disallowed STA may be included in a DRAW. Whether the entire relay BSS is disallowed or whether a portion of STAs in the relay BSS is disallowed may be indicated using the strictly disallowed bit.

Table 2 lists empty RAW signaling information included in a relay beacon.

TABLE 2

| Feature | Value | Interpretation |
| --- | --- | --- |
| Empty RAW indication | 1 bit | describes whether RAW corresponds to Empty RAW. |
| Empty RAW Start Time | 8 bits | describes point in time at which Empty RAW starts. Field present in conventional RPS IE may be used. In this example, Empty RAW Start Time is defined as Duration in TU from end of beacon transmission to Empty RAW Start time. |
| Empty RAW Duration | TBD bits | describes length of Empty RAW. Field present in conventional RPS IE may be used. In this example, Empty RAW Duration is defined as Duration of Empty RAW in TU. |

The empty RAW may indicate a duration in which transmission of an STA in a cluster is prohibited outside the DRAW duration at a level 1. When a RAW is indicated as an empty RAW, an STA in the cluster may be prohibited from transmitting data during a duration specified as a RAW start time and RAW duration.

As another example, a duration in which an AP enters a power save mode may be explicitly indicated. When an AP power save bit is set to "1" in an RPS IE, the AP may sleep in the corresponding RAW duration, and an STA may not transmit data to the AP. Empty RAW signaling may be performed using the AP power save bit. When a duration to be set as an empty RAW is set as a RAW, and the AP power save bit is set to "1", STAs may not perform transmission in the DRAW or RAW duration.

Conversely, the AP power save mode may be explicitly indicated using the empty RAW signaling method. When a duration in which the AP performs power saving is set as an empty RAW, an STA may not perform transmission in the duration set as the empty RAW and thus, the AP power save mode may be explicitly indicated. In this example, since a definition of the empty RAW may include a much fewer number of bits than a definition of a conventional RPS IE, a length of the RPS IE may be reduced further in a case in which the empty RAW is applied to an AP power save indication.

As still another example, both an empty RAW indication bit and an AP power save bit may be indicated in the empty RAW. Although transmission between a relay and an STA associated with the relay is disallowed in the empty RAW, the relay may perform transmission with the root AP in the empty RAW and may not perform power saving in reality. Thus, whether the relay sleeps in reality may be explicitly indicated using the empty RAW indication bit and the AP power save bit.

In a case in which the empty RAW is explicitly allocated periodically, a form of a PRAW may be used. In this example, 1 bit indicating whether a RAW corresponds to a PRAW, and information on an interval of the PRAW may be additionally included in a root beacon. For example, the interval of the PRAW may correspond to an integer value that indicates a multiple of a short beacon. 1 bit indicating whether a RAW corresponds to a PRAW may be omitted, and information on the interval of the PRAW may be additionally included in the root beacon in addition to the items listed in Table 1.

In a case in which transmission of an STA in a cluster is explicitly prohibited outside the DRAW, the empty RAW may not be used, and the relay may allocate 1 bit in a relay beacon and indicate whether transmission is prohibited in durations other than the DRAW or RAW duration explicitly allocated by the relay. For example, when the allocated bit corresponds to "1", an STA may not perform transmission in durations other than the duration in which the RAW or the DRAW is explicitly set.

As another example, a duration in which an AP enters a power save mode may be explicitly indicated. When an AP power save bit is set to "1" in a short beacon or a beacon, an STA may be prohibited from performing transmission to the AP in durations other than the explicitly allocated RAW duration. Whether transmission in durations other than the DRAW or RAW duration for the relay is prohibited may be indicated using the AP power save bit. In a case in which the transmission in durations other than the DRAW or RAW duration for the relay is explicitly prohibited, STAs may not perform transmission in the DRAW or RAW duration when the AP power save bit is set to "1" in a relay beacon.

RAW information allocated by a relay to an STA at a level 1 may be similar to RAW information in the conventional 802.11ah standards. In a case in which FST is used in a cluster, primary channel information for FST may be included in an RPS IE of a relay beacon, similar to the conventional 802.11ah standards.

In addition, modified examples, for example, Option 1 and Option 2, may be possible. In the following description, an empty slot or an empty RAW at a level 0 may refer to a delegated slot or DRAW.

<Option 1—Example of a Case in which Empty Slot is Used>

In a case in which an empty slot is used, information as follows may be included in an RPS IE.

1) RAW start time: RAW start time indicates a start time of a RAW including a shared empty slot.

2) RAW duration: RAW duration indicates a duration of a RAW including a shared empty slot.

3) Empty (delegated) slot definition: Empty slot definition may indicate a start point and an end point of an empty slot. For example, the empty slot definition may include a start slot number, and an end slot number. In a case in which a number of empty slot groups are present in the same RAW, a list of start points and end points of the empty slots may be compiled. In a case in which the empty slot definition indicates that a root AP uses an empty slot, an empty slot allocation field may be present, and transmission between a relay AP and an STA associated with the corresponding relay indicated in the empty slot allocation field may be allowed in a shared empty slot. When the relay AP sets an empty slot definition field, the empty slot allocation field may be unnecessary, which may indicate that transmission between the relay AP and the root AP may be allowed. An empty RAW indication at a level 1 may be used in a case in which transmission of an STA is explicitly prohibited.

4) Empty (delegated) slot allocation: Empty slot allocation may be used for a DL/UL allocation frame or an RPS IE of a root AP. The empty slot allocation may include a list of relay APs allowed to perform transmission with associated STAs in an empty slot, and information on a frequency subband available to a relay AP. The subband information may be included in a case in which RAW sharing using frequency subbands is used. In a case in which simultaneous transmission between spatially separated clusters or RAW sharing in a time domain is performed, the frequency subband information may not be included. The root AP and a relay may share the frequency subband information beforehand, or may enable a band allocation map to be included in a root beacon and prevent band allocation information from being included in the root beacon. For example, the list of the allowed relay APs may include information on AIDs, partial AIDs, BSSIDs, and partial BSSIDs of the allowed relay APs. The frequency subband information may include a channel number in which transmission is allowed, a bitmap, or whether transmission in a wideband including an allocated frequency subband is allowed. In a case in which transmission using a frequency subband wider than a selected frequency subband is allowed, the root AP may prevent a channel from being used repeatedly between relays by indicating, using a bitmap, a bandwidth or a channel allowed to be used.

In addition to the information mentioned above, information on slot definition, group/resource allocation frame indication, and access restricted to paged STA only may be included in the RPS IE.

<Option 2—Example of a Case in which Empty RAW (DRAW) is Used>

In a case in which an empty RAW (DRAW) is used, information as follows may be included in an RPS IE:

1) RAW start time: RAW start time indicates a start time of a shared RAW.

2) RAW duration: RAW duration indicates a duration of a shared RAW.

3) Empty RAW (DRAW) indication: Empty RAW indicates whether a RAW is used as an empty RAW. In a case in which the empty RAW indication indicates that a root AP uses an empty RAW, an empty RAW allocation field needs to be present and only transmission between relay APs indicated in the empty RAW allocation field and STAs associated with the corresponding relay APs may be allowed in a shared empty RAW. When a relay AP sets the empty RAW indication field, the empty RAW allocation field may be unnecessary, which may indicate that transmission between the relay AP and the root AP is allowed. Only in a case in which transmission of an STA is explicitly prohibited, an empty RAW indication at a level 1 may be used.

4) Empty RAW (DRAW) allocation: Empty RAW allocation may be used only for an RPS IE of a root AP. The empty RAW allocation may include a list of relay APs allowed to perform transmission with associated STAs in an empty RAW, and frequency subband information on a frequency subband available to a relay AP. The frequency subband information may be included only in a case in which RAW sharing using frequency subbands is performed. In a case in which simultaneous transmission between spatially separated clusters or RAW sharing in a time domain is performed, the frequency subband information may not be included. For example, the list of the allowed relay APs may include information on AIDs, partial AIDs, BSSIDs, and partial BSSIDs of the allowed relay APs. The frequency subband information may include a channel number in which transmission is allowed, a bitmap, or whether transmission in a wideband including an allocated frequency subband is allowed. The root AP and a relay may share in advance frequency subband information. Alternatively, a band allocation map may be included in a root beacon and band allocation information may not be included therein. In a case in which transmission using a frequency subband wider than a selected frequency subband is allowed, the root AP may prevent a channel from being used repeatedly between relays by indicating, using a bitmap, a bandwidth or a channel allowed to be used.

<2. Method of Performing RAW Sharing in a Case in which Clusters are Spatially Separated>

Figure 37:
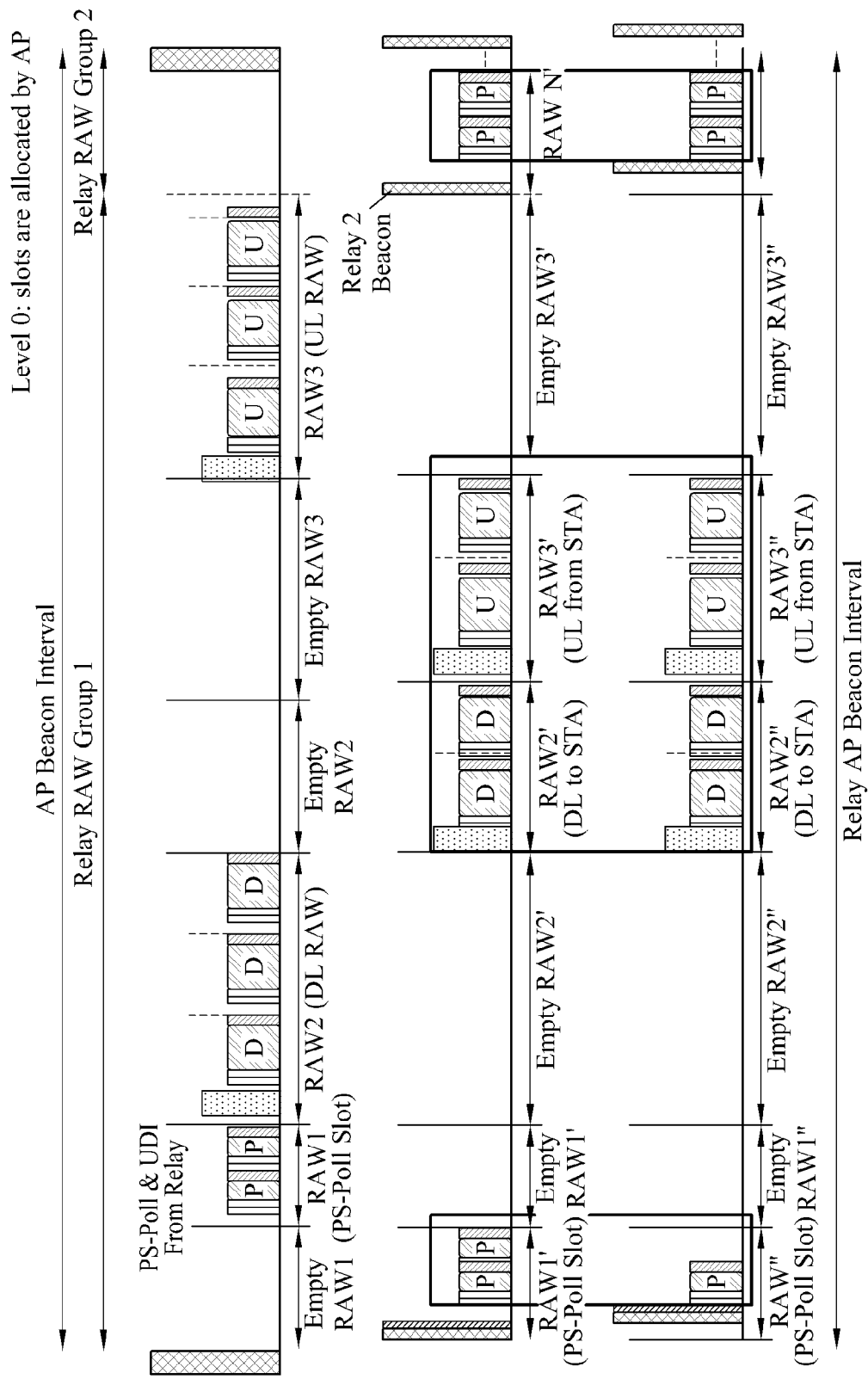
FIG. 37 illustrates an example of a method of performing RAW sharing in a case in which clusters are spatially separated according to an embodiment.

FIG. 37 illustrates an example of a method of performing RAW sharing in a case in which clusters are spatially separated according to an embodiment. The embodiment of FIG. 37 is an example of a case in which an empty RAW is used, and may be extended using a similar method although an empty slot is used. Areas 3310 indicate durations in which clusters are spatially separated and simultaneous transmission between the clusters is possible. A signaling method is similar to a signaling method used when performing RAW sharing using a frequency subband.

<3. Method of Performing RAW Sharing Using Time Domain>

Figure 38:
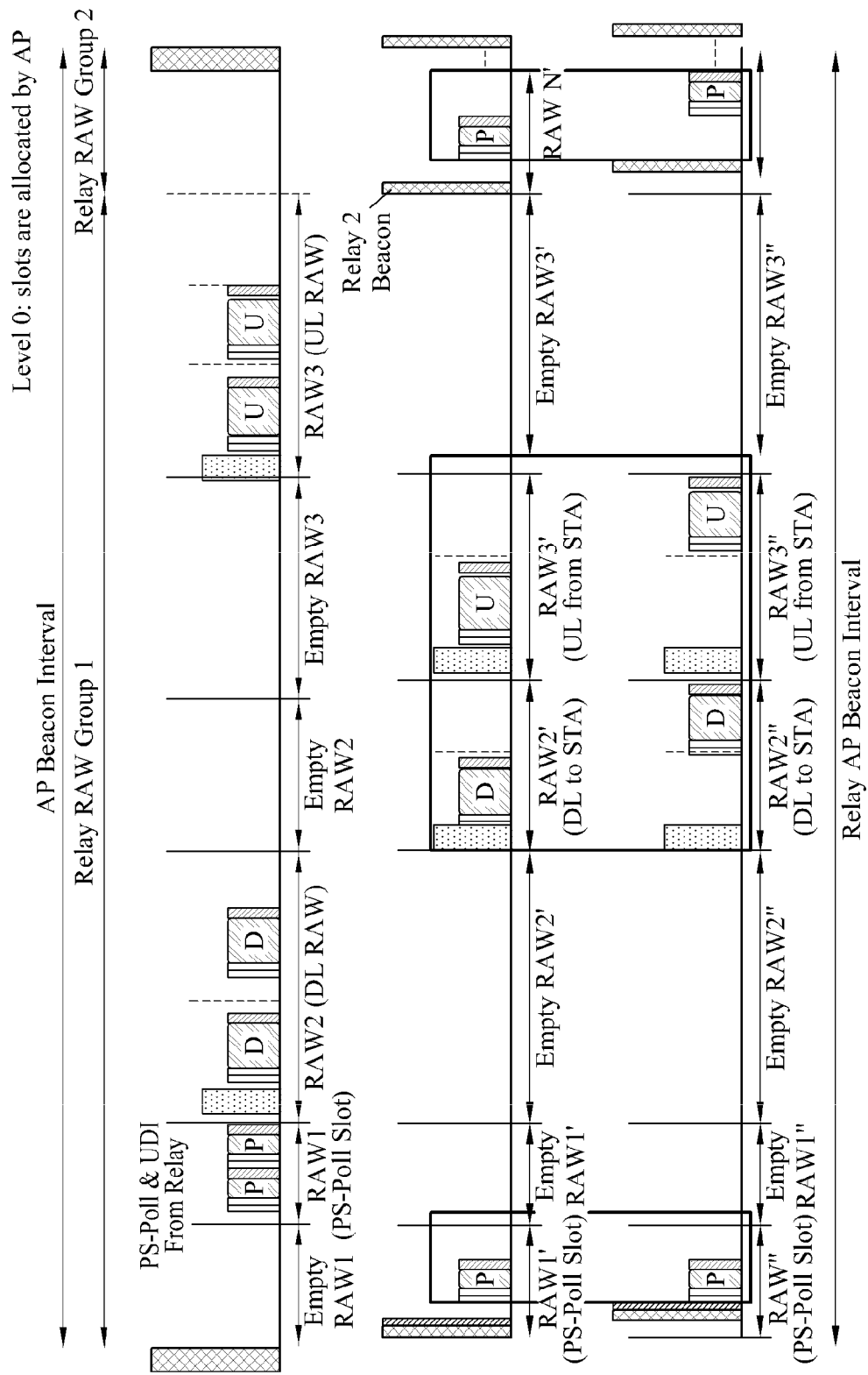
FIG. 38 illustrates an example of a method of performing RAW sharing using a time domain according to an embodiment.

FIG. 38 illustrates an example of a method of performing RAW sharing using a time domain according to an embodiment. The embodiment of FIG. 38 is an example of a case in which an empty RAW is used, and may be extended using a similar method although an empty slot is used. Areas 3410 indicate durations in which a RAW is shared by performing sequential transmission in the time domain.

In a shared RAW or slot, a relay or an STA may perform sequential transmission through contention. The method of performing RAW sharing using a time domain may be used when the number of STAs associated with each relay is relatively small or when a transmission amount is relatively small. A signaling method is similar to a signaling method used when performing RAW sharing using a frequency subband.

Another method that may be considered in a DRAW transmission method is a method in which a root AP does not set a DRAW as a duration for transmission within a relay BSS and a relay allocates, as the DRAW, a duration including an UL/DL transmission duration of the root AP. In a case in which the above method is used, the relay may directly and appropriately allocate a RAW/slot with respect to level-1 transmission within the relay and transmission from the relay to the root AP within the DRAW.

A UL/DL transmission RAW/slot from a relay to a root AP may be indicated in a relay beacon. A transmission slot indication to the root AP may be indicated in an RPS IE using a method similar to a method used for an STA belonging to a relay BSS. For example, in a case of slot allocation, an AID of the root AP may be indicated for transmission from the relay to the root AP, and UL/DL transmission to the root AP may be indicated as DL/UL transmission with respect to an AID of the corresponding root AP in an RPS IE.

<(B) Method in which a Root AP Independently Allocates Resources, for Example, a Relay Transmission Duration and a Relay Transmission Band, to a Relay Using Separate Resource Allocation Information Instead of Using a RAW Form (Method Using a Relay Resource Allocation IE)>

In the method (A) using a DRAW, a root AP allocates a duration set in a RAW form to a relay and thus, an existing RAW signaling method may be simply extended and used. Also, empty RAW signaling for transmission duration protection may be simultaneously performed together with resource allocation through a DRAW. In a case in which relays use a channel different from the root AP, each of the relays may perform transmission in a frequency subband allocated thereto independently from the root AP and thus, there is no need to determine a relay transmission duration based on a RAW of the root AP. In the method (B), a root AP may allocate a resource to the relay using separate resource allocation information, which is independent from RAW allocation of the root AP. Accordingly, the relay and the root AP present in different frequency subbands may perform transmission in independent durations.

Hereinafter, a general case in which a plurality of frequency subbands is used will be described, which includes a case of a single band.

A root AP may include, in a root beacon, resource allocation information required for transmission between a relay and an STA in a form of a separate resource allocation IE and thereby transmit the root beacon. In a case of a relay operation also using multi-band transmission, the root AP may allocate a resource to each relay in order to minimize transmission of a different relay cluster in the same frequency subband at a predetermined time. To enable simultaneous transmission, the root AP may allocate a resource so that different relays may perform transmission within a cluster using different frequency subbands at a predetermined time.

A resource to be allocated may include a transmission allow start time and a transmission duration length for transmission within a cluster of each relay and channel information to be used by each relay in a case in which each relay is to use transmission within a cluster.

Once a relay is associated with a root AP as an STA, the relay may request the root AP to set up a relay BSS and operate as a relay AP, and may operate as the relay AP in response to an approval from the root AP.

When a relay requests association to a root AP as an STA, or when the relay requests the root AP to operate as the relay AP, the relay may transfer, to the root AP, resource allocation requirements, for example, channel related information such as a channel and a bandwidth to be used by the relay for cluster transmission and primary channel information, a relay beacon interval, and an initial relay BSS transmission duration. The relay may also transmit, to the root AP, information on a separation level with respect to another relay BSS together with the resource allocation requirements. The relay may operate as the relay AP by setting up the relay BSS using a relay beacon interval and a channel allocated by the root AP, and by transmitting a relay beacon at a predetermined time. The relay may transmit, to the root AP, information used to determine a required transmission time when the relay is associated with the root AP, when the relay requests the root AP to operate as the relay AP, or thereafter. For example, the relay may transmit, to the root AP, information, for example, a mean data rate of STAs associated with the relay, a target wake time, or a wake interval. The root AP may allocate an appropriate transmission duration to the relay based on information received from the relay. The root AP may also allocate the same transmission duration to spatially separated relays based on information on a separation level with respect to another relay BSS that is received from the relay. Also, the relay AP may periodically or aperiodically measure a degree of spatial separation with the other relay BSS, and may feedback modified contents to the root AP when the degree of spatial separation with the other relay BSS is modified by a predetermined reference or more. For example, when the relay AP is affected by great interference of existing separated another relay BSS, the relay AP may inform the root AP of the above situation. Alternatively, when a new relay BSS is detected, the relay AP may inform the root AP of the detected new relay BSS. Additionally, the root AP may allocate the same duration for transmission of the spatially separated relays, based on spatial separation information between the relays.

A relay and a root AP may be mutually aware of channel allocation information on the relay. To minimize a length of resource allocation information to be transferred for each beacon, channel allocation information on each relay may be transmitted without being included in the resource allocation information. Channel information allocated to each relay may be included in resource allocation information to be transferred for each beacon. Each of the relays may identify channel allocation information of different relays based on a root beacon, and may verify a relay allocated to the same channel as a channel of a corresponding relay.

When the same resource is allocated for each (short) beacon duration, interval information associated with resource allocation may be included in, for example, a long beacon and thereby transmitted, instead of transmitting resource allocation information for each beacon duration. In this example, only when resource allocation is modified, modified resource allocation information may be transmitted.

A root AP may include resource allocation information in a root beacon and thereby transmit the same. A relay may allocate a RAW for a transmission time in which transmission to a cluster is allowed, based on resource allocation information included in the root beacon. The relay may include RAW allocation information on an STA in a relay beacon and then transmit the same to STAs associated with the relay. Transmission between the relay and an STA may be performed within an allocated resource. The relay may use a channel allocated through an advance-negotiation with the root AP for a relay beacon transmission channel and a channel used for transmission with an STA within a cluster. Channel allocation information may be indicated using relay resource allocation information, or may be omitted. A channel allocated by the root AP may be used for transmission between the relay and the root AP. The transmission between the relay and the root AP may be performed based on a transmission duration allocated by the root AP to a root beacon as a RAW.

The same leveled method as the method (A) may be employed for the above method. That is, a root AP may allocate only a resource for a relay cluster, and may not allocate a RAW of an STA associated with a relay within the relay cluster. The root AP may allocate only a RAW for a relay and an STA directly associated with the root AP. RAW allocation with respect to an STA associated with each relay may be performed within a resource allocated to a corresponding relay, for example, a transmission channel and a transmission duration allocated to the corresponding relay.

An STA associated with a relay may verify RAW/slot allocation information based on a relay beacon, and a relay and an STA directly associated with the root AP may verify the RAW/slot allocation information based on a root beacon.

Similar to the method (A), a root AP may set an empty RAW in a root beacon to protect transmission of a corresponding relay cluster in a case of transmission between relays using the same frequency subband as the root AP. That is, the root AP may allocate, as an empty RAW, the entire relay transmission duration using the same frequency subband as the root AP or a portion thereof. A relay and an STA directly associated with the root AP may not perform transmission in a time duration indicated in an empty RAW based on a root beacon. Accordingly, in the time duration indicated in the empty RAW, transmission of a relay cluster allocated to the same frequency subband as the root AP may be protected.

A method of setting an empty RAW, which is the same as the method (A), or a method of disallowing transmission excluding transmission of an explicitly allocated RAW may be used for a protecting method so that STAs within each relay cluster may not perform transmission in a duration excluding an explicitly allocated relay cluster transmission duration.

<Method of Protecting a Resource Allocated to Another Relay>

To prevent a collision of an STA belonging to a root BSS in another relay BSS transmission duration using the same channel, a root AP may prohibit transmission of the STA by explicitly setting the other relay transmission duration as an empty RAW or an AP PM RAW. The root AP may determine whether the root BSS is spatially separated from the other relay BSS. When the root BSS is spatially insufficiently separated, the root AP may prohibit transmission of an STA associated with the root AP in another relay transmission duration by setting the other relay transmission duration as an empty RAW or an AP PM RAW. Alternatively, the root AP may also prohibit transmission of a predetermined STA that is greatly affected by interference of the other relay BSS, among STAs in the root BSS, rather than prohibiting transmission of all of the STAs in the root BSS with respect to the other relay transmission duration. To this end, the root AP may use a RAW allocation method of excluding, from RAW allocation, a modified empty RAW or a modified AP PM RAW capable of indicating an STA prohibited from performing transmission or the STA prohibited from performing transmission.

A method in which a root AP verifies whether a predetermined STA in a root BSS is affected by interference of another relay BSS may use a method in which a root AP receives interference information of an STA using "(BB) method of determining spatial separation between relays", or an STA of a root BSS affected by interference directly informs a root AP of information on another relay BSS or another STA to which the STA affects interference.

To prevent a collision occurring when an STA belonging to a relay BSS performs transmission in a transmission duration of another relay BSS using the same channel, a relay AP may prohibit transmission by setting the transmission duration of the other relay BSS as an empty RAW or an AP PM RAW, which is similar to the method (A). A relay may periodically determine whether the relay is spatially separated from another relay BSS. When the spatial separation is determined to be insufficient, the relay may prohibit transmission of an STA associated with the relay by setting a transmission duration of the other relay as an empty RAW or an AP PM RAW. Alternatively, the relay may prohibit transmission only with respect to a predetermined STA relatively greatly interfering with the other relay BSS among STAs in the relay BSS. To this end, a RAW allocation method of excluding, from RAW allocation, a modified empty RAW or a modified AP PM RAW capable of indicating an STA prohibited from performing transmission or the STA prohibited from performing transmission may be used.

In a case in which a frame to be urgently transmitted from a root AP is present, transmission in a duration excluding a transmission duration allocated for root BSS transmission may be allowed as an exception. Also, in level-1 transmission, an STA may transmit data, as an exception, in a duration in which transmission being performed in another relay BSS is not detected, or in a duration which a RAW is not allocated with respect to a corresponding relay BSS as a result of the determining based on a beacon of another relay, although the time duration corresponds to a time duration not allocated to a relay to which the STA belongs.

Alternatively, even in a duration in which transmission to an AP is not allowed, all of an STA belonging to a root AP and an STA belonging to a relay may be allowed to transmit data through contention, which is similar to transmission in an existing OBSS environment. However, in a case of transmitting data in a duration that is not allocated to a BSS to which a corresponding STA belongs, a collision probability may be relatively high and thus, the STA may perform RTS/CTS in advance of data transmission.

A relay or a root AP may explicitly prohibit transmission of STAs associated therewith by setting, as an empty RAW, a duration in which intense collision or contention is expected, among transmission durations not allocated to the relay or the root AP. In addition, the relay or the root AP may prohibit an STA from performing transmission to a relay in a duration in which transmission between the relay and the root AP is performed, by setting, as an empty RAW, the duration in which the transmission between the relay and the root AP is performed.

The above method of protecting a resource allocated to another relay may be similarly applicable to the method (A) using a DRAW.

<Protection Method with Respect to a Resource Allocated to a Relay>

A relay may explicitly request a root AP to protect a resource allocated to the relay. In response to the request from the relay, the root AP may explicitly prohibit transmission of predetermined relay BSSs or a portion of STAs of a predetermined BSS with respect to the resource allocated to the relay, for example, a transmission duration. Here, the portion of STAs may also include an STA of a root BSS.

For example, in a case in which a relay is seriously affected by interference due to transmission of another relay BSS or predetermined STAs belonging to the other relay BSS, or STAs directly associated with a root BSS, and desires to prohibit the entire or a portion of STAs of the other relay BSS or the STAs directly associated with the root BSS from performing transmission in a transmission duration allocated to the relay, the relay may request the root AP to protect the resource allocated to the relay. When requesting the root AP to protect the allocated resource, the relay may transmit, to the root AP, a list of predetermined STAs or the other relay BSS interfering with the relay.

Also, each of the STAs in a relay BSS may transfer, to a relay AP, information on a predetermined STA or a relay BSS seriously interfering with a corresponding STA. The relay AP may transfer, to a root AP, information on the relay BSS and the STA transferred from the STA. In this example, STAs may not require a measurement function disclosed in the 802.11k standard and the like. In a case in which STAs have the measurement function, the relay AP may request the STAs to perform a measurement and may identify the other relay BSS and the STA that interferes with an STA associated with the relay AP based on a result of the measurement received from each STA. The relay AP may notify the identified relay BSS and STA to the root AP.

In response to a resource protection request received from a relay, a root AP may indicate, in a resource allocation IE, a relay BSS or predetermined STAs strictly disallowed to perform transmission in a corresponding transmission duration with respect to the relay having made the resource protection request.

When a relay is included in a list of relays prohibited from performing transmission in a resource allocation IE of another relay BSS, the relay may not perform transmission in a transmission duration of the other relay BSS. The relay may explicitly prohibit transmission of an STA belonging to the relay by allocating an empty RAW or an AP PM RAW to the STA, thereby protecting a resource of the relay having made a resource protection request. When in the relay resource allocation IE is indicated that transmission with respect to a portion of STAs in a relay BSS, rather than the entire relay BSS, is prohibited, the relay may prohibit only a predetermined STA from performing transmission in the transmission duration of the corresponding relay BSS. The relay resource allocation IE may include resource allocation information on a resource allocated by a root AP and used for transmission between the relay and the STA associated with the relay. Which relay is communicable with an STA in which time duration may be determined based on the relay resource allocation IE.

To prohibit transmission of a predetermined STA in a relay BSS, (1) a method of modifying and thereby using an AP PM or an empty RAW or (2) a method using RAW allocation may be employed. In the method (1), a relay may include, in the AP PM RAW or the empty RAW, an AID or partial AID list of STAs to be prohibited from performing transmission in a predetermined duration. The relay may explicitly disallow only a prohibited STA to perform transmission in the AP PM RAW or the empty RAW duration, and may allow remaining STAs to perform transmission through contention. In the method (2), the relay may disallow only an explicitly prohibited STA to perform transmission by not allocating the prohibited STA to a RAW. The prohibited STA may correspond to an STA affected by interference of another relay.

In a case in which a relay is affected by interference of a predetermined STA in a root BSS and requests resource protection, the corresponding STA may not be included in a relay resource allocation IE, and a root AP may prohibit the corresponding STA from performing transmission in a relay transmission duration.

The above method of protecting a resource allocated to a relay itself may be similarly applicable to the method (A) using a DRAW. In the case of the method (A), a strictly disallow bit, a list of relay APs, and a list of STAs may be indicated using fields of a DRAW.

In a case in which information even including information a strictly disallowed STA is indicated in a relay resource allocation IE, a length of a beacon may overly increase. As another method, a root AP may collect information on an STA and a relay AP to be strictly disallowed, which is received from a relay. In this method, the root AP may broadcast or unicast, to each relay using a separate frame, a message including the collected information for each relay BSS. In response to the message including information on the STA and the relay AP to be strictly disallowed, the relay may verify whether the relay itself or an STA associated with the relay is strictly disallowed in a transmission duration of another relay. When it is verified that the relay or the STA is strictly disallowed, the relay may not perform transmission in the transmission duration of the other relay.

<Detailed Description as to Allocation of a Frequency Subband in the Method (B)>

In an initial stage, a relay attempts to be associated with a root AP as an STA. Next, the relay may request the root AP to set up a relay BSS and to operate as a relay AP, and may operate as the relay AP in response to an approval from the root AP.

The relay may request the root AP for a resource required for a cluster of the relay used when the relay operates as the relay AP together with an association request. Alternatively, when the relay requests the root AP to operate as the relay AP, the relay may also request the root AP for the resource required for the cluster of the relay together with a relay setup request. For example, the relay may include the following information in the association request or the relay setup request and thereby transmit the same to the root AP.

1) Information related to a channel allocation request for a relay cluster: A relay BSS starting channel number, a relay primary channel number, and a relay bandwidth may be included in information related to a channel allocation request for a relay cluster. A relay may transmit a list of available channel candidates to a root AP. The root AP may allocate a channel not overlapping a channel of another relay BSS to the relay. In a case of allocating a plurality of relays to the same frequency subband, the root AP may allocate relays using the same frequency subband to different time durations. In a case in which a current relay is spatially separated from another relay BSS, the root AP may allocate the same frequency subband to a current relay BSS and the other relay BSS although a time duration corresponds to the same time duration.

2) Relay beacon interval: A relay beacon interval refers to a transmission interval of a relay beacon. A relay may determine the relay beacon interval through negotiation with a root AP. The relay may periodically transmit a relay beacon subsequent to setup of a relay BSS, and the root AP may allocate, to the corresponding relay, a point in time in which the relay is to transmit a beacon and a predetermined time subsequent thereto. In a case in which a relay cluster uses the same frequency subband as the root AP, the root AP may protect a transmission duration of the relay cluster using an empty RAW.

A relay beacon may be transmitted in a most initial transmission duration among transmission durations allocated to a relay. Alternatively, a root AP may allocate a relay beacon transmission RAW after a root beacon is allocated. Each relay may transmit a relay beacon based on the allocated relay beacon transmission RAW. In this example, a transmission duration allocated to each relay and a point in time in which a relay beacon is transmitted may not be directly continued.

In addition, the relay may transmit, to the root AP, requirements such as a relay transmission duration, for example, a transmission time required by a relay during a full beacon interval of the root AP, or transmission duration related information used when the root AP determines a relay transmission duration. For example, the transmission duration related information may include a mean data rate of STAs associated with the relay, a target wake time, or a wake interval. The root AP may allocate a required time duration to each relay cluster based on the received requirements or transmission duration related information. In a case of association to the root AP or a relay setup request, the relay may transmit relay transmission duration related information to the root AP. Alternatively, the relay may exchange related information with the root AP using an additional resource allocation request frame after being associated with the root AP. The relay may also transmit, to the root AP, information on a degree of spatial separation with respect to another relay BSS.

A root AP may respond to an association request of a relay using an association response. Here, information on a transmission duration allocated by the root AP may be included in an association response frame and thereby be transmitted. Alternatively, in a case in which the relay transfers a relay related parameter to the root AP using a separate relay setup request, the root AP may include, in a response frame thereto, information on a transmission duration allocated by the root AP. For example, the root AP may inform the relay of channel allocation information such as a relay BSS starting channel number, a relay primary channel number, and a relay bandwidth, and a relay beacon interval allowed by the root AP. Also, the root AP may inform the relay of a negotiation result associated with the relay transmission duration.

Information allocated by a root AP to a relay in an initial stage may be modified using an additional operation mode change request/response frame or a resource allocation change request/response frame. When the number of STAs associated with a relay increases or decreases, a resource required for transmission of a relay cluster may be changed. The relay may request the root AP for a relay cluster bandwidth and relay transmission duration requirements even after being associated with the root AP. Accordingly, the entire resources may be further efficiently utilized. In a case in which a channel used in a relay BSS is changed, the relay AP may notify a channel change to STAs associated with the relay AP using a channel switch announcement frame disclosed in an existing 802.11 standard.

The root AP may also allocate the same transmission duration to spatially separated relays based on information on a degree of spatial separation with respect to another relay BSS, which is transmitted from a relay.

Also, the relay AP may periodically or aperiodically measure a degree of spatial separation with respect to the other relay BSS. When the measured degree of spatial separation is greater than or equal to a predetermined reference, the relay AP may feedback modified contents to a root AP. For example, in a case in which the relay AP is affected by great interference of existing separated another relay BSS or in an opposite case, the relay AP may inform the root AP of the above situation. The root AP may also newly allocate transmission of spatially separated relays to the same duration, based on spatial separation information between the relays.

Figure 39:
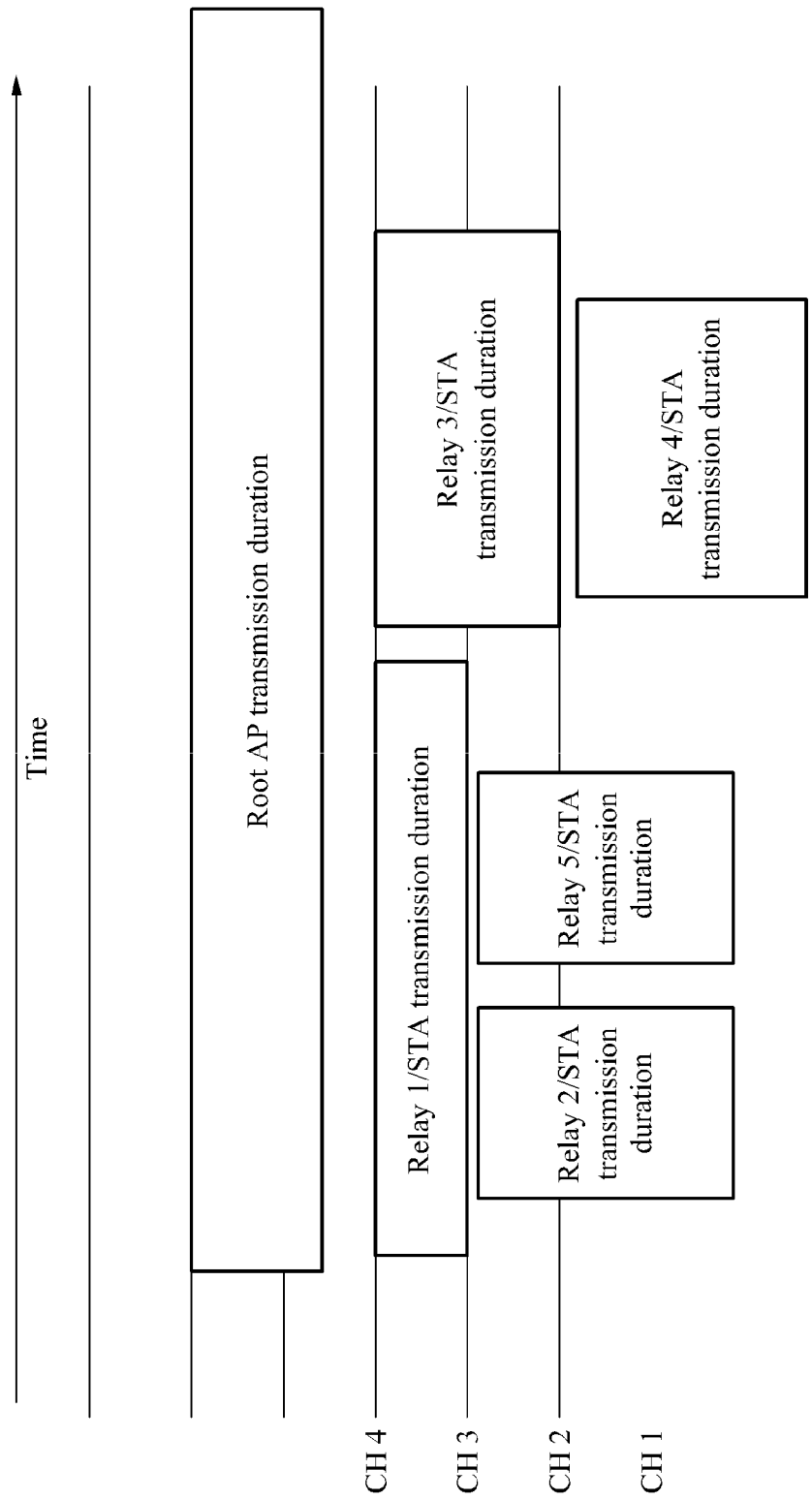
FIG. 39 illustrates an example of allocating a plurality of frequency subbands according to an embodiment.

FIG. 39 illustrates an example of allocating a plurality of frequency subbands according to an embodiment.

For example, FIG. 39 illustrates an example of allocating a plurality of different frequency subbands to a plurality of relays and a root AP to enable simultaneous transmission. Referring to FIG. 39, transmission between a relay 1 and an STA associated with the relay 1, transmission between a relay 2 and an STA associated with the relay 2, and transmission between a root AP and a relay or an STA directly associated with the root AP may be performed using different channels and thus, may be simultaneously performed. A relay and a root AP using different frequency subbands may independently perform transmission. Relays, for example, the relay 1 and a relay 3, using the same frequency subband may need to perform transmission in different transmission durations. An STA may communicate with an associated relay using a frequency subband used by the associated relay. A relay may communicate with a root AP using a frequency subband allocated by the root AP.

Figure 40:
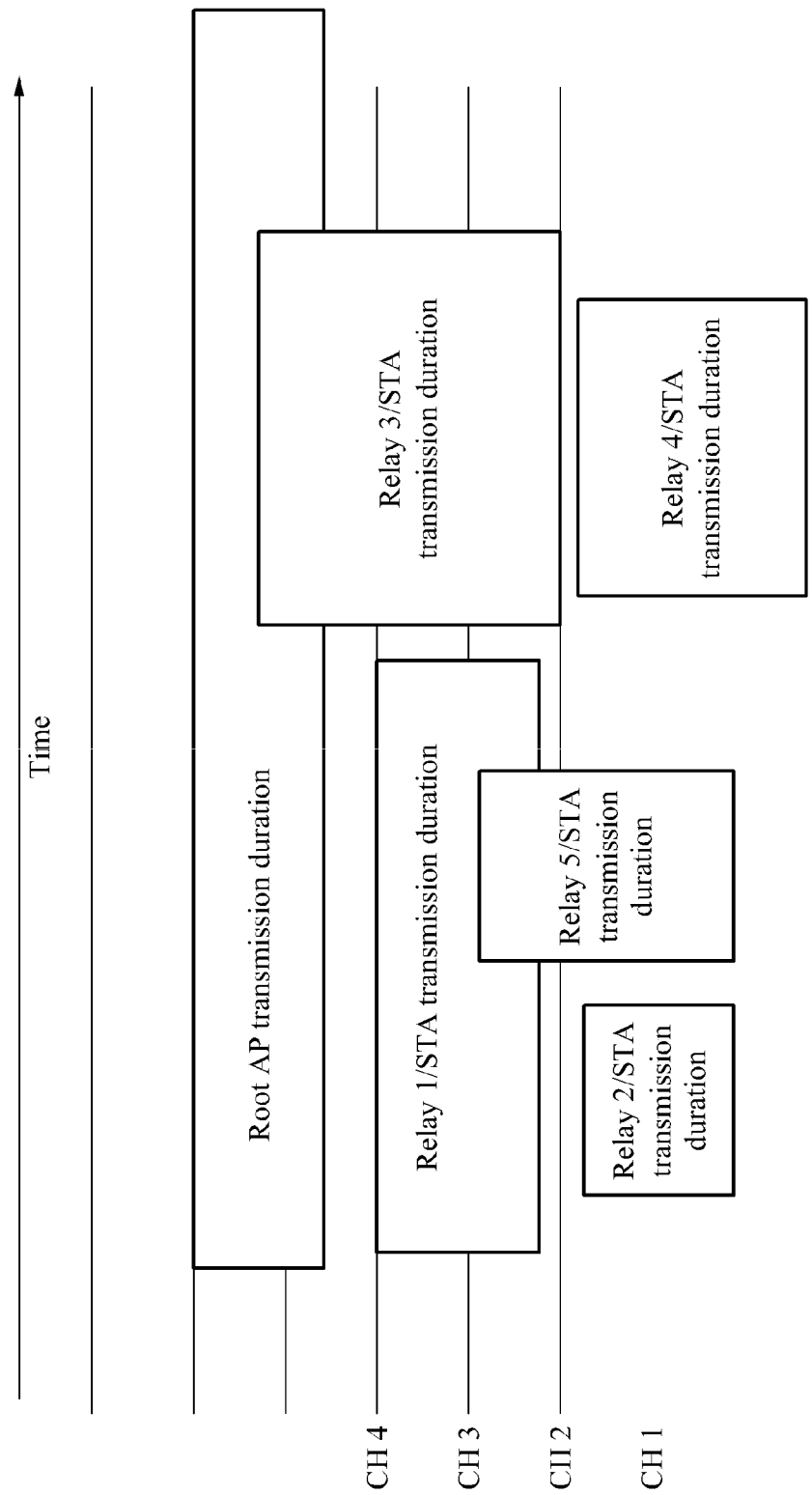
FIG. 40 illustrates an example of allocating a plurality of frequency subbands according to another embodiment.

FIG. 40 illustrates an example of allocating a plurality of frequency subbands according to another embodiment.

For example, dissimilar to the example of FIG. 39, FIG. 40 illustrates a case of allocating frequency subbands so that a portion of channels may overlap in the example of allocating different frequency subbands to a plurality of relays and a root AP to enable simultaneous transmission. The overlapping channel allocation may be useful in a case in which the number of available channels is relatively small. A primary channel of each of relay APs and a root AP may not be overlappingly allocated and only a secondary channel may be overlappingly allocated. In a case in which the number of channels is insufficient, the root AP may overlappingly allocate a portion of channels as illustrated in FIG. 4, and may transmit, to a relay, channel allocation information on each relay that includes even allocation of an overlapping channel. Here, the channel allocation information is referred to as default channel allocation information. The channel allocation information may be shared in advance between the relay and the root AP. In addition, channel allocation information may not be explicitly informed using a relay resource allocation IE or may be explicitly informed using the relay resource allocation IE. In a case in which channel allocation information is not explicitly informed using the relay resource allocation IE, the root AP may inform a relay that is allowed to use an overlappingly allocated channel in a predetermined time duration when transmitting the resource allocation IE, that is, when performing resource allocation. The root AP may inform, using the resource allocation IE, information to be additionally informed when performing resource allocation. Information to be additionally informed may include information on an entity that is to use an overlappingly allocated channel. When additional channel allocation information is absent in the resource allocation IE, a relay may use a channel allocated to the relay, including the overlappingly allocated channel. When a predetermined relay is allowed to use an overlapping channel, the root AP may disallow another relay to which the channel is overlappingly allocated to use the corresponding channel. For example, the root AP may transfer a reduced bandwidth or a disallowed channel number to the other relay to which the channel is overlappingly allocated.

For example, in a case in which a channel CH2 is allocated to both a relay 5 and a relay 3, and a channel CH5 is allocated to the relay 5 at a predetermined point in time, a root AP may inform the relay 3 of a bandwidth reduced to be less than an initially allocated bandwidth, or may inform the relay 5 not to use the channel overlappingly allocated to the relay 3 using a resource allocation IE. Information on an overlapping channel allocation may not be included in the resource allocation IE to be transferred to the relay 5. That is, when information on an overlapping channel allocation is explicitly absent in a resource allocation IE, a relay may use all of the channels allocated to the relay, including an overlapping channel. Conversely, in a case in which channel allocation information is indicated in the resource allocation IE not to use an overlapping channel or to use a reduced bandwidth excluding the overlapping channel, a relay may perform transmission in a cluster using the reduced bandwidth, that is, the bandwidth excluding the overlapping channel.

Also, in a case in which a transmission amount of a predetermined relay is temporally large and the number of channels is sufficient, a root AP may temporarily allocate, to a corresponding relay, an additional channel in addition to an initially allocated channel. The root AP may transmit information on an extended bandwidth or information on a channel additionally allocated to a resource allocation IE for the corresponding relay, for example, an additionally allocated channel number. In response to the received information on the additionally allocated channel or information on the extended bandwidth, the relay may use the channel additionally allocated by the root AP.

Hereinafter, an example of informing allocation of an overlapping channel or allocation of a temporary additional channel using a resource allocation IE will be described.

(a) Option 1: indicates using "channel number+0/1". "0" is used when informing transmission prohibition with respect to an initially overlappingly allocated channel, and "1" indicates transmission allow. In a case of transmission allow in an initially allocated overlapping channel, channel information may be omitted. In a case in which a root AP temporarily allocates an additional channel, the number of the allocated additional channel may be indicated in a resource allocation IE.

(b) Option 2: indicates a bandwidth of a changed channel. In a case of transmission disallow in an overlapping channel of a relay, a bandwidth may be reduced compared to an initially allocated bandwidth and thus, a root AP may transfer the reduced bandwidth to the relay. In a case in which the root AP temporarily allocates an additional channel, the root AP may transfer information on an extended bandwidth using a resource allocation IE. In this example, only changed bandwidth information is indicated and thus, a length of the resource allocation IE may not increase although a plurality of channels is additionally allocated. In a case of informing channel information, for example, a primary channel, a bandwidth, and a starting channel number allocated to a relay resource allocation IE every time, there is no need to inform to which relay an overlapping channel is allocated and which bandwidth is temporarily changed.

In a case of informing, using a resource allocation IE, information changed from initial channel allocation in response to allocation of an overlapping channel or allocation of a temporary additional channel, 1) a relay may inform a BSS bandwidth through a relay beacon in a case in which a bandwidth is temporarily changed over the entire relay beacon interval. The relay may inform a relay BSS bandwidth using a full beacon. Also, in a case in which a relay beacon is provided in a short beacon format, the relay may inform STAs of a cluster of a change in the relay BSS bandwidth using a BSS bandwidth field of an FC of the relay beacon. Also, 2) in a case in which a bandwidth of a relay BSS is changed only in a portion of a relay beacon interval, the relay may indicate channel information in a RAW for a duration in which the bandwidth is changed. For example, the relay may indicate the duration in which the bandwidth is changed, using "central frequency+channel bandwidth" or "bandwidth". In a case in which a secondary channel increases or decreases only in one direction, the relay may inform only a changed bandwidth. A change in channel allocation may be allowed only with respect to a secondary channel of a relay BSS.

In a case of temporarily changing a channel allocated to a root AP, the root AP may also inform channel allocation information by indicating channel information in a RAW for a changed time duration.

<(B) Resource Allocation Signaling Method in a Method of Allocating Resources Using Resource Allocation Information>

To inform resource allocation, an AID(s) of a relay allowed to perform transmission, a transmission allow starting time, a transmission duration, resource allocation period information in a case in which a resource is periodically allocated, allocated frequency subband information in a case in which multiple frequency subbands are allocated, information on additional resource allocation such as allocation of an overlapping channel/temporary channel, information regarding whether another relay/STA is prohibited from performing transmission in an allocated relay transmission duration, and information of a relay/STA prohibited from performing transmission may be required. Subband allocation information, for example, default subband allocation information may be shared between a relay and a root AP when the relay is associated with the root AP. Thus, in addition to a temporary change such as allocation of an overlapping channel/temporary channel, separate signaling may be omitted in a resource allocation IE. Channel information on a channel allocated to each relay may be explicitly included in a resource allocation IE, and each of relays may identify channel allocation information of different relays through a root beacon. Each of the relays may recognize a relay allocated to the same channel of a corresponding relay through a root beacon. In a case of explicitly informing channel information, for example, a primary channel, a bandwidth, and a starting channel number allocated to a resource allocation IE every time, there is no need to inform to which relay an overlapping channel is allocated and which bandwidth is temporarily changed.

Also, a root AP and a relay may share information on a relay beacon interval in advance through advance negotiation. The root AP may allocate a relay transmission duration to transmit a relay beacon based on the relay beacon interval. A relay resource allocation IE may be included in a root AP beacon and thereby transmitted. The relay resource allocation IE may also be transmitted using a newly defined frame.

Hereinafter, a method of indicating resource allocation information in a resource allocation IE will be described.

1) Method of Indicating Resource Allocation Information for Each Relay AID

A relay AID(s), a relay start time, a duration, a period, and other allocation information allocated in a short beacon interval of a root AP may be included in a resource allocation IE. For example, the other allocation information may include allocated channel information or information on a strictly disallowed relay/STA.

In a case in which a resource is periodically allocated, there is no need to transmit a relay resource allocation IE for each short beacon. For example, the relay resource allocation IE may be included only in a case of a long beacon transmission.

The following Table 3 shows an example of a resource allocation IE format in a case of indicating resource allocation information for each relay AID. Referring to Table 3, a value of each field, a field order, and the like are only an example and thus, may be modified in a similar form.

TABLE 3

| Feature | | | Value | Note |
|---|---|---|---|---|
| Relay Partial AID(s) | | | 9 bits | describes relay that is allowed to use corresponding resource. (In a case of allowing simultaneous transmission of spatially separated relay BSSs, plurality of AIDs may be designated.) |
| 1 or more | Start Time | | 8 bits | In a case in which a plurality of time durations is inconsecutively allocated with respect to the same relay in single beacon interval, plurality of durations and start times may be included in a list. |
| | Duration | | TBD bits | |
| | Additional allocation information (which is included only in a case of using simultaneous transmission of relay BSSs using frequency sub-channel) | | | Option 1- case of implicitly using channel allocation information: is used when allowing allocation of an overlapping channel or allowing allocation of temporary additional channel, and includes temporarily changed bandwidth information. Option 2 - case of explicitly using channel allocation information: explicitly indicates channel information such as BW, primary channel, and starting channel number allocated to relay BSS. In a case in which channel bandwidth is changed in consecutive duration, channel allocation information needs to be indicated by dividing start time/duration. To prevent the above event, root AP needs to allocate resources so that change in channel bandwidth may be minimized in allocated consecutive duration. In a case in which plurality of start times/durations is allocated and channel allocation information is identical to channel information allocated to previous start time/duration, channel allocation information may be omitted. |
| Period (Optional - present only in a case of performing periodic allocation) | | | TBD bits | is indicated using multiple of short beacon interval of a root AP. |
| Strictly disallow | | | 1 bit | describes whether transmission of predetermined relay or STAs is to be explicitly prohibited in allocated duration. |
| List of Relay BSS and STAs (multiple) | Relay BSS (a plurality of relay BSSs can be designated) | STA 1 | TBD bit | describes strictly disallowed relay or BSS in relay. describes single relay (Partial AID) + disallowed STA (partial) AID list in the corresponding relay. Multiple relay AID lists may be provided. |
| | | STA N | TBD bit | When transmission of the entire relay BSS is disallowed, STA (partial) AID may be omitted, or may be indicated using predetermined pattern, for example, 000..0 or 111..11. |

Frequency sub-channel information of additional allocation information may be included in a case of performing simultaneous transmission between relays using different frequency sub-channels. 1) In a case in which channel allocation information is implicitly indicated, that is, in a case in which a relay and a root AP share channel allocation information in advance between and separate relay information is not explicitly indicated, a relay bandwidth may be indicated in a resource allocation IE only in a case in which an initially allocated bandwidth is changed. For example, the relay bandwidth may be indicated in a case of additional allocation of a temporary channel or transmission disallow in an overlappingly allocated channel. 2) In a case in which channel allocation information is explicitly indicated, channel information, for example, a bandwidth, a primary channel, and a starting channel number allocated to a relay BSS may be explicitly indicated in a resource allocation IE.

In a case in which simultaneous transmission of spatially separated relay BSSs is allowed, a plurality of AIDs may be designated. When location information of two relays completely matches, a length of an IE may be reduced using a plurality of AIDs. Although relay BSSs are spatially separated, each set of allocation information may be included for each AID when there is a difference in resource allocation information.

A strictly disallowed bit indicates whether transmission of a predetermined relay or STAs is explicitly prohibited in an allocated duration. In a case in which the strictly disallowed bit is "1", information on a strictly disallowed relay and STA may be included in an IE. The strictly disallowed bit may be used to indicate whether transmission is disallowed with respect to the entire relay BSS or whether transmission is disallowed with respect to a portion of STAs in a relay BSS.

In a single short beacon interval, a relay may list allocated inconsecutive time durations as a list at a time and thus, may need to indicate resource allocation only once. When a relatively large number of relays are used, a start time and an end time need to be indicated for each relay and thus, a length of a resource allocation IE may increase.

In a case in which there is a duration in which a bandwidth temporarily varies in a duration allocated to a relay, the duration may need to be divided and thereby be indicated. However, if a root AP properly aligns a time, it may be possible to prevent the duration from being divided and thereby being indicated. The same time duration may be allocated to a plurality of relays. In this example, the same time information may need to be indicated in relay allocation information to be simultaneously transmitted. In a case in which transmission is not completed in a time duration allocated to a predetermined relay cluster, a transmission duration allocated to be simultaneously used in a plurality of relay clusters may be used to complete the transmission.

Figure 41:
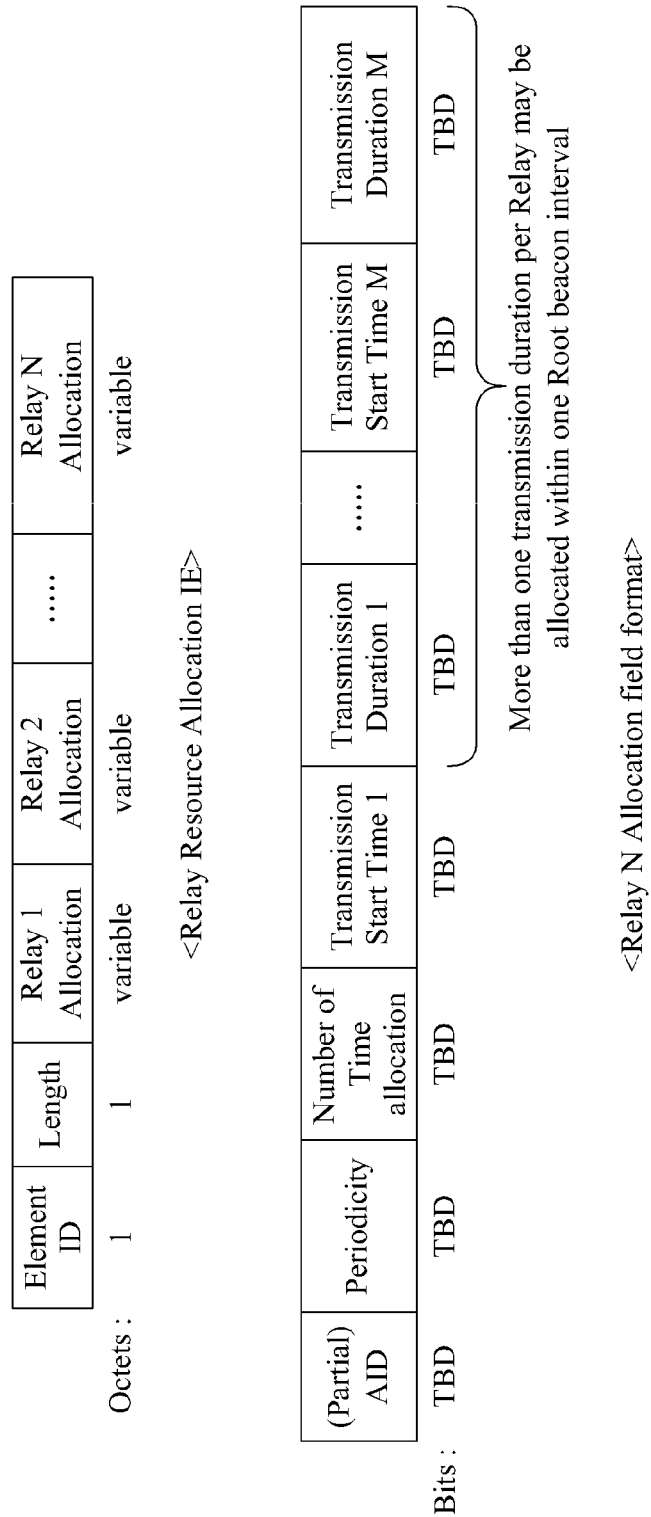
FIG. 41 illustrates an example of a format of a relay resource allocation IE of Table 3 according to an embodiment.

FIG. 41 illustrates an example of a format of a relay resource allocation IE of Table 3 according to an embodiment. Resource allocation information allocated to a plurality of relays may be included in the relay resource allocation IE for each AID. Resource allocation associated with each relay may be defined in a relay N allocation field. A plurality of time durations allocated to a relay may be defined in each relay N allocation field. For example, a time duration allocated to a relay may refer to a time duration allocated within a single root beacon.

2) Method of Indicating Allocation Information for Each Frequency Subband in which an Allocated Relay is Present For example, allocation information may be indicated in a relay resource allocation IE in a form of "{frequency subband, {relay AID allocated to frequency subband, relay start time, duration+period, strictly disallow, list of strictly disallowed relay APs or STAs in the relay BSS} list}" for each frequency subband. Frequency subband allocation information for each relay is shared when a corresponding relay is initially associated with a root AP and thus, may have no need to be indicated for each frequency subband.

3) Method of Indicating Resource Allocation Information for Each Time Duration

Figure 42:
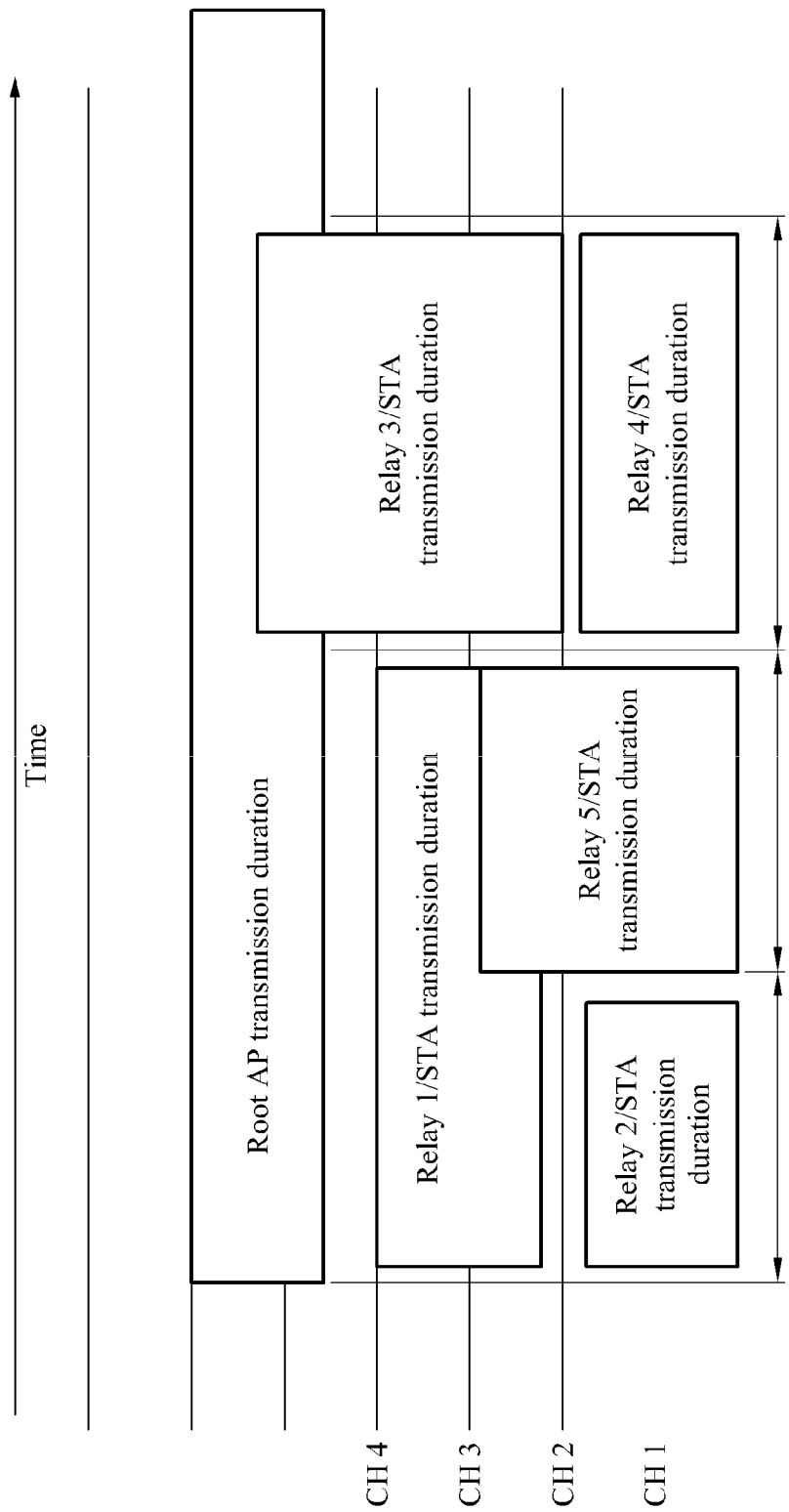
FIG. 42 illustrates an example of allocating resources for each time duration according to an embodiment.

FIG. 42 illustrates an example of allocating resources for each time duration according to an embodiment. A beacon interval or a short beacon interval may be divided into time durations. "{Start time, duration+period, {relay AID allocated to corresponding time duration, other allocation information, for example, channel allocation information, strictly disallow, list of strictly disallowed relay APs or STAs in the relay BSS} list}" may be indicated in a relay resource allocation IE for each time duration. Here, the time duration refers to a time duration longer than a RAW.

The following Table 4 shows a format of a resource allocation IE in a case of indicating allocation information for each time duration.

TABLE 4

| Feature | | Value | Interpretation |
|---|---|---|---|
| Start Time | | 8 bits | |
| Duration | | TBD bits | RAW is allocated to each relay within this range. |
| Period (Optional - case of periodic allocation) | | TBD bits | Multiple of short beacon interval of root AP |
| Repeat number of times corresponding to number of relays allocated to corresponding time duration | Allocated relay AID | 9 bits | describes an allocated relay. |
| | Other allocation information | | describes related information or explicit relay channel allocation information when allowing partial channel overlapping or allowing temporal allocation of additional channel. |
| | Strictly disallow | | describes whether transmission of predetermined relay or STAs is to be explicitly prohibited in allocated duration. |
| | List of relay BSS and STAs | TBD bit | describes strictly disallowed relay or BSS in relay. Single relay (Partial AID) + disallowed STA (partial) AID list in the corresponding relay may be listed. Multiple relay AID lists may be provided. |
| | | TBD bit | When transmission of the entire relay BSSs is disallowed, STA (Partial) AID may be omitted, or may be indicated using predetermined pattern, for example, 000..0 and 111..11. |

There is no need to indicate a start time and an end time of a time duration a plurality of times for each relay. It is enough to indicate the start time and the end time once for relays belonging to the same duration. A format of a resource allocation IE may be similar to a format of an RPS IE when using a RAW. When the number of relays allowed to perform transmission is relatively large in the same time duration and time durations are similar, a method of indicating resource allocation information for each time duration may be appropriate. When the number of relays is relatively small and time durations in which relays allowed to perform transmission significantly differ, a method of indicating resource allocation information for each relay AID may be appropriate.

<(B) Transmission Duration Protecting Method in a Method of Allocating Resources Using Resource Allocation Information>

The method (B) of allocating resources using resource allocation information may also use an empty RAW for transmission duration protection, which is similar to the method (A) using a DRAW.

In the method (A) using a DRAW, at a level 0, a root AP may use a DRAW to protect transmission of a relay cluster using the same frequency subband as the root AP. Explicit transmission prohibition information on a transmission protection duration and relay resource allocation information on a DRAW duration may be included in the DRAW.

In the method (B) of allocating resources using resource allocation information, relay resource allocation information may be transferred in a form of a relay resource allocation IE, instead of being transferred in a form of a RAW. Similar to resource protection at a level 1 of the method (A) using a DRAW, an empty RAW may be used for resource protection at a level 0. As another example, a method of allowing transmission only in an explicitly allocated duration without using an empty RAW may be used for resource protection. A resource protection method at a level 1 of the method (B) of allocating resources using resource allocation information may use the method using an empty RAW or the method of allowing transmission only in an explicitly allocated duration.

The following Table 5 shows a format for empty RAW signaling used when indicating a duration in which transmission of an STA (level 0 or 1) associated with an AP or a relay (level 0) is prohibited. Information shown in Table 5 may be included in an RPS IE as RAW information.

TABLE 5

| Feature | Value | Interpretation |
|---|---|---|
| Empty RAW indication | 1 bit | describes whether RAW corresponds to Empty RAW. |
| Empty RAW Start Time | 8 bits | describes point in time at which Empty RAW starts. Field present in conventional RPS IE may be used. In this example, Empty RAW Start Time is defined as Duration in TU from end of beacon transmission to Empty RAW Start time. |
| Empty RAW Duration | TBD bits | describes length of Empty RAW. Field present in conventional RPS IE may be used. In this example, Empty RAW Duration is defined as Duration of Empty RAW in TU. |

At a level 0, an empty RAW may be used to indicate a duration in which transmission of an STA associated with a root AP or transmission of another relay is prohibited in a transmission duration of a relay using the same frequency subband as the root AP. At a level 1, the empty RAW may be used to indicate a duration in which transmission of an STA in a relay cluster is prohibited outside an explicitly allocated duration. In a case in which the empty RAW is designated, transmission may be prohibited during a duration starting from an empty RAW start time and specified as an empty RAW duration.

In the 802.11ah standard capable of explicitly indicating a duration in which an AP enters a power save mode, when an AP power save bit is set to "1" in an RPS IE, it indicates that the AP may be in a sleep state in a corresponding RAW duration and an STA may not perform transmission with respect to the corresponding AP. Empty RAW signaling may be performed using the AP power save bit. For example, when an empty RAW setting duration is set as a RAW and the AP power save bit is set to "1", STAs may not perform transmission in a DRAW or RAW duration. Thus, the same effect as an effect of using an empty RAW may be achieved.

Conversely, an AP power save mode may be explicitly indicated by extending the empty RAW signaling method. When a duration in which an AP performs power saving is set as an empty RAW, an STA may not perform transmission in the duration set as the empty RAW and thus, the AP power save mode may be explicitly indicated. In this example, since a definition of the empty RAW may include a much fewer number of bits than a definition of a conventional RPS IE, it is possible to further reduced a length of the RPS IE by applying the empty RAW for to an AP power save indication.

Alternatively, all of an empty RAW indication bit and an AP power save bit may be indicated in an empty RAW. Although transmission between a relay and an STA associated with the relay is disallowed in the empty RAW for a level-1 duration, the relay may perform transmission with a root AP in the level-1 duration and may not perform power saving in reality. Thus, in a case of using all of the empty RAW indication bit and the AP power save bit, whether the relay is in a sleep state in reality may be explicitly indicated. When using a power save bit in a level-0 duration, a duration in which a root AP is not substantially in a sleep state in an empty RAW duration may be indicated. Also, the root AP may allow an STA that is to be newly associated with the root AP to perform transmission in the empty RAW duration.

In a case in which an empty RAW is explicitly allocated periodically, a form of a PRAW may be used. In this example, 1 bit indicating whether a RAW corresponds to a PRAW, and information on an interval of the PRAW may be additionally provided. For example, the interval of the PRAW may correspond to an integer value that indicates a multiple of a short beacon. Alternatively, 1 bit indicating whether a RAW corresponds to a PRAW may be omitted, and information on the interval of the PRAW may be additionally included in a root beacon in addition to items listed in Table 1.

In a case in which transmission of an STA in a cluster is explicitly prohibited outside a RAW, an empty RAW may not be used. At the level 0, a root AP may by allocate 1 bit in a root beacon and thereby may indicate whether transmission is prohibited in a RAW not explicitly allocated by the root AP. At the level 1, a relay may allocate 1 bit in a relay beacon and thereby may indicate whether transmission is prohibited in a RAW not explicitly allocated by a relay AP. For example, when the allocated bit corresponds to "1", an STA may not perform transmission in durations other than a duration explicitly set as the RAW.

In the 802.11ah standard, a duration in which AP enters a power save mode may be implicitly indicated. For example, when an AP power save bit is set to "1" in a short beacon or a beacon, an STA may be prohibited from performing transmission to an AP in durations other than an explicitly allocated RAW duration.

At the level 1, whether transmission of an STA is prohibited in durations other than a RAW duration allocated by a relay may be indicated using an AP power save bit. In a case in which transmission of an STA is to be prohibited in durations other than the RAW duration, when a relay sets the AP power save bit to "1" in a relay beacon, STAs may be prohibited from performing transmission in a DRAW or RAW duration. At the level 0, when a root AP sets the AP power save bit to "1" in a root beacon, a relay or an STA directly associated with the root AP may be prohibited from performing transmission in durations other than a RAW explicitly allocated by the root AP.

The following Table 6 shows modified empty RAW signaling information indicating that a predetermined STA is explicitly prohibited from performing transmission in a RAW duration.

TABLE 6

| Feature | Value | Interpretation |
| --- | --- | --- |
| Empty RAW indication | 1 bit | describes whether RAW corresponds to Empty RAW. |
| Empty RAW Start Time | 8 bits | describes point in time at which Empty RAW starts. Field present in conventional RPS IE may be used. In this example, Empty RAW Start Time is defined as Duration in TU from end of beacon transmission to Empty RAW Start time. |
| Empty RAW Duration | TBD bits | describes length of Empty RAW. Field present in conventional RPS IE may be used. In this example, Empty RAW Duration is defined as Duration of Empty RAW in TU. |
| List of Prohibited STAs | TBD bits | describes (partial) AID list of STAs prohibited from performing transmission in empty RAW duration. |

In an empty RAW duration, STAs specified in a list of prohibited STAs may be prohibited from performing transmission, and other STAs not specified therein may perform communication through empty RAW duration contention. Also, by adding the list of prohibited STAs to an AP PM RAW of the 802.11ah standard, only STAs specified in the list of prohibited STAs may be prohibited from performing transmission. The above example may be applicable to both the method (A) using a DRAW and the method (B) of allocating resources using resource allocation information.

Figure 43:
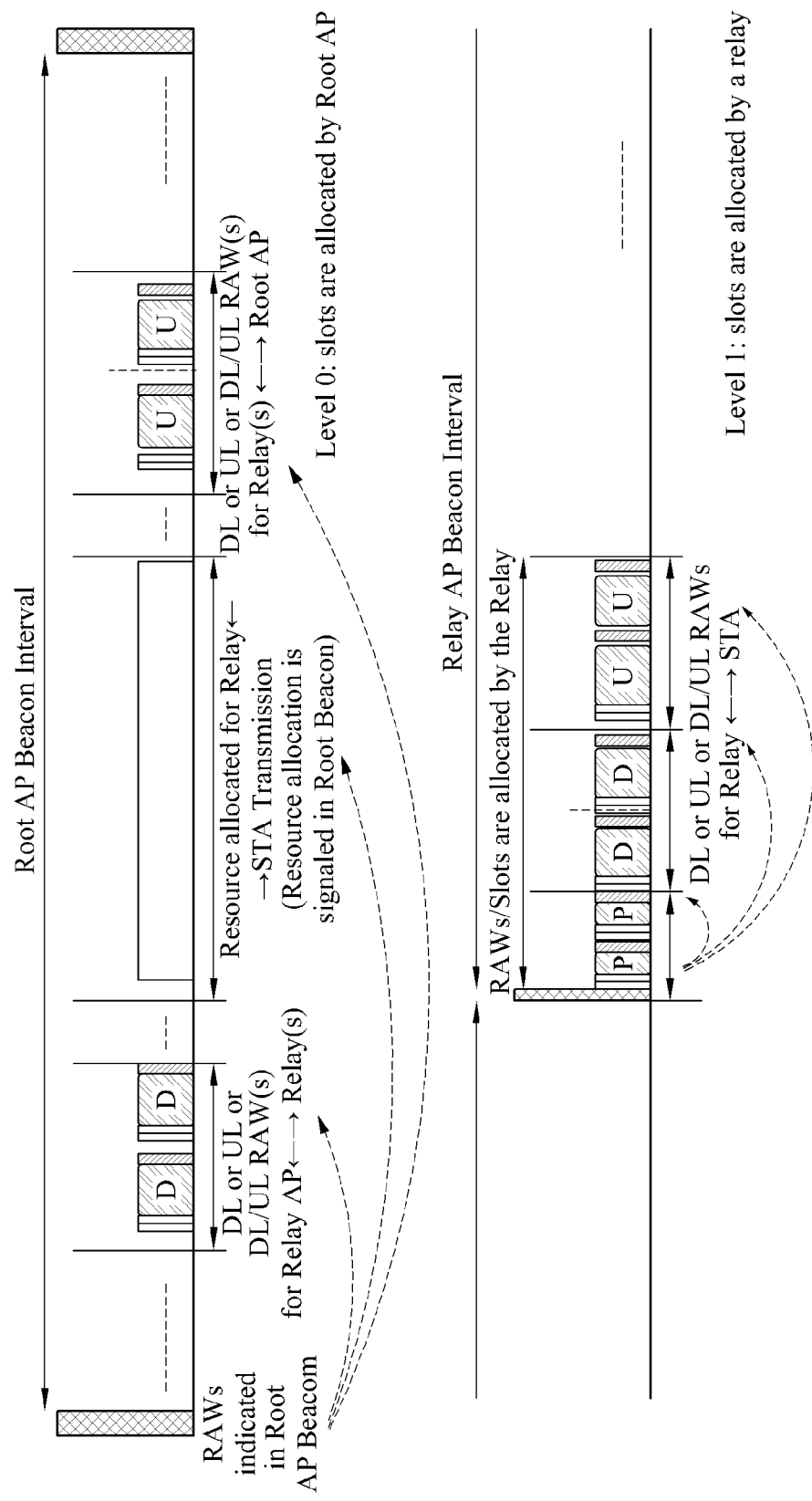
FIG. 43 illustrates an example of performing transmission using a relay resource allocation IE in a single frequency subband according to an embodiment.

FIG. 43 illustrates an example of performing transmission using a relay resource allocation IE in a single frequency subband according to an embodiment.

Referring to FIG. 43, resource allocation information may be included in a separate relay resource allocation IE and thereby transferred. A duration in which a resource is allocated may be explicitly protected using an empty RAW, or may be protected using an implicit method.

In a case in which transmission between STA-Relay-Root AP is performed in a single transmission opportunity (TXOP) using TXOP sharing, or in a case in which a predetermined STA transmits UL data to a relay in a UL slot of the STA in a transmission duration allocated to the relay and a slot still remains, the relay may directly transmit UL data to a root AP. In this example, the root AP may set a duration allocated to the relay as an empty RAW, thereby preventing transmission of an STA belonging to another root AP.

In a case of a DL, in a case in which a root AP transmits a DL frame about a predetermined STA to a relay in a duration allocated as a DL duration, a DL transmission slot allocated by the root AP to the relay remains, and the STA to receive the DL frame is waked up, the relay may immediately transmit the DL frame to the STA.

As another example, a root AP may transmit a DL frame to a relay using a slot allocated so that an STA may receive the DL frame from the relay. In this example, the root AP may set a duration allocated to the relay as an empty RAW, thereby preventing transmission of an STA belonging to another root AP. The relay may receive the DL frame about the STA from the root AP and then transmit the DL frame through a DL slot, for example, the slot allocated by the relay, for the corresponding STA.

Figure 44:
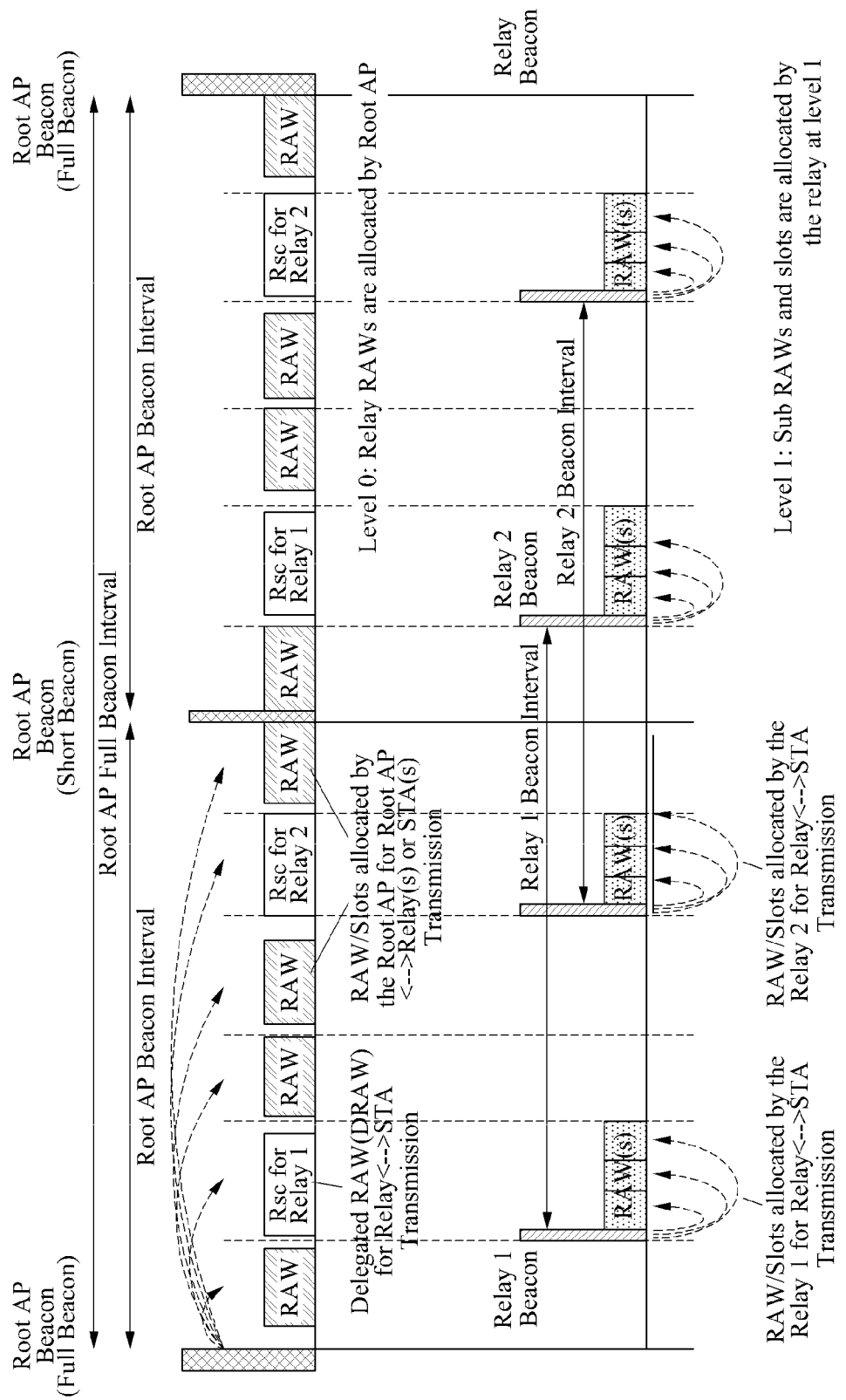
FIG. 44 illustrates another example of performing transmission using a relay resource allocation IE in a single frequency subband according to an embodiment.

FIG. 44 illustrates another example of performing transmission using a relay resource allocation IE in a single frequency subband according to an embodiment.

The embodiment of FIG. 44 refers to another example of performing transmission using the relay resource allocation IE in a single frequency subband. In this example, a method similar to a method using a DRAW is applied to resource allocation.

Figure 45:
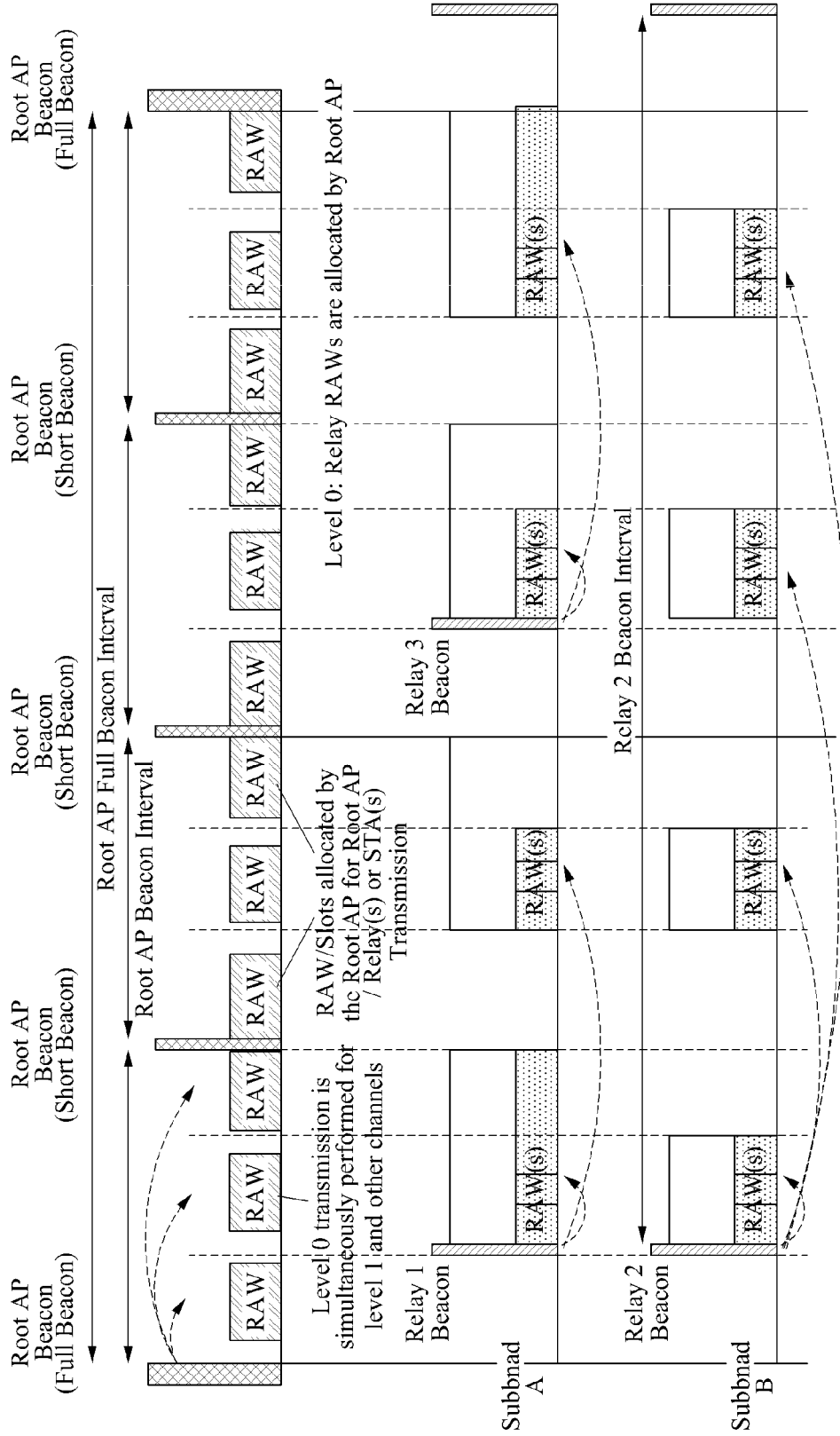
FIG. 45 illustrates an example of performing transmission using a relay resource allocation IE in multiple frequency subbands.

FIG. 45 illustrates an example of performing transmission using a relay resource allocation IE in multiple frequency subbands.

Referring to FIG. 45, a root AP may independently perform transmission in a frequency subband different from a relay, and relays using subbands A and B, respectively, may independently perform transmission. Since frequency subbands are mutually independent, time durations allocated to the respective relays at a level 1 may have no need to be aligned based on mutual time durations and may have no need to be aligned with a RAW of the root AP. Accordingly, enhanced flexibility and ease extensibility may be achieved compared to a case of using a DRAW.

The method (B) of allocating resources using resource allocation information may be applicable to all of the embodiments of FIGS. 23, 24, 25, 26, 27, 28, and 31 described as an example of the DRAW, FIG. 37 described as an example of simultaneous transmission in a case in which relay clusters are spatially separated, and FIG. 38 described as an example of simultaneous transmission in a time domain.

<(AA) Method in which a Root AP Allocates a Relay Transmission Duration Length at a Level 1>

When a relay is associated with a root AP and then negotiates a relay related parameter with the root AP, the relay may request the root AP for a beacon interval to be used by the relay and a duration used for a relay to perform BSS transmission and may be allocated with an initial relay BSS transmission duration from the root AP. Once transmission between the relay and an STA starts, the relay may determine whether allocation of a transmission duration for a relay BSS is further required or less required, and may feedback the determination result to the root AP. The root AP may adjust the transmission duration for the relay BSS based on information fed back from the relay and may reallocate the transmission duration to the relay BSS. The above method may be useful in a case in which an amount of traffic and a transmission interval are relatively constant. When transmission traffic and a transmission interval of an STA are not constant, the following method D and method E may be employed to more accurately allocate the transmission period of the relay BSS.

<Method D>

Figure 46:
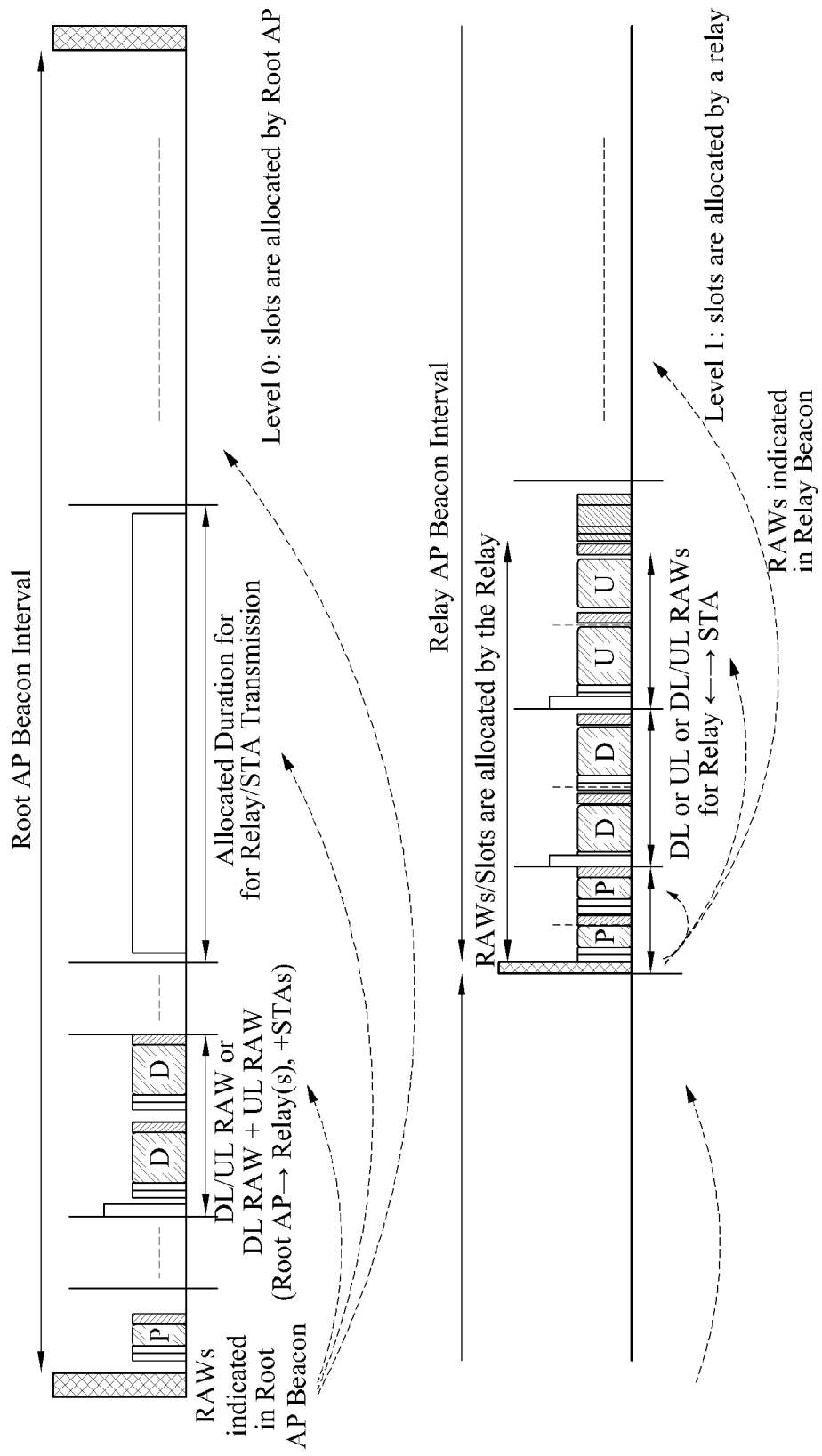
FIG. 46 illustrates an example of allocating a relay transmission duration according to an embodiment.

FIG. 46 illustrates an example of allocating a relay transmission duration according to an embodiment. A relay may feedback a mean data rate of an STA to a root AP prior to transmitting a next delivery traffic indication message (DTIM) of the relay. In a case of a target wake time (TWT) STA, TWT information may also be transmitted in addition to the mean data rate.

In a case of an implicit TWT, a wake interval may be additionally fed back to the root AP. In this example, a TWT is periodically transferred. Thus, although the relay does not feedback a TWT every time, the root AP may add a wake interval to a previous TWT and thereby determine a next TWT within a range in which the wake interval does not vary.

For example, a root AP may approximately determine the entire DL duration of a next TIM or DTIM duration based on "sum of (DL data size buffered for each STA to be set to TIM=1 with respect to next TIM or DTIM duration of relay beacon/mean data rate of each STA)+sum of data size buffered for each TWT STA waking up in next TIM or DTIM duration and having buffered data/mean data rate of each STA)".

For example, a root AP may determine a DL duration during a next relay beacon interval for a relay BSS according to the following Equation 1.

Expected DL Duration during the next Relay beacon interval = [Equation 1]

$$\Sigma_i \left[ \left( \frac{DataSizeBufferdForTIMSTA(i)}{MeanDLDataRateOfTIMSTA(i)} \right) * TIMbit(i) \right.$$
$$\left. ForNextRelayBeacon \right] +$$
$$\Sigma_j \left[ \left( \frac{DataSizeBufferdForTWTSTA(j)}{MeanDLDataRateOfTWTSTA(j)} \right) * \right.$$
$$\left. WithinNextRelayBeacon(j) \right]$$

In Equation 1, DataSizeBufferedForTIMSTA(i) denotes a data size (bits) of TIM STA(i) buffered by the root AP, and MeanDLDataRateOfTIMSTA(i) denotes a mean DL data rate (bits/s) of TIM STA(i). When a TIM bit for TIM STA(i) is set to "1" in a relay beacon, TIMbit(i)ForNextRelayBeacon for a next relay beacon is set to "1" and in other cases, TIMbit(i) for the next relay beacon is set to "0".

DataSizeBufferedForTWTSTA(j) denotes a data size (bits) of TWT STA(j) buffered by the root AP, and MeanDLDataRateOfTWTSTA(j) denotes a mean DL data rate (bits/s) of TWT STA(j). When a target wake-up time of TWT STA(j) is present within a next relay beacon interval, a value of WithinNextRelayBeacon(j) interval is set to "1" and in other cases, a value of WithinNextRelayBeacon(j) interval is set to "0".

Transmission durations of a TWT STA may not be adjacent to each other. In this example, times between the transmission durations of the TWT STA may be additionally added to a DL duration. Although a relay performs TIM segmentation, the relay may initially transmit a next relay beacon and then transmit remaining data when a time for first TIM segment transmission is insufficient.

A relay may transmit an expected data size to a root AP based on transmission statistics of UL data obtained so far. To determine an expected data size, a TIM STA may require information on an expected data size that is calculated based on a mean data rate (for UL) for a relay of an STA, and UL data transmission statistics of the STA obtained so far. To determine an expected data size, a TWT STA may also need to additionally transmit TWT information to the root AP. An implicit TWT may additionally transmit wake interval information to the root AP.

For example, a time duration required to transmit UL data in a relay BSS may be determined according to the following Equation 2.

Expected UL Duration during the next Relay beacon [Equation 2]

$$interval = \Sigma_i \left[ \left( \frac{MeanULDataSizeForTIMSTA(i)}{MeanULDataRateOfTIMSTA(i)} \right) + \right.$$
$$\Sigma_j \left[ \left( \frac{MeanULDataSizeForTWTSTA(j)}{MeanULDataRateOfTWTSTA(j)} \right) * \right.$$
$$\left. WithinNextRelayBeacon(j) \right]$$

In Equation 2, MeanULDataSizeForTIMSTA(i) denotes a mean UL data size (bits) for TIM STA(i), and MeanULDataRateOfTIMSTA(i) denotes a mean UL data rate for TIM STA(i). MeanULDataSizeForTWTSTA(j) denotes a mean UL data size (bits) for TWT STA(j), and MeanULDataRateOfTWTSTA(j) denotes a mean UL data rate for TWT STA(j).

When a target wake up time of TWT STA(j) is present within a next relay beacon interval, a value of WithinNextRelayBeacon interval is set to "1" and in other cases, a value of WithinNextRelayBeacon interval(j) is set to "0".

Transmission durations of a TWT STA may not be adjacent to each other. In this example, times between the transmission durations of the TWT STA may be additionally added to a DL duration.

Instead of feeding back, to a root AP, each of a mean UL data size for TWT STA, a mean UL data rate for TWT STA, a mean UL data size for TIM STA, and a mean UL data rate for TIM STA, a relay may directly calculate a value of (mean UL data size for TWT STA)/(mean UL data rate for TWT STA) and a value of (mean UL data size for TIM STA)/(mean UL data rate for TIM STA) and thereby feedback the same to the root AP.

For example, an expected UL duration during a next relay beacon interval may be determined according to the following Equation 3.

Expected UL Duration during the next Relay beacon interval=$\Sigma_i$(MeanULDurationForTIMSTA(i))+$\Sigma_j$ [(MeanULDurationForTWTSTA(j))*WithinNextRelayBeacon(j)] [Equation 3]

In Equation 3, when a target wake up time of TWT STA(j) is present within a next relay beacon interval, a value of WithinNextRelayBeacon interval is set to "1" and in other cases, a value of WithinNextRelayBeacon interval(j) is set to "0".

MeanULDurationForTIMSTA(i) denotes (mean UL data size (bits) for TIM STA(i))/(mean UL data rate (bits/s) for TIM STA(i)). MeanULDurationForTWTSTA(j) denotes (mean UL data size (bits) for TWT STA(j))/(mean UL data rate (bits/s) for TWT STA(j)).

The transmission duration of the entire relay BSS may be calculated based on the calculated UL duration and DL duration for the relay BSS according to the following Equation 4.

Transmission Duration of entire Relay BSS=Expected DL Duration during the next Relay Beacon Interval+Expected UL Duration during the next Relay Beacon Interval+Expected PS-Poll Duration during the next Relay Beacon Interval [Equation 4]

An STA information announcement frame defined in the 802.11ah standard may be extended and thereby used. For example, an additional element of the STA information announcement frame may be defined to include AID update information and duration allocation related information in the STA information announcement frame. Alternatively, a new frame capable of including duration allocation related information may be defined, and a relay may transmit the newly defined frame to a root AP. The relay may have no need to update all the STA information for each DTIM, and may update information on only an STA of which a data rate is significant.

<Method E>

In an initial stage, a root AP may allocate a transmission time of a relay beacon and an initial transmission duration based on a total number of relays included in an extended BSS. A relay may transfer, to the root AP, a relay setup request about an initial transmission duration and a relay beacon interval. In response to the relay setup request, the root AP may transfer, to the relay, a relay setup response about a next relay target beacon transmission time (TBTT) and a beacon interval and an initial duration.

Update of a transmission duration may be performed using Option 1 and Option 2 as follows.

(1) Option 1: In a case in which traffic of an STA associated with a relay is regular, a root AP may periodically allocate a transmission duration, and may adjust the transmission duration only in a case in which the relay explicitly requests update of the transmission duration.

(2) Option 2: In a case in which traffic of an STA associated with a relay is irregular, a root AP may adjust a transmission duration based on information on each STA of the relay. The relay may transmit, to the root AP, information received from an STA when the STA is associated with the relay and additional information using a ReachableAddressUpdate frame, and the root AP may adjust a transmission duration within a relay cluster based on information received from the relay. At a point in time when each STA is associated with the relay, the relay may transmit, to the root AP, information on a reachable address, for example, a MAC address of a corresponding STA, a mean data rate, an AID of the STA, and an STA Type. The mean data rate uses an initial value (4 octets) transmitted to the relay when the STA is initially associated with the relay. At a time just ahead of a DTIM transmission time of the relay, the relay may transmit, to the root AP, information on a number of TIM segments of a next DTIM duration of the relay (+TIM Offset, Page Offset), an updated mean data rate, and an AID of a reallocated STA. The updated mean data rate and the AID of the reallocated STA may be transmitted when it is required for each STA.

A root AP may determine when a relay DTIM is to be transmitted based on a relay beacon. The root AP may determine in which beacon after a DTIM a TIM segment for a predetermined STA is transferred based on a number of TIM segments and an AID of an STA. The relay schedules DL transmission for an STA in a TIM segment and thus, the root AP may predict transmission from the relay to the STA in a relay beacon interval.

The root AP may predict a time required for DL transmission in a predetermined relay beacon interval based on an amount of traffic for an STA, a mean data rate, and a relay beacon interval in which DL data is transmitted. In a case of a TWT STA, the root AP may predict a time required for DL transmission in a predetermined relay beacon interval based on a TWT, transmission duration information, and mean data rate information.

The root AP may determine a UL transmission duration based on STA type information transferred when an STA is associated with a relay. The relay may allocate an allocated transmission duration in detail as, for example, a UL RAW and a DL RAW. In a case in which a transmission duration is insufficient, the root AP, the relay, and the STA may buffer data and transmit the buffered data in a next transmission duration.

<(BB) Method of Determining a Spatial Separation Between Relays>

In an initial stage, a relay may measure a degree of spatial separation between a root AP and another relay BSS, and may transfer the measurement result to the root AP. The root AP may allocate a transmission duration of a relay BSS based on the measurement result received from the relay. When a new relay BSS and the other relay BSS are spatially sufficiently separated from each other, the root AP may overlappingly allocate a transmission duration.

Also, to prevent collisions occurring when an STA belonging to a relay BSS transmit data in a transmission duration for another relay BSS using the same channel, the relay BSS may explicitly set the transmission duration of the other relay BSS as an empty RAW or an AP PM RAW. The relay BSS may periodically determine whether the relay BSS is spatially separated from the other relay BSS. When the relay BSS is insufficiently separated from the other relay BSS, the relay BSS may prohibit data transmission of an STA associated with the relay BSS by setting the transmission duration of the other relay BSS as an empty RAW or an AP PM RAW. Alternatively, instead of prohibiting all the STAs in the relay BSS from performing data transmission in the transmission duration of the other relay BSS, the relay BSS may prohibit transmission of only a predetermined STA affected by relatively great interference of the other relay BSS among the STAs in the relay BSS. In this example, a method using a modified empty RAW or a modified AP PM RAW capable of explicitly indicating an STA prohibited from performing transmission or a method of excluding an STA prohibited from performing transmission from a transmission duration allocation target may be used.

Similarly, to prevent collisions occurring when an STA belonging to a root BSS transmit data in a transmission duration for another relay BSS using the same channel, the root BSS may explicitly set the transmission duration of the other relay BSS as an empty RAW or an AP PM RAW. Using the following method, the root BSS may determine whether the root BSS is spatially separated from the other relay BSS. When the root BSS is insufficiently separated from the other relay BSS, the root BSS may prohibit data transmission of an STA associated with the root BSS by setting the transmission duration of the other relay BSS as an empty RAW or an AP PM RAW. Alternatively, instead of prohibiting all of the STAs in the root BSS from performing data transmission in the transmission duration of the other relay BSS, the root BSS may prohibit transmission of only a predetermined STA affected by relatively great interference of the other relay BSS among the STAs in the root BSS. In this example, a method using a modified empty RAW or a modified AP PM RAW capable of explicitly indicating an STA prohibited from performing transmission or a method of excluding an STA prohibited from performing transmission from a transmission duration allocation target may be used.

In level-1 transmission, although a transmission duration is not allocated to a relay to which an STA belongs, the STA may be allowed to perform transmission, as an exception, in a transmission duration not explicitly set as an empty RAW, in a case in which transmission of another relay BSS is not detected or in a case in which a RAW is not set within a duration allocated for transmission of a corresponding relay BSS based on a determination result made based on a beacon of the corresponding relay BSS.

In level-0 transmission, although a time duration is allocated to another relay BSS, an STA of a root BSS may perform transmission, as an exception, in the corresponding time duration, in a case in which transmission of the other relay BSS is not detected or in a case in which a RAW is not set within a duration allocated for transmission of a corresponding relay BSS based on a determination result made based on a beacon of the corresponding relay BSS.

Alternatively, an STA belonging to a root AP and an STA belonging to a relay may be allowed to perform transmission through contention, similar to transmission in a conventional OBSS environment, even in a duration in which transmission of the STAs to an AP is not allowed. However, since a probability of collisions may be relatively high in a case in which data is transmitted in a duration not allocated to a BSS to which an STA belongs, the STA may perform RTS/CTS in advance of data transmission.

A relay or a root AP may explicitly prohibit transmission of STAs associated with the relay or the root AP by setting, as an empty RAW, a duration in which intense collision or contention is expected among transmission durations not allocated to the relay or the root AP. Also, a relay AP may prohibit an STA from performing transmission to a relay in a duration in which transmission between the relay and the root AP is performed, by setting, as an empty RAW, the duration in which the transmission between the relay and the root AP is performed. For example, the relay or the root AP may prohibit all the STAs associated with the relay from performing transmission in a predetermined duration by setting AP PM=1. The AP PM denotes a parameter for adjusting a power save mode of a station.

<A. Method of Determining Spatial Separation>

Figure 47:
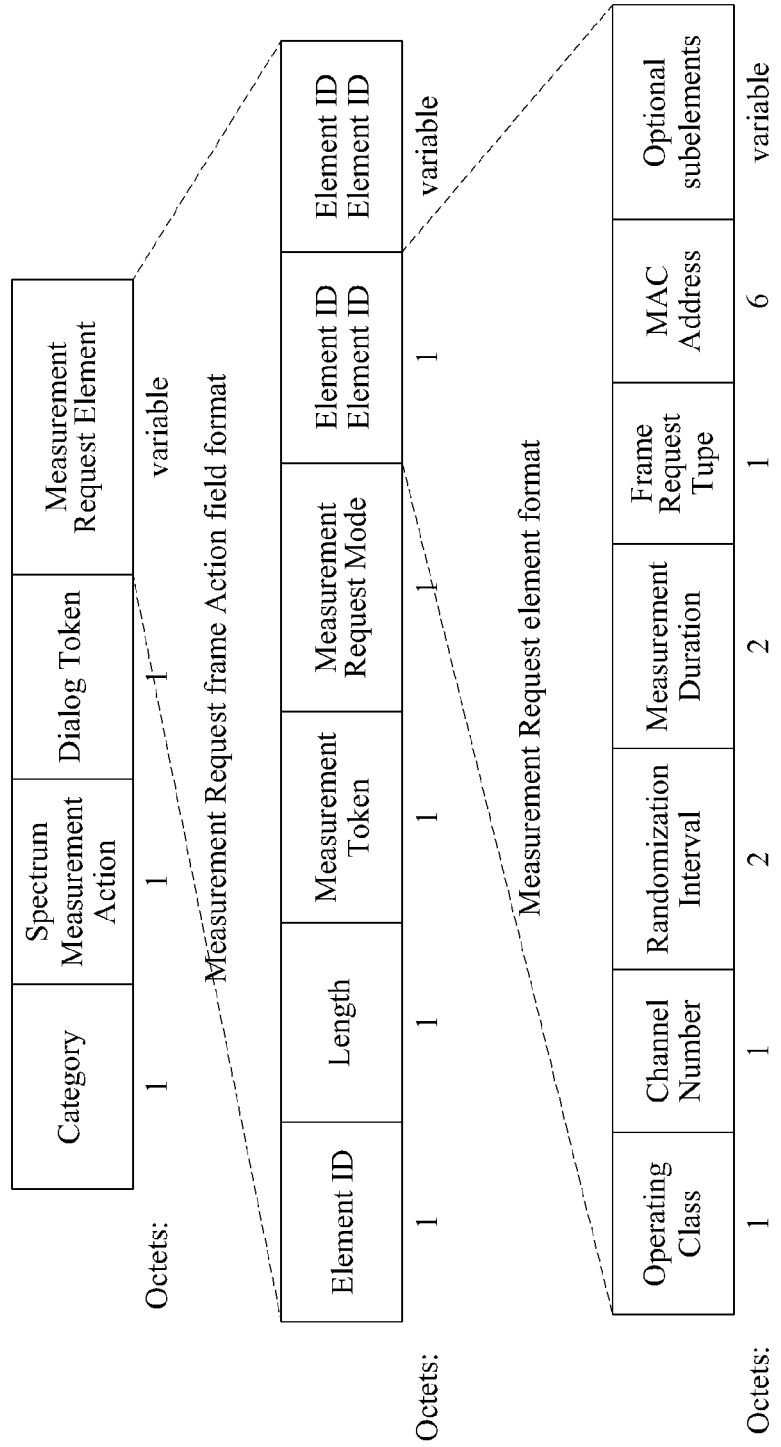
FIG. 47 illustrates a format for a frame request according to an embodiment.
Figure 48:
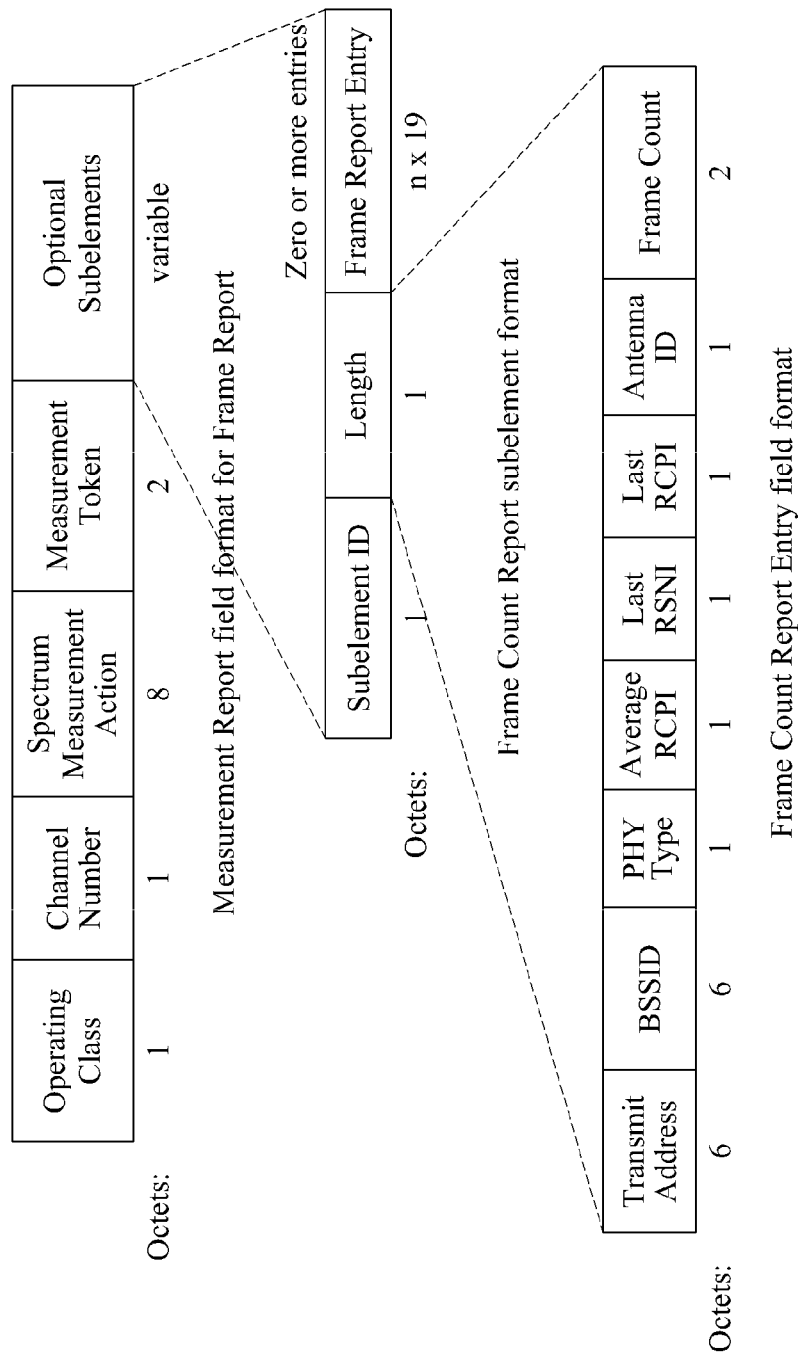
FIG. 48 illustrates a format for a frame report according to an embodiment.

A first method of determining a degree of spatial separation refers to a method of extending a frame request/response frame defined in 802.11k and thereby determining whether STAs belonging to a relay BSS are separated from a relay of a neighboring relay BSS and an STA belonging to the neighboring relay BSS. FIG. 47 illustrates a format for a frame request according to an embodiment, and FIG. 48 illustrates a format for a frame report according to an embodiment. An STA may detect a received channel power indicator (RCPI) and a received signal to noise indicator (RSNI) for a transmission frame of an STA belonging to another relay BSS, and may report the detected RCPI and RSNI.

Using a beacon report, RCPI and RSNI values for an AP may be identified. Using a frame report, the average RCPI value and the average RSNI value for a predetermined STA may be identified through predetermined frame transmission that is performed by the STA.

A frame measurement request for an STA using a predetermined MAC address as a target may be included in a beacon request. Here, a wildcard MAC address may be designated.

A frame report may include a frame count report subelement in an optical subelement. A count, that, the number of frames transmitted from a single STA and information on the average RCPI value and the average RSNI value may be included in a single report entry. Based on the frame count and the average RCPI value and the average RSNI value, a degree of spatial separation with a predetermined STA may be determined.

—Extension of Frame Request/Response Frame into Consideration of Relay—

Figure 49:
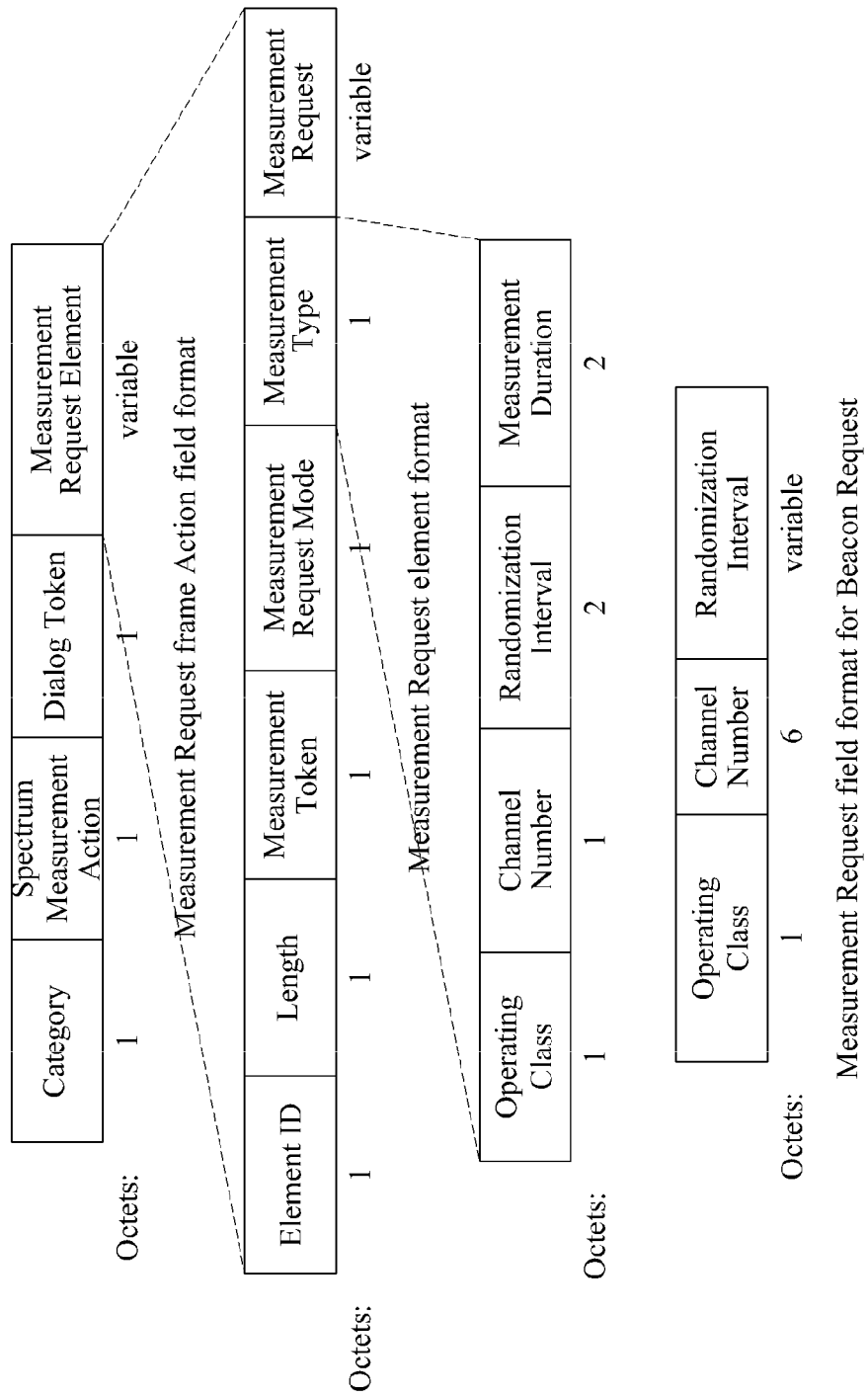
FIG. 49 illustrates an example of a format of a management request field according to an embodiment.

FIG. 49 illustrates an example of a format of a management request field according to an embodiment, and FIG. 50 illustrates an example of a format of a management report field according to an embodiment.

To determine whether a predetermined relay and an STA are separated from each other, a frame request/response frame may be extended to measure a frame to be transmitted from or to a predetermined BSSID. The frame request/response frame may be extended to be capable of adding a BSSID to an optional subelement of an existing format.

When a MAC address is a wildcard and a BSSID is designated in a subelement, a frame request/response frame may be extended to measure a frame transmitted from the corresponding BSSID and a frame to be transmitted to the corresponding BSSID.

In the extended frame request/response frame, a measurement start time may be designated in addition to a measurement duration. When requesting a frame report, the measurement start time may be set as a transmission duration start time allocated to a relay BSS to be measured. In order not to interrupt transmission of another relay, STAs may perform only measurement in a transmission duration of another relay BSS and may transmit a measurement report later. A RAW for transmission of the measurement report may be allocated.

STAs may receive a request for a measurement report using broadcast/groupcast during a transmission duration of a relay BSS. Among the STAs, STAs supporting a 802.11k function may perform measurement with respect to a designated relay in a designated start time/transmission duration and may transmit the measurement result to a relay with which the STAs are associated. The relay receiving the measurement result may determine whether the relay is separated from a neighboring relay based on the measurement result.

To decrease an amount of traffic, a method of selecting an STA that belongs to a relay and supports predetermined 802.11k may be used. It is because when a measurement report is received from all of the STAs belonging to a relay, an amount of traffic may overly increase. For example, the relay may select a predetermined STA from among STAs supporting 802.11k, and may request the selected STA for a measurement report.

A relay may also request an STA performing measurement to transmit information, for example, the average RCPI value and the average RSNI value or a maximum RCPI value and a maximum RSNI value, with respect to the entire transmission of a predetermined BSS, instead of transmitting information for each STA address. To reduce a size of a measurement report, the relay may request an STA to transmit not RCPI and RSNI values for each STA but the average RCPI value and the average RSNI value or RCPI and RSNI values, for example, a maximum RCPI value and a maximum RSNI value of an external STA that most greatly affects the corresponding relay.

To indicate the entire BSS information, a BSS frame count report modified from an existing frame report entry may be defined. That is, by further shortening an existing frame count report, the BSS frame count report including a BSSID, an average transmission frame count within the BSSID, the average RCPI value and the average RSNI value may be defined.

Each relay may request STAs belonging thereto for a frame report, and may determine whether the STAs and a neighboring relay BSS are separated from each other, based on the frame report. A root AP may also request STAs belonging to the root AP for a frame report, and may determine whether STAs belonging to each root BSS and a neighboring relay BSS are separated from each other.

A relay AP or a root AP may determine whether a BSS of the relay AP or the root AP and a predetermined relay BSS are separated from each other, and may determine whether a transmission duration of another relay BSS is to be set as an empty RAW. In a case in which the BSS of the relay AP or the root AP and the predetermined relay BSS are determined to be insufficiently separated from each other, the relay AP or the root AP may set the transmission duration of the other relay BSS as an empty RAW or AP PM=1, thereby prohibiting an STA belonging to the BSS of the relay AP or the root AP from transmitting data in the other relay transmission duration.

According to another embodiment, a relay AP or a root AP may identify STAs insufficiently separated from another relay based on a measurement report received from an STA belonging to the relay AP or the root AP. The relay AP or the root AP may prohibit STAs insufficiently separated from the other relay from performing transmission in a transmission duration of the other relay. That is, instead of prohibiting the entire STAs included in a BSS of the relay AP or the root AP from performing transmission, the relay AP or the root AP may prohibit only a portion of STAs affected by interference of a predetermined relay BSS from performing transmission. In this example, to prohibit a predetermined STA in a root BSS or a relay BSS from performing transmission, two methods may be employed. For example, (1) a method of modifying and thereby using an AP PM or an empty RAW and (2) a method using existing RAW allocation may be employed. The method (1) of modifying and thereby using an AP PM or an empty RAW is a method of including an AID or partial AID list of an STA to be prohibited from performing transmission in a transmission duration in an AP PM RAW or an empty RAW, and explicitly disallowing only the STA included in the AID or partial AID list to perform transmission and allowing remaining STAs to perform transmission through contention in an AP PM RAW or empty RAW duration. The method (2) using an existing RAW allocation is a method of disallowing a corresponding STA to perform transmission by not allocating a RAW to an STA to be explicitly prohibited from performing transmission when allocating a RAW for another relay transmission duration.

When a relay requests a root AP for a BSS establishment in an initial stage, the relay may transmit, to the root AP, information regarding whether the relay is separated from a neighboring relay. The root AP may allocate the same transmission duration to spatially separated relay BSSs based on information received from the relay.

Also, a relay may periodically or aperiodically measure a degree of spatial separation with another relay BSS. When the degree of spatial separation with the other relay BSS is modified by a predetermined reference or more, the relay may feedback the modified contents to a root AP. For example, when a relay is affected by great interference of existing separated another relay BSS, the relay may inform the root AP of the above situation. Alternatively, when a new relay BSS is detected, the relay may inform the root AP of the detected new relay BSS. The root AP may also allocate the same duration for transmission of the spatially separated relays, based on spatial separation information between the relays.

To reduce a length of a measurement report, a reporting option similar to a beacon report may be added to a frame request. For example, the reporting option may be set to include values greater than or equal to or less than or equal to predetermined RCPI and RSNI values in a measurement report.

<B. Method of Determining Spatial Separation>

A second method of determining a degree of spatial separation refers to a method of using a beacon request/response defined in 802.11k. FIG. 47 illustrates a format for a frame request according to an embodiment, and FIG. 48 illustrates a format for a frame report according to an embodiment.

A root AP may transmit a beacon request frame to a relay and an STA associated with the root AP. Through a beacon request/report, an STA may request another STA for a list of APs transmitting a receivable beacon. Since relays may use the same SSID as the root AP, the root AP may include an SSID of the root AP in an optional subelement to receive a beacon report from a new STA. A BSSID may be set as a wildcard BSSID.

A newly established relay may receive a beacon request from a root AP and then may measure a probe response and a beacon of another relay and transfer the measurement result to the root AP through a beacon report. The root AP may allocate a transmission duration for the newly established relay based on an RCPI and an RSNI between the newly established relay and another relay AP.

A root AP may also transfer a beacon request after a relay is newly established, and may update resource allocation based on a degree of spatial separation.

When STAs are associated with a relay BSS, each relay may randomly select a portion of the STAs having a measurement function, and may transfer a beacon request to the selected STAs. In this instance, a BSSID of the beacon request may be set as a wildcard BSSID, and an SSID of an optional subelement may be set as an SSID of a root AP.

A relay may set a reporting condition of a beacon request. Thus, in a case in which the reporting condition of the beacon request is greater than or equal to, or less than or equal to a predetermined RCPI level and a predetermined RSNI level, the beacon report may be transmitted.

A relay may periodically or aperiodically determine whether an STA is spatially separated from another relay based on a beacon report received from each of STAs. When the STA is determined to be spatially adjacent to the other relay, the relay may set a transmission time of the other relay as an empty RAW, thereby prohibiting transmission of the corresponding STA.

Each relay may determine whether each of stations belonging to a corresponding relay is spatially separated from a neighboring relay, based on a beacon report received from each STA. A root AP may also determine whether each of STAs directly associated with the root AP is spatially separated from a neighboring relay, based on a beacon report received from each STA.

A relay AP or a root AP may determine whether a BSS of the relay AP or the root AP is spatially separated from another relay, and may determine whether another relay transmission duration is to be set as an empty RAW or an AP PM RAW. In a case in which a BSS of the relay AP or the root AP is spatially insufficiently separated from the other relay, the relay AP or the root AP may set an empty RAW or AP PM=1, thereby prohibiting an STA belonging to the BSS of the relay AP or the root AP from performing transmission in another relay transmission duration.

According to another embodiment, a relay AP or a root AP may identify STAs insufficiently separated from another relay based on a measurement report received from an STA belonging to the relay AP or the root AP. The relay AP or the root AP may prohibit STAs insufficiently separated from the other relay from performing transmission in a transmission duration of the other relay. That is, instead of prohibiting the entire STAs included in a BSS of the relay AP or the root AP from performing transmission, the relay AP or the root AP may prohibit only a portion of STAs affected by interference of a predetermined relay BSS from performing transmission. In this example, to prohibit a predetermined STA in a root BSS or a relay BSS from performing transmission, two methods may be employed. For example, (1) a method of modifying and thereby using an AP PM or an empty RAW and (2) a method using existing RAW allocation may be employed. The method (1) of modifying and thereby using an AP PM or an empty RAW is a method of including an AID or partial AID list of an STA to be prohibited from performing transmission in a transmission duration in an AP PM RAW or an empty RAW, and explicitly disallowing only the STA included in the AID or partial AID list to perform transmission and allowing remaining STAs to perform transmission through contention in an AP PM RAW or empty RAW duration. The method (2) using an existing RAW allocation is a method of disallowing a corresponding STA to perform transmission by not allocating a RAW to an STA to be explicitly prohibited from performing transmission when allocating a RAW for another relay transmission duration.

When a relay requests a root AP for a BSS establishment in an initial stage, the relay may transmit, to the root AP, information regarding whether the relay is separated from a neighboring relay. The root AP may allocate the same transmission duration to spatially separated relay BSSs based on information received from the relay.

Also, a relay may periodically or aperiodically measure a degree of spatial separation with another relay BSS. When the degree of spatial separation with the other relay BSS is modified by a predetermined reference or more, the relay may feedback the modified contents to a root AP. For example, when a relay is affected by great interference of existing separated another relay BSS, the relay may inform the root AP of the above situation. Alternatively, when a new relay BSS is detected, the relay may inform the root AP of the detected new relay BSS. The root AP may also allocate the same duration for transmission of spatially separated relays, based on spatial separation information between such relays.

The above method of measuring an interference level between relay BSSs may be applicable to a method of measuring an interference level between multiple BSSs in a WLAN as well as an interference level between relays.

FIG. 51 illustrates a method of measuring an interference level from a neighboring relay or a neighboring relay BSS using a frame request/response according to an embodiment.

Referring to FIG. 51, a relay AP or a general AP, R1, may select STAs to perform measurement from among STAs associated with the relay AP R1, and may transmit a frame request to the selected STAs. Each of STAs within an R1 BSS having received the frame request may measure separation information on a neighboring relay BSS or a general BSS that uses R2 as an AP, and may transmit a measurement result to R1 in a form of a frame report. STAs within the R1 BSS having received the frame request may measure a frame that is transmitted from each of STAs within the neighboring BSS, for example, R2 during a measurement time. For example, separation information may include a separation level between an STA and R2 that is an AP, or between the STA and STAs associated with R2. R1 may measure an interference level from a neighboring BSS based on RCPI and RSNI information included in a frame report transferred from each STA.

Figure 52:
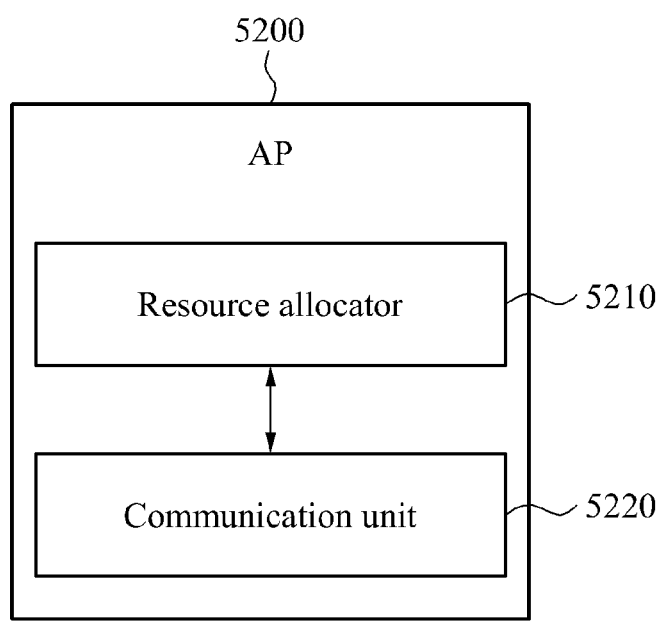
FIG. 52 illustrates a configuration of an AP according to an embodiment.

FIG. 52 illustrates a configuration of an AP 5200 according to an embodiment.

Referring to FIG. 52, the AP 5200 may include a resource allocator 5210 and a communication unit 5220.

The resource allocator 5210 may allocate a resource for communication between a relay and an STA associated with the relay. The resource allocator 5210 may allocate a transmission period or a frequency subband for communication between the relay and the STA associated with the relay.

The resource allocator 5210 may delegate, to the relay, detailed resource allocation with respect to STAs associated with the relay. For example, the resource allocator 5210 may allocate, to the relay, a transmission duration for communication between the relay and the STA associated with the relay. The relay may divide the allocated transmission duration into sub-transmission durations for the respective STAs. The relay may allocate a resource to STAs included in a relay BSS.

Also, the resource allocator 5210 may allocate a resource for communication with an STA directly associated with the AP 5200 without using the relay. The resource allocator 5210 may control the STA directly associated with the AP 5200 not to perform communication during the transmission period allocated for the communication between the relay and the STA associated with the relay.

According to another embodiment, the resource allocator 5210 may directly allocate a resource to the entire STAs included in a root AP BSS. That is, the resource allocator 5210 may also allocate a resource to the STA associated with the relay as well as the STA directly associated with the AP 5200. For example, the resource allocator 5210 may allocate a RAW or a slot for each of the STAs included in the root AP BSS. The resource allocator 5210 may also allocate a RAW or a slot for communication between the relay and the STA associated with the relay as well as communication between the AP 5200 and the STA associated with the AP 5200. The RAW or the slot may refer to a transmission duration in a time domain, and a time domain in which communication is allowed may be determined based on the RAW or the slot. The RAW or the slot may include a DL transmission duration or an UL transmission duration.

The resource allocator 5210 may allocate a resource for communication between the relay and the STA associated with the relay based on a degree of spatial separation between relays. The resource allocator 5210 may determine a degree of spatial separation between the relay and another relay, and may allocate a resource based on the determination result. For example, in a case in which the relay is determined to be spatially separated from the other relay by a predetermined distance or more, the resource allocator 5210 may allocate the same or overlapping transmission duration to the relays.

The resource allocator 5210 may allocate a resource based on a frequency subband for communication between the relay and the STA associated with the relay and a frequency subband for communication between the AP 5200 and the relay. For example, when a frequency subband used for communication between the relay and the STA associated with the relay and a frequency subband used for communication between the AP 5200 and the relay do not overlap, the resource allocator 5210 may allocate the same or overlapping transmission duration for both communications.

The communication unit 5220 may transmit, to the relay, resource allocation information on the resource allocated by the resource allocator 5210. The communication unit 5220 may transmit, to the relay, resource allocation information on a resource allocated for communication between the relay and the STA associated with the relay. For example, resource allocation information may include at least one of transmission duration information for communication between the relay and the STA associated with the relay, information on the allocated frequency subband, information on an allocated channel, and information on a relay or an STA prohibited from performing communication in a predetermined duration. Resource allocation information may be transmitted in a form of a resource allocation IE. Resource allocation information may be indicated based on at least one of ID information of the relay, the frequency subband, and the time duration. The communication unit 5220 may periodically or aperiodically transmit a beacon including resource allocation information.

The resource allocator 5210 may adjust the allocated resource based on interference information or STA information received from the relay. STA information may include information on at least one of a data rate used for communication between the STA and the relay and a size of data transmitted between the STA and the relay. The communication unit 5220 may transmit information on the adjusted resource to the relay.

The relay may transmit, to the AP 5200, PS-Poll information and UDI information received from the STA. The resource allocator 5210 may adjust the allocated RAW or slot based on the PS-Poll information and UDI information received from the relay. UDI information may include information on an amount of data transmitted from the STA to the relay. PS-Poll information may indicate information transmitted to the relay or the AP 5200 in order to receive a frame buffered during a power save mode after the STA is released from the power save mode.

Figure 53:
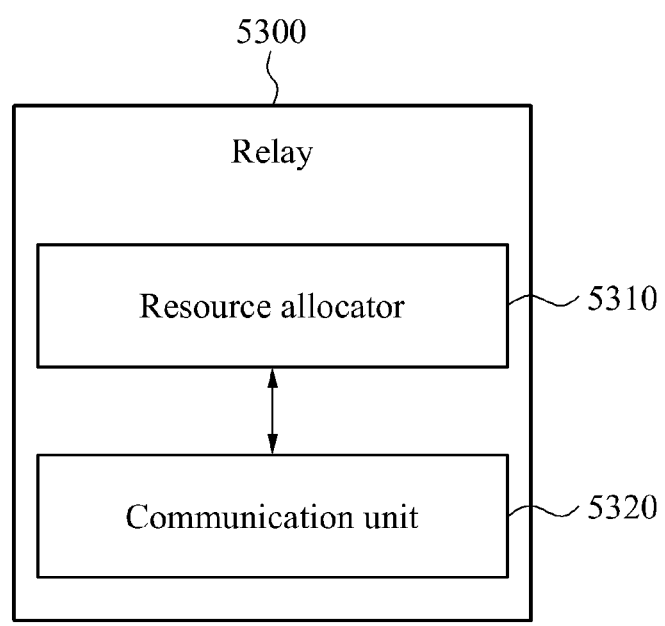
FIG. 53 illustrates a configuration of a relay according to an embodiment.

FIG. 53 illustrates a configuration of a relay 5300 according to an embodiment.

Referring to FIG. 53, the relay 5300 may include a resource allocator 5310 and a communication unit 5320.

The resource allocator 5310 may allocate a resource for communication between the relay 5300 and an STA associated with the relay 5300 based on resource allocation information received from an AP. For example, the resource allocator 5310 may allocate an access window or a slot for communication with the STA based on at least one of channel state information, MCS information supported by the STA, available frequency subband information, and the number of antennas of the STA.

The resource allocator 5310 may allocate a RAW or a slot for communication between the relay 5300 and the STA associated with the relay 5300 based on resource allocation information. For example, the resource allocation information may include a transmission duration for communication between the relay 5300 and the STA associated with the relay 5300. The resource allocator 5310 may divide he transmission duration identified from the resource allocation information into sub-RAWs for the respective STAs.

In a case in which interference occurs between the STA associated with the relay 5300 and another relay BSS, the resource allocator 5310 may prohibit the entire or a portion of STAs associated with the relay 5300 from performing transmission in a transmission duration allocated to the other relay BSS. For example, the resource allocator 5310 may set a partial communication duration as an empty RAW or an AP PM RAW so that the STA associated with the relay 5300 may not perform communication in a communication duration between the AP and an STA directly associated with the AP and in a communication duration of another relay.

The relay 5300 may transmit, to an STA, a measurement request for measuring a frame transmitted from a predetermined BSSID or a frame transmitted to the predetermined BSSID. In response to the measurement request, the STA may transmit a measurement report to the relay 5300. The measurement report may include information on the frame transmitted from the predetermined BSSID or the frame transmitted to the predetermined BSSID. For example, the measurement report may include information on at least one of the number of frames transmitted from another relay, the number of frames transmitted to the other relay, and an RCPI and an RSNI related to a transmission frame of an STA associated with the other relay. The resource allocator 5310 may determine a spatial separation with the other relay based on the measurement report received from the STA, and may allocate a resource for the STA based on the determination result.

The communication unit 5320 may receive resource allocation information from the AP. The communication unit 5320 may transmit, to the STA, information on the resource allocated by the resource allocator 5310. The communication unit 5320 may periodically or aperiodically transmit, to the STA, a beacon including information on the allocated resource. For example, the communication unit 5320 may transmit the beacon at a start time of a relay transmission duration indicated in resource allocation information.

The beacon may include information on a RAW or a slot for communication between the relay 5300 and the STA associated with the relay 5300. Information on a RAW or slot for communication between the AP and the relay 5300 may not be included in a beacon to be transmitted by the communication unit 5320. The communication unit 5320 may transmit, to the AP, STA information on the STA associated with the relay 5300.

Figure 54:
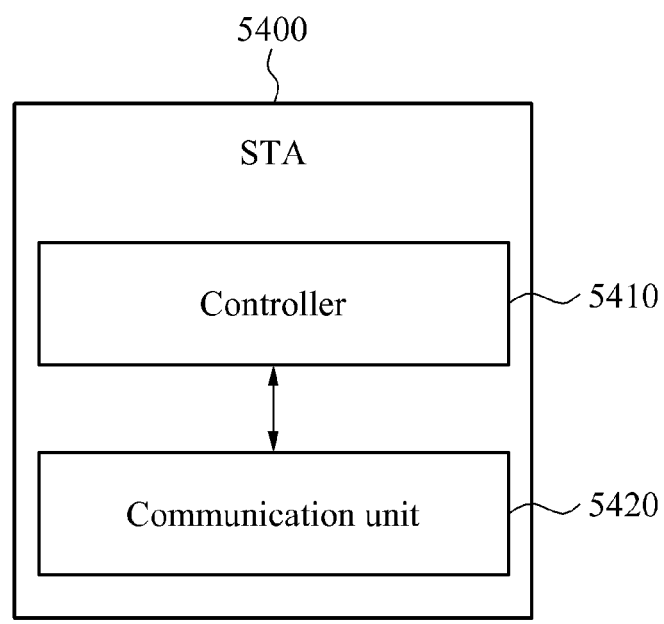
FIG. 54 illustrates an STA according to an embodiment.

FIG. 54 illustrates an STA 5400 according to an embodiment.

Referring to FIG. 54, the STA 5400 may include a controller 5410 and a communication unit 5420.

The communication unit 5420 may receive a beacon from a relay, and the controller 5410 may identify a resource allocated to the STA 5400 based on the beacon received from the relay. The beacon received from the relay may include information on a resource allocated by the relay.

The controller 5410 may identify, from the received beacon, information on at least one of a RAW or a slot indicating a communication duration in a time domain and a frequency subband indicating a communication duration in a frequency band.

The communication unit 5420 may communicate with the relay based on the identified resource. The communication unit 5420 may communicate with the relay based on the identified RAW or slot, or frequency subband. For example, the communication unit 5420 may receive data from the relay in a RAW duration in which DL transmission is allowed, and may transmit data to the relay in a RAW duration in which UL transmission is allowed.

Figure 55:
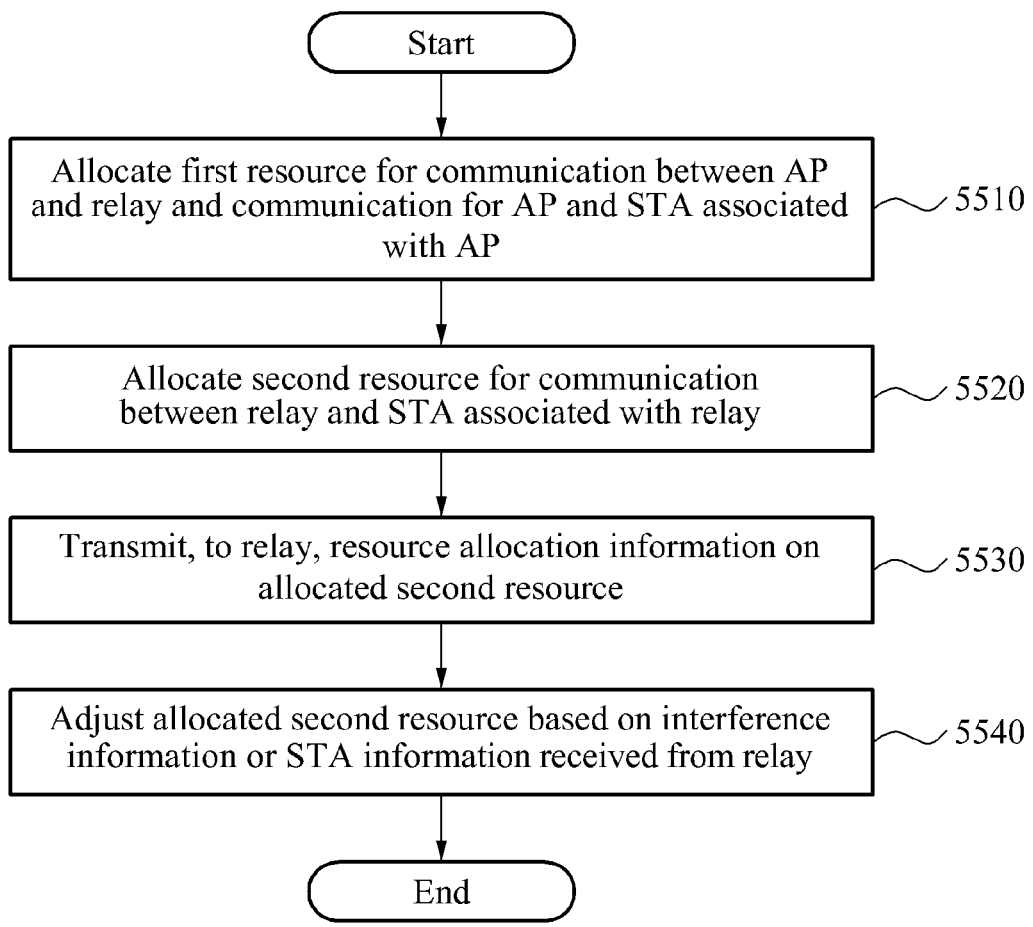
FIG. 55 is a flowchart illustrating a resource allocation method performed by an AP according to an embodiment.

FIG. 55 is a flowchart illustrating a resource allocation method performed by an AP according to an embodiment.

In operation 5510, the AP may allocate a first resource for communication between the AP and a relay and communication between the AP and an STA associated with the AP. The AP may allocate a RAW or a slot for communication between the AP and the relay and communication between the AP and the STA associated with the AP. The RAW or the slot may be used to determine a time domain in which communication is allowed. The RAW or the slot may include a DL transmission duration and an UL transmission duration.

In operation 5520, the AP may allocate a second resource for communication between the relay and the STA associated with the relay. The AP may allocate at least one of a transmission period and a frequency subband for communication between the relay and the STA associated with the relay. The AP may allocate a RAW or a slot for communication between the relay and the STA associated with the relay.

In operation 5530, the AP may transmit, to the relay, resource allocation information on the allocated second resource. Resource allocation information may include information on at least one of ID information of the relay, a transmission allow start time, a transmission duration, a resource allocation period, an allocated channel, an allocated frequency subband, and a relay or an STA prohibited from performing communication in a predetermined transmission duration. For example, ID information of the relay may include at least one of an AID, a partial AID, and a partial BSSID of the relay. The AP may transmit, to the relay, a beacon including information on the allocated first resource and second resource.

In operation 5540, the AP may adjust the allocated second resource based on interference information or STA information received from the relay. STA information may include information on at least one of a data rate used for communication between the relay and an STA associated with the relay and a size of data transmitted between the relay and the STA associated with the relay.

Alternatively, the AP may adjust the resource allocated for communication between the relay and the STA associated with the relay based on PS-Poll information and UDI information received from the relay.

Figure 56:
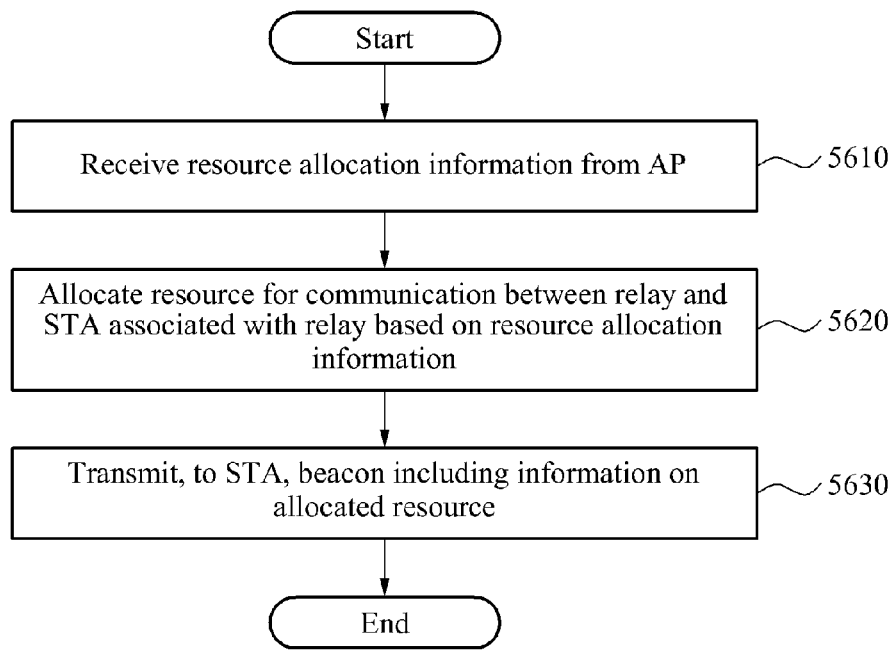
FIG. 56 is a flowchart illustrating a resource allocation method performed by a relay according to an embodiment.

FIG. 56 is a flowchart illustrating a resource allocation method performed by a relay according to an embodiment.

In operation 5610, the relay may receive resource allocation information from an AP. Resource allocation information may include information on at least one of a transmission duration for communication between the relay and an STA associated with the relay, an available frequency subband, and an available channel.

In operation 5620, the relay may allocate a resource for communication between the relay and the STA associated with the relay, based on resource allocation information. The relay may determine a RAW or a slot for communication between the relay and the STA based on resource allocation information. The RAW or the slot may be used to determine a time domain in which communication between the relay and the STA is allowed.

According to another embodiment, the relay may request the STA for measuring the number of frames transmitted from another relay, the number of frames transmitted to the other relay, or an RCPI and an RSNI related to a transmission frame of an STA associated with the other relay. In response to the request for measurement, the STA may transmit a measurement report to the relay. The relay may determine whether the relay is spatially separated from the other relay based on the received measurement report, and may allocate a resource for communication between the relay and the STA associated with the relay based on the determination result.

In operation 5630, the relay may transmit, to the STA, a beacon including information on the allocated resource. The relay may periodically or aperiodically transmit the beacon to the STA. The beacon may include information on a RAW and a slot for communication between the relay and the STA associated with the relay. Information on a RAW or a slot for communication between the AP and the relay may not be included in the beacon transmitted by the relay.

Figure 57:
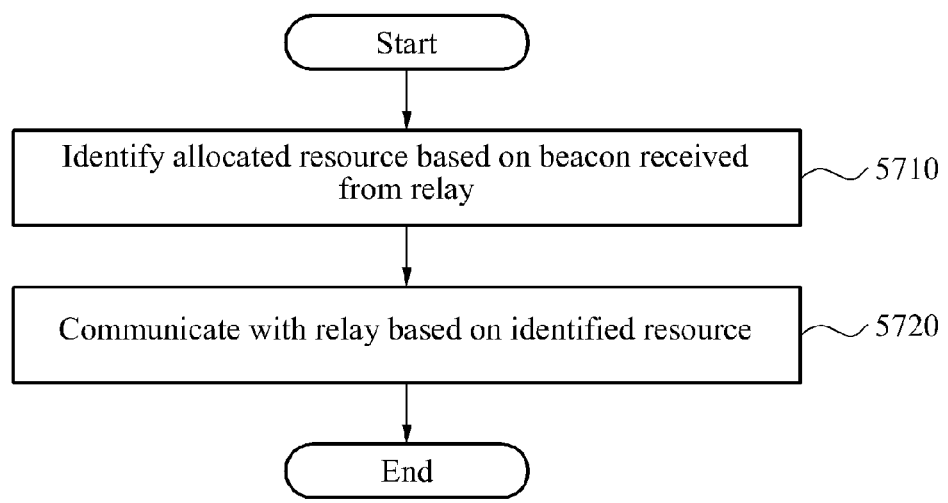
FIG. 57 is a flowchart illustrating a communication method performed by an STA according to an embodiment.

FIG. 57 is a flowchart illustrating a communication method performed by an STA according to an embodiment.

In operation 5710, the STA may identify a resource allocated to the STA, based on a beacon received from a relay. The relay received from the beacon may include information on the resource allocated by the relay. The STA may identify information on at least one of a RAW, a slot, and a frequency subband from the beacon.

In operation 5720, the STA may communicate with the relay based on the identified resource. The STA may communicate with the relay based on the identified RAW or slot, or frequency subband. For example, the STA may receive data from the relay in a RAW duration in which DL transmission is allowed, and may transmit data to the relay in a RAW duration in which UL transmission is allowed.

The methods according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of allocating resources in a wireless local area network (WLAN) system comprising an access point (AP), a relay, and stations, the method performed by the AP, the method comprising:

allocating a first resource for communication between the AP and the relay, and communication between the AP and a station associated with the AP; and allocating a second resource for communication between the relay and a station associated with the relay, wherein the method further comprises:

adjusting the second resource allocated for the communication between the relay and the station associated with the relay based on power save poll (PS-Poll) information of the station and uplink data indication (UDI) information received from the relay, the UDI information including an amount of uplink data between the relay and the AP.

2. The method of claim 1, wherein the allocating of the second resource comprises allocating at least one of a transmission period and a frequency subband for the communication between the relay and the station associated with the relay.

3. The method of claim 1, further comprising:

transmitting, to the relay, resource allocation information on the allocated second resource.

4. The method of claim 3, wherein the resource allocation information comprises information on at least one of identification (ID) information of the relay, a transmission allow start time, a transmission duration, a resource allocation period, an allocated frequency subband, and a station or a relay prohibited from performing communication in a predetermined transmission duration.

5. The method of claim 1, further comprising:
adjusting the allocated second resource based on interference information received from the relay.

6. The method of claim 1, further comprising:
adjusting the allocated second resource based on station information received from the relay,
wherein the station information comprises information on at least one of a data rate used for the communication between the relay and the station associated with the relay, and an amount of data transmitted between the relay and the station associated with the relay.

7. The method of claim 1, wherein the second resource is allocated by the relay to a restricted access window (RAW) or a slot for the communication between the relay and the station associated with the relay.

8. The method of claim 7, wherein the RAW or the slot comprises a downlink transmission duration or an uplink transmission duration.

9. The method of claim 7, wherein the RAW or the slot determines a time domain in which communication is allowed.

10. The method of claim 1, wherein:
the allocating of the first resource comprises allocating a RAW or a slot for the communication between the AP and the relay and the communication between the AP and the station associated with the AP, and
the allocating of the second resource comprises allocating a RAW or a slot for the communication between the relay and the station associated with the relay.

11. The method of claim 1, further comprising:
transmitting, to the relay, a beacon comprising information on the allocated first resource and information on the allocated second resource.

12. A method of allocating resources in a wireless local area network (WLAN) system comprising an access point (AP), a relay, and a station, the method performed by the relay, the method comprising:
receiving resource allocation information from the AP; and
allocating a resource for communication between the relay and the station associated with the relay based on the received resource allocation information,
wherein the allocating comprises:
verifying whether the station is spatially separated from another relay, based on a measurement report received from the station; and
allocating the resource for the communication between the relay and the station based on a result of the verifying.

13. The method of claim 12, wherein the allocating comprises allocating a restricted access window (RAW) or a slot for the communication between the relay and the station based on the received resource allocation information.

14. The method of claim 12,
wherein the measurement report comprises information on at least one of the number of frames transmitted from the other relay, the number of frames transmitted to the other relay, a received channel power indicator (RCPI) related to a transmission frame of a station associated with the other relay, and a received signal to noise indicator (RSNI) related to the transmission frame of the station associated with the other relay.

15. The method of claim 12, wherein the resource allocation information comprises information on at least one of identification (ID) information of the relay, a transmission allow start time, a transmission duration, a resource allocation period, an allocated frequency subband, and a station or a relay prohibited from performing communication in a predetermined transmission duration.

16. The method of claim 12, further comprising:
transmitting, to the station, a beacon comprising information on the allocated resource.

* * * * *